(12) United States Patent
Asayama

(10) Patent No.: US 10,965,090 B2
(45) Date of Patent: Mar. 30, 2021

(54) LASER APPARATUS

(71) Applicant: Gigaphoton Inc., Tochigi (JP)

(72) Inventor: Takeshi Asayama, Oyama (JP)

(73) Assignee: Gigaphoton Inc., Tochigi (JP)

(*) Notice: Subject to any disclaimer, the term of this patent is extended or adjusted under 35 U.S.C. 154(b) by 50 days.

(21) Appl. No.: 16/402,270

(22) Filed: May 3, 2019

(65) Prior Publication Data

US 2019/0280451 A1     Sep. 12, 2019

Related U.S. Application Data

(63) Continuation of application No. PCT/JP2016/086057, filed on Dec. 5, 2016.

(51) Int. Cl.
*H01S 3/104* (2006.01)
*H01S 3/0943* (2006.01)
*H01S 3/225* (2006.01)

(52) U.S. Cl.
CPC .......... *H01S 3/104* (2013.01); *H01S 3/0943* (2013.01); *H01S 3/225* (2013.01)

(58) Field of Classification Search
CPC ........ H01S 3/104; H01S 3/0943; H01S 3/225; H01S 3/134; H01S 3/036
See application file for complete search history.

(56) References Cited

U.S. PATENT DOCUMENTS

| | | | |
|---|---|---|---|
| 5,835,520 A | 11/1998 | Das et al. | |
| 6,005,879 A | 12/1999 | Sandstrom et al. | |
| 6,008,497 A * | 12/1999 | Mizoguchi | B23K 26/03 250/492.1 |
| 6,418,155 B1 * | 7/2002 | Wakabayashi | H01S 3/131 372/29.021 |
| 6,580,054 B1 | 6/2003 | Liu et al. | |
| 2004/0052279 A1 | 3/2004 | Miyairi et al. | |

(Continued)

FOREIGN PATENT DOCUMENTS

| | | |
|---|---|---|
| CN | 1309826 A | 8/2001 |
| CN | 1501475 A | 6/2004 |

(Continued)

OTHER PUBLICATIONS

International Search Report issued in PCT/JP2016/086057; dated Feb. 28, 2017.

(Continued)

*Primary Examiner* — Yuanda Zhang
(74) *Attorney, Agent, or Firm* — Studebaker & Brackett PC

(57) ABSTRACT

A laser apparatus according to the present disclosure includes: a laser chamber including a pair of electrodes and configured to emit, at each of a plurality of pulse repetition frequencies, a pulse laser beam having a pulse energy corresponding to a voltage applied between the electrodes; an energy detector provided on an optical path of the pulse laser beam and configured to detect the pulse energy of the pulse laser beam; a voltage control unit configured to control the applied voltage based on a target pulse energy and the pulse energy detected by the energy detector; and a pulse energy control unit configured to periodically vary the target pulse energy at a modulation frequency corresponding to each of the pulse repetition frequencies with a reference energy being a center of variation.

17 Claims, 40 Drawing Sheets

(56) References Cited

U.S. PATENT DOCUMENTS

| | | | |
|---|---|---|---|
| 2005/0105568 A1 | 5/2005 | Smart | |
| 2006/0060571 A1 | 3/2006 | Mori et al. | |
| 2006/0261051 A1 | 11/2006 | Unrath et al. | |
| 2013/0099140 A1* | 4/2013 | Nakarai | H01S 3/0057 250/493.1 |
| 2014/0105238 A1* | 4/2014 | Kurosu | H01S 3/041 372/58 |
| 2015/0139258 A1* | 5/2015 | Tsushima | H01S 3/09705 372/25 |
| 2015/0180192 A1* | 6/2015 | Tsushima | H01S 3/038 372/29.013 |
| 2015/0194781 A1* | 7/2015 | Asayama | H01S 3/225 372/38.05 |
| 2016/0070179 A1 | 3/2016 | Op 'T Root et al. | |
| 2017/0222391 A1 | 8/2017 | Moriya et al. | |

FOREIGN PATENT DOCUMENTS

| | | |
|---|---|---|
| CN | 101175598 A | 5/2008 |
| CN | 102189343 A | 9/2011 |
| JP | H09-107146 A | 4/1997 |
| JP | H11-191653 A | 7/1999 |
| JP | 2000-021717 A | 1/2000 |
| JP | 2004-158472 A | 6/2004 |
| JP | 2006-088163 A | 4/2006 |
| JP | 2016-522443 A | 7/2016 |
| WO | 2016/084755 A1 | 6/2016 |

OTHER PUBLICATIONS

International Preliminary Report on Patentability and Written Opinion issued in PCT/JP2016/086057; dated Jun. 11, 2019.

An Office Action mailed by China National Intellectual Property Administration dated Aug. 19, 2020, which corresponds to Chinese Patent Application No. 201680090475.1 and is related to U.S. Appl. No. 16/402,270 with English language translation.

An Office Action mailed by the Japanese Patent Office dated Nov. 10, 2020, which corresponds to Japanese Patent Application No. 2018-555336 and is related to U.S. Appl. No. 16/402,270 with English language translation.

* cited by examiner

LASER APPARATUS

CROSS-REFERENCE TO RELATED APPLICATIONS

The present application is a continuation application of International Application No. PCT/JP2016/086057 filed on Dec. 5, 2016. The content of the application is incorporated herein by reference in its entirety.

BACKGROUND

1. Technical Field

The present disclosure relates to a laser apparatus.

2. Related Art

In recent years, improvements in resolution of semiconductor exposure devices (hereinafter referred to as "exposure devices") have been desired due to miniaturization and high integration of semiconductor integrated circuits. For this purpose, exposure light sources that emit light with shorter wavelengths have been developed. Generally, as the exposure light source, a gas laser apparatus is used instead of a conventional mercury lamp. For example, as the gas laser apparatus for exposure, a KrF excimer laser apparatus that outputs an ultraviolet laser beam with a wavelength of 248 nm and an ArF excimer laser apparatus that outputs an ultraviolet laser beam with a wavelength of 193 nm are used.

As next-stage exposure technology, immersion exposure with a space between an exposure lens of an exposure device and a wafer being filled with a liquid is practically used. In the immersion exposure, an apparent wavelength of light from an exposure light source is reduced because a refractive index changes between the exposure lens and the wafer. When the immersion exposure is performed using the ArF excimer laser apparatus as the exposure light source, the wafer is irradiated with ultraviolet light with a wavelength of 134 nm in water. This technology is referred to as ArF immersion exposure (or ArF immersion lithography).

The KrF excimer laser apparatus and the ArF excimer laser apparatus have a large width of spontaneous oscillation in the range of about 350 to 400 pm. Thus, if a projection lens is made of a material that transmits ultraviolet light such as KrF and ArF laser beams, chromatic aberration may occur. This may reduce resolution. Thus, a spectrum line width of the laser beam output from the gas laser apparatus needs to be narrowed to the extent that the chromatic aberration can be ignored. For this purpose, a line narrowing module (LNM) having a line narrowing element (etalon, grating, etc.) may be provided to narrow the spectrum line width in a laser resonator of the gas laser apparatus. A laser apparatus in which a spectrum line width is narrowed is hereinafter referred to as a line narrowing laser apparatus.

LIST OF DOCUMENTS

Patent Documents

Patent Document 1: National Publication of International Patent Application No. 2016-522443

SUMMARY

A first laser apparatus of the present disclosure includes: a laser chamber including a pair of electrodes and configured to emit, at each of a plurality of pulse repetition frequencies, a pulse laser beam having a pulse energy corresponding to a voltage applied between the electrodes; an energy detector provided on an optical path of the pulse laser beam and configured to detect the pulse energy of the pulse laser beam; a voltage control unit configured to control the applied voltage based on a target pulse energy and the pulse energy detected by the energy detector; and a pulse energy control unit configured to periodically vary the target pulse energy at modulation frequencies corresponding to the pulse repetition frequencies with a reference energy being a center of variation.

A second laser apparatus of the present disclosure includes: a laser chamber including a pair of electrodes and configured to emit, at a predetermined pulse repetition frequency, a pulse laser beam having a pulse energy corresponding to a voltage applied between the electrodes; an energy detector provided on an optical path of the pulse laser beam and configured to detect the pulse energy of the pulse laser beam; a voltage control unit configured to control the applied voltage based on a target pulse energy and the pulse energy detected by the energy detector; and a pulse energy control unit configured to periodically vary the target pulse energy at a predetermined modulation frequency with each of a plurality of reference energies being a center of variation.

A third laser apparatus of the present disclosure includes: a laser chamber including a pair of electrodes and configured to emit, at a predetermined pulse repetition frequency, a pulse laser beam having a pulse energy corresponding to a voltage applied between the electrodes; an energy detector provided on an optical path of the pulse laser beam and configured to detect the pulse energy of the pulse laser beam; a voltage control unit configured to control the applied voltage based on a target pulse energy and the pulse energy detected by the energy detector; and a pulse energy control unit configured to periodically vary the target pulse energy at modulation frequencies corresponding to a plurality of reference energies with each of the reference energies being a center of variation.

BRIEF DESCRIPTION OF THE DRAWINGS

With reference to the accompanying drawings, some embodiments of the present disclosure will be described below merely by way of example.

DESCRIPTION OF EMBODIMENTS

Figure 1:
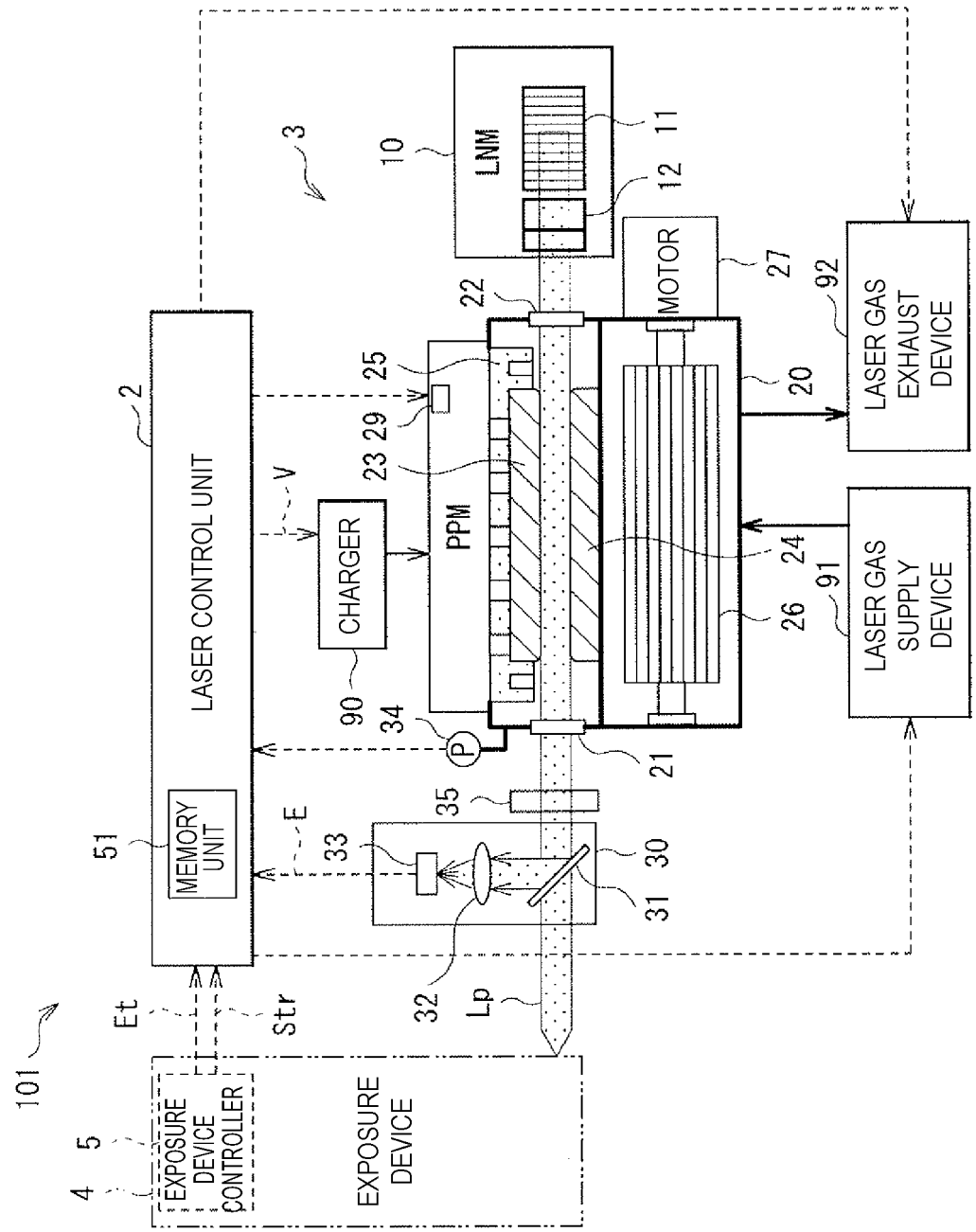
FIG. 1 schematically shows an exemplary configuration of a laser apparatus according to Comparative Example 1.

<Contents>
<1. Comparative Example> (laser apparatus that performs energy control using control gain)
  1.1 Comparative Example 1 (FIGS. 1 to 8)
    1.1.1 Configuration of Comparative Example 1
    1.1.2 Operation of Comparative Example 1
    1.1.3 Problem of Comparative Example 1
  1.2 Comparative Example 2 (FIGS. 9 to 14)
    1.2.1 Configuration of Comparative Example 2
    1.2.2 Operation of Comparative Example 2
    1.2.3 Problem of Comparative Example 2
<2. Embodiment 1> (laser apparatus using a plurality of control gains corresponding to values of target pulse energies) (FIGS. 15 to 20)
  2.1 Configuration
  2.2 Operation
  2.3 Effect
<3. Embodiment 2> (laser apparatus using a plurality of control gains corresponding to values of target pulse energies and values of modulation frequencies) (FIGS. 21 to 25)
  3.1 Configuration
  3.2 Operation
  3.3 Effect
<4. Embodiment 3> (laser apparatus using a plurality of control gains corresponding to values of pulse repetition frequencies) (FIGS. 26 to 32)
  4.1 Configuration
  4.2 Operation
  4.3 Effect
<5. Embodiment 4> (laser apparatus using a plurality of control gains corresponding to values of target pulse energies and values of pulse repetition frequencies) (FIGS. 33 to 48)
  5.1 Configuration
  5.2 Operation
  5.3 Effect <6. Embodiment 5> (laser apparatus including MOPO system)
 6.1 Configuration (FIG. 49)
 6.2 Operation
 6.3 Effect
<7. Others>

Now, with reference to the drawings, embodiments of the present disclosure will be described in detail.

The embodiments described below illustrate some examples of the present disclosure, and do not limit contents of the present disclosure. Also, all configurations and operations described in the embodiments are not necessarily essential as configurations and operations of the present disclosure.

The same components are denoted by the same reference numerals, and overlapping descriptions are omitted.

<1. Comparative Example> (Laser Apparatus that Performs Energy Control Using Control Gain)

1.1 Comparative Example 1

[1.1.1 Configuration of Comparative Example 1]

FIG. 1 schematically shows an exemplary configuration of a laser apparatus 101 according to Comparative Example 1 with respect to embodiments of the present disclosure.

The laser apparatus 101 according to Comparative Example 1 may be an excimer laser apparatus that outputs a pulse laser beam Lp toward an exposure device 4. The laser apparatus 101 includes a laser control unit 2, a laser oscillator system 3, a laser gas supply device 91, and a laser gas exhaust device 92.

The laser oscillator system 3 may include a laser resonator, a laser chamber 20, a pulse power module (PPM) 28, a pulse energy detector 30, and a charger 90.

The laser chamber 20 may include windows 21, 22 that transmit a laser beam, a pair of discharge electrodes 23, 24, an electrical insulating member 25, a cross flow fan (CFF) 26, a motor 27, and a pressure sensor 34. The laser chamber 20 may include a heat exchanger (not shown).

The laser chamber 20 emits, at a set predetermined pulse repetition frequency Rp, a pulse laser beam Lp having a pulse energy E corresponding to a voltage applied between the discharge electrodes 23, 24. The voltage applied between the discharge electrodes 23, 24 may correspond to a charging voltage V of the charger 90.

The laser resonator may include an output coupling mirror 35 as an output coupler (OC) and a line narrowing module (LNM) 10. The laser resonator may have two slits (not shown). The laser chamber 20 may be arranged so that a discharge region of the discharge electrodes 23, 24 is located on an optical path of the laser resonator.

The line narrowing module 10 may include a prism 12 that expands the laser beam and a grating 11. The prism 12 may be arranged so that the laser beam output from the laser chamber 20 is expanded by the prism 12 and enters the grating 11 at a predetermined angle. The grating 11 may be provided in a littrow arrangement with an incident angle of the laser beam being equal to a diffraction angle.

The output coupling mirror 35 may be a partial reflection mirror coated with a multilayer film that reflects some of the laser beam generated in the laser chamber 20 and transmits other of the laser beam.

The pulse energy detector 30 is provided on an optical path of the pulse laser beam Lp, and detects a pulse energy E of the pulse laser beam Lp. The pulse energy detector 30 includes a beam splitter 31, a condenser lens 32, and an optical sensor 33 that detects the pulse energy E.

The beam splitter 31 may be arranged on the optical path of the pulse laser beam Lp output from the output coupling mirror 35. The condenser lens 32 may be arranged on the optical path of the pulse laser beam Lp reflected by the beam splitter 31. The optical sensor 33 may be arranged near a light concentration position of the condenser lens 32.

The pulse power module 28 includes a switch 29 for causing discharge of the discharge electrodes 23, 24, and may be connected via the electrical insulating member 25 to one discharge electrode 23. The other discharge electrode 24 may be connected to the grounded laser chamber 20. The pulse power module 28 may include a charging capacitor (not shown).

The charger 90 and the pulse power module 28 may be electrically connected to each other so as to charge the charging capacitor in the pulse power module 28. The charger 90 may receive data indicating the charging voltage V from the laser control unit 2. The charging voltage V may be a voltage for charging the charging capacitor. The charging voltage V may be controlled by the laser control unit 2 based on the pulse energy E measured by the pulse energy detector 30. The charging voltage V may correspond to the voltage applied between the discharge electrodes 23, 24.

An oscillation trigger signal Str and a target pulse energy Et may be input from an exposure device controller 5 in the exposure device 4 to the laser control unit 2. The laser control unit 2 and the pulse power module 28 may be electrically connected to each other so that the switch 29 is turned on/off in synchronization with the oscillation trigger signal Str.

The laser control unit 2 may include a memory unit 51 that stores various data. The memory unit 51 may store, as the various data, the target pulse energy Et, data on the pulse energy E measured by the pulse energy detector 30, data indicating the charging voltage V, or the like. The memory unit 51 may store a control gain Gc for energy control of the pulse laser beam Lp, a pulse repetition frequency Rp used for calculation of the control gain Gc, and data on the number of oscillation pulses Np. The memory unit 51 may store data on other setting values used for calculation of the control gain Gc.

The laser control unit 2 may be a voltage control unit that controls the voltage applied between the discharge electrodes 23, 24 based on the target pulse energy Et and the pulse energy E detected by the pulse energy detector 30.

The laser control unit 2 may be a gain calculation unit that calculates the control gain Gc. The laser control unit 2 controls the charging voltage V using the control gain Gc to control the energy of the pulse laser beam Lp output from the laser chamber 20.

The laser gas supply device 91 may include a gas cylinder (not shown) that supplies a laser gas into the laser chamber 20, and a supply valve (not shown) as a flow control valve that controls supply of the laser gas from the gas cylinder. The laser gas may contain, for example, Ar or Kr as a rare gas. The laser gas may contain, for example, an $F_2$ gas as a halogen gas. The laser gas may contain, for example, Ne or He as a buffer gas. The laser gas may contain a mixture of those gases. For example, the laser gas may contain a mixture of Ar and Ne or a mixture of Ar and Ne and $F_2$.

The laser gas exhaust device 92 may be configured to exhaust the laser gas out of the laser chamber 20. The laser gas exhaust device 92 may include an exhaust valve (not shown) and an exhaust pump (not shown).

[1.1.2 Operation of Comparative Example 1]

The laser control unit 2 may receive the oscillation trigger signal Str and the target pulse energy Et from the exposure device controller 5 in the exposure device 4. The laser control unit 2 may set the charging voltage V for the charger 90 to reach the target pulse energy Et. The laser control unit 2 may operate the switch 29 of the pulse power module 28 in synchronization with the oscillation trigger signal Str. Thus, in the laser chamber 20, a high voltage corresponding to the charging voltage V is applied between the discharge electrodes 23, 24, and the laser gas may be dielectrically broken down in the discharge region between the discharge electrodes 23, 24 to cause discharge. As a result, the laser gas is excited in the laser chamber 20, and laser oscillation may occur between the line narrowing module 10 and the output coupling mirror 35 that constitute the laser resonator. The pulse laser beam Lp with a line width narrowed by the prism 12 and the grating 11 of the line narrowing module 10 may be output from the output coupling mirror 35. At this time, the two slits (not shown) in the laser resonator may limit a laser oscillation region.

The laser apparatus 101 may be a laser apparatus that outputs spontaneous oscillation light rather than the line narrowing laser apparatus. For example, a high reflection mirror may be arranged instead of the line narrowing module 10.

The pulse laser beam Lp output from the output coupling mirror 35 may be partially reflected toward the optical sensor 33 by the beam splitter 31 as sample light for detecting the pulse energy E. The pulse energy detector 30 may send data on the detected pulse energy E to the laser control unit 2. On the other hand, the pulse laser beam Lp having passed through the beam splitter 31 may enter the exposure device 4.

The laser control unit 2 may cause the memory unit 51 to store data on the charging voltage V and the pulse energy E when the pulse laser beam Lp is output.

The laser control unit 2 may perform feedback control of the charging voltage V to reach the target pulse energy Et based on a difference ΔE between the target pulse energy Et and the actually output pulse energy E.

When the charging voltage V becomes higher than a maximum value in an allowable range, the laser control unit 2 may control the laser gas supply device 91 to supply the laser gas into the laser chamber 20 to reach predetermined pressure. When the charging voltage V becomes lower than a minimum value in the allowable range, the laser control unit 2 may control the laser gas exhaust device 92 to exhaust the laser gas out of the laser chamber 20 to reach the predetermined pressure.

In the laser apparatus 101, the memory unit 51 may store data on the charging voltage V and the pulse energy E when the target pulse energy Et is changed stepwise with the laser apparatus 101 having control. From a relationship ΔV/ΔE between the pulse energy E and the charging voltage V at this time, a control gain Gc used for the feedback control may be newly calculated.

(Specific Example of Energy Control in Comparative Example 1)

For a discharge excited excimer laser, the pulse energy E increases with increasing charging voltage V, and the pulse energy E decreases with decreasing charging voltage V. According to this characteristic, the laser control unit 2 controls the charging voltage V so that the pulse energy E of the pulse laser beam Lp reaches the target energy Et. The control gain Gc used for the energy control is determined by a product of ΔV/ΔE determined according to the characteristic of the laser and coefficient Gs as expressed by an equation below:

$$Gc = Gs \cdot \Delta V / \Delta E$$

A desirable value of the coefficient Gs is, for example, 0.3 to 1 so as to prevent divergence of the control. A parameter of an initial value of the control gain Gc is previously set. The parameter of the initial value of the control gain Gc may be in the range of, for example, 0.1 to 2. The control gain Gc may be calculated according to a flowchart shown in FIG. 3 described later.

Figure 2:
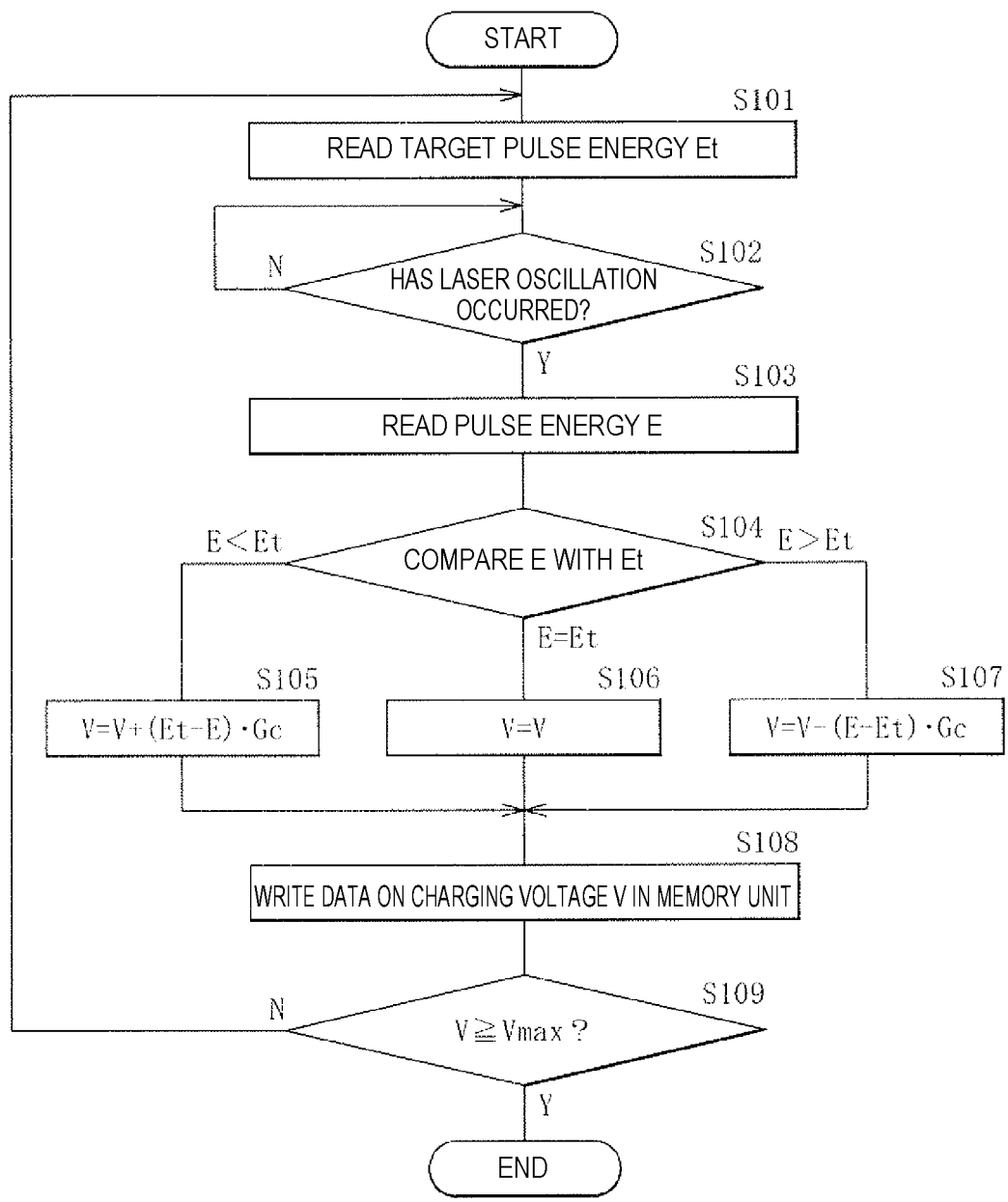
FIG. 2 is a flowchart of an example of control of a pulse energy by a laser control unit in the laser apparatus according to Comparative Example 1.

FIG. 2 is a flowchart of an example of control of the pulse energy E by the laser control unit 2 in the laser apparatus 101 according to Comparative Example 1.

The laser control unit 2 first reads the target pulse energy Et from the exposure device controller 5 or the memory unit 51 (step S101). Then, the laser control unit 2 determines whether or not laser oscillation has occurred (step S102). When determining that the laser oscillation has not occurred (step S102; N), the laser control unit 2 repeats the process in step S102.

When determining that the laser oscillation has occurred (step S102; Y), the laser control unit 2 reads a value of the pulse energy E from the pulse energy detector 30 (step S103).

Next, the laser control unit 2 compares the pulse energy E with the target pulse energy Et (step S104). When determining that the pulse energy E is substantially equal to the target pulse energy Et (E=Et), the laser control unit 2 takes data on the current charging voltage V as it is as data on the charging voltage V (step S106), and writes the data in the memory unit 51 (step S108).

When determining that the pulse energy E is lower than the target pulse energy Et (E<Et), the laser control unit 2 adds a value obtained by multiplying a difference (Et−E) between the target pulse energy Et and the pulse energy E by the control gain Gc to the charging voltage V to obtain a new charging voltage V as expressed by an equation below (step S105), and writes data on the charging voltage V in the memory unit 51 (step S108).

$$V = V + (Et - E) \cdot Gc$$

When determining that the pulse energy E is higher than the target pulse energy Et (E>Et), the laser control unit 2 subtracts a value obtained by multiplying a difference (E−Et) between the pulse energy E and the target pulse energy Et by the control gain Gc from the charging voltage V to obtain a new charging voltage V as expressed by an equation below (step S107), and writes data on the charging voltage V in the memory unit 51 (step S108).

$$V = V - (E - Et) \cdot Gc$$

Next, the laser control unit 2 determines whether or not the charging voltage V has reached a predetermined maximum value Vmax or higher (step S109). When determining that the charging voltage V has not reached the predetermined maximum value Vmax or higher (step S109; N), the laser control unit 2 returns to the process in step S101. When determining that the charging voltage V has reached the predetermined maximum value Vmax or higher (step S109; Y), the laser control unit 2 finishes the energy control process.

(Specific Example of Calculation Process of Control Gain in Comparative Example 1)

Figure 3:
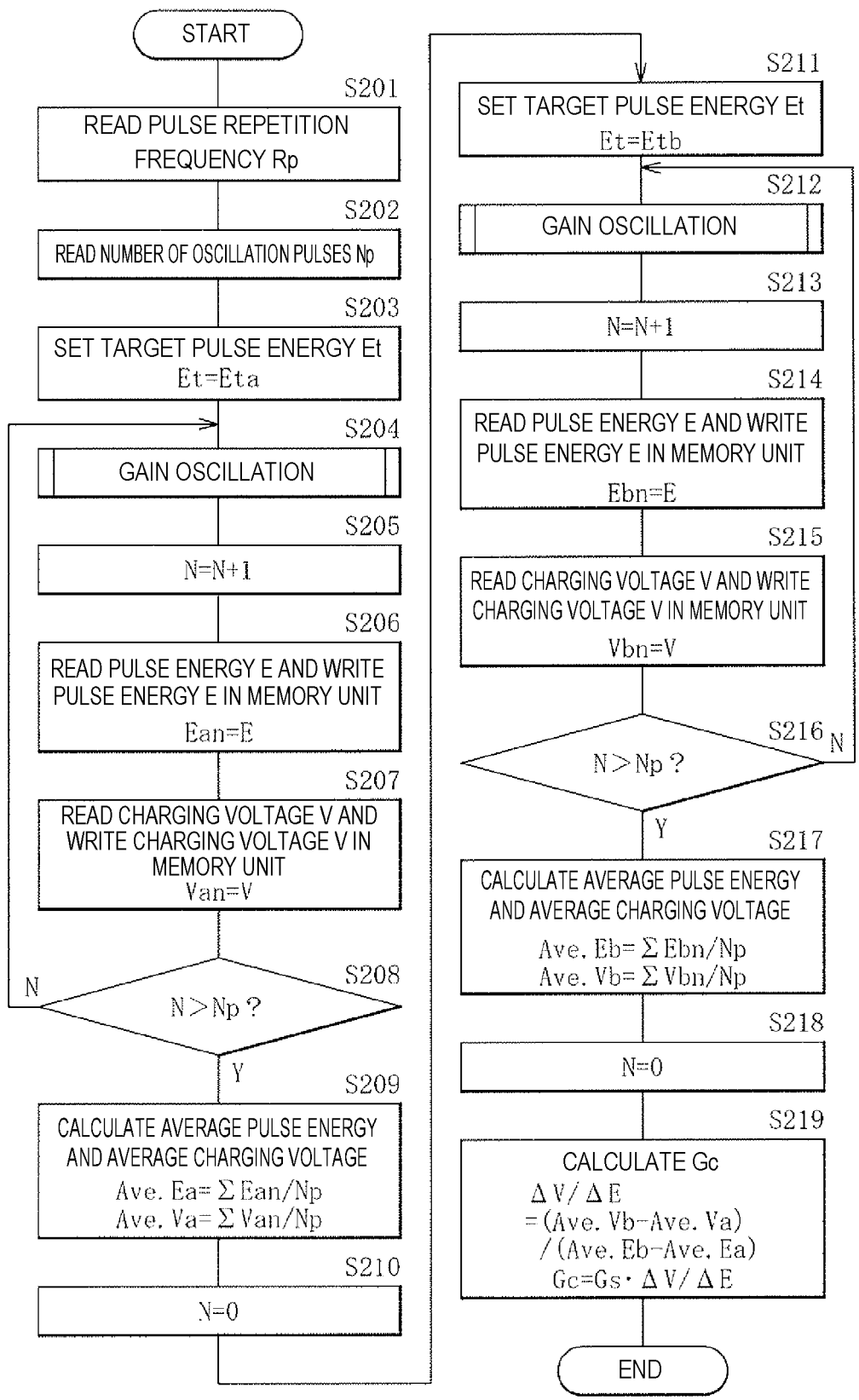
FIG. 3 is a flowchart of an example of a calculation process of a control gain by the laser control unit in the laser apparatus according to Comparative Example 1.

FIG. 3 is a flowchart of an example of a calculation process of the control gain Gc by the laser control unit 2 in the laser apparatus 101 according to Comparative Example 1.

The process in FIG. 3 may be performed, for example, according to an instruction from the exposure device 4, after replacement of a laser gas, or after adjustment of pressure of the laser gas. The process in FIG. 3 may be performed at predetermined intervals.

The laser control unit 2 first reads the pulse repetition frequency Rp from the exposure device controller 5 or the memory unit 51 (step S201). Then, the laser control unit 2 reads the number of oscillation pulses Np from the exposure device controller 5 or the memory unit 51 (step S202). The number of oscillation pulses Np is preferably, for example, 2000 to 5000.

Next, the laser control unit 2 sets the target pulse energy Et to a reference energy Eta (step S203). The laser control unit 2 writes the set target pulse energy Et in the memory unit 51. Next, the laser control unit 2 performs a gain oscillation process (step S204). This gain oscillation process is shown in a subroutine in FIG. 4 described later.

Next, the laser control unit 2 sets a pulse counter value N to N+1 (step S205).

Next, the laser control unit 2 reads the value of the pulse energy E from the pulse energy detector 30, and writes, as Ean, the value of the pulse energy E for an n-th pulse in the memory unit 51 (step S206).

Next, the laser control unit 2 reads the value of the charging voltage V set for the charger 90 from the memory unit 51, and writes, as Van, the value of the charging voltage V for the n-th pulse in the memory unit 51 (step S207).

Next, the laser control unit 2 determines whether or not the pulse counter value N is larger than the number of oscillation pulses Np (step S208). When determining that the pulse counter value N is not larger than the number of oscillation pulses Np (step S208; N), the laser control unit 2 returns to the process in step S204.

When determining that the pulse counter value N is larger than the number of oscillation pulses Np (step S208; Y), the laser control unit 2 calculates an average pulse energy Ave·Ea and an average charging voltage Ave·Va when the target pulse energy Et is set to the reference energy Eta as expressed by equations below (step S209).

$$Ave\cdot Ea = \Sigma Ean/Np$$

$$Ave\cdot Va = \Sigma Van/Np$$

Next, the laser control unit 2 sets the pulse counter value N to 0 (step S210). Next, the laser control unit 2 sets the target pulse energy Et to a reference energy Etb (step S211). The laser control unit 2 writes the set target pulse energy Et in the memory unit 51. Next, the laser control unit 2 performs a gain oscillation process (step S212). The gain oscillation process is shown in the subroutine in FIG. 4 described later.

Next, the laser control unit 2 sets the pulse counter value N to N+1 (step S213).

Next, the laser control unit 2 reads the value of the pulse energy E from the pulse energy detector 30, and writes, as Ebn, the value of the pulse energy E for an n-th pulse in the memory unit 51 (step S214).

Next, the laser control unit 2 reads the value of the charging voltage V set for the charger 90 from the memory unit 51, and writes, as Vbn, the value of the charging voltage V for the n-th pulse in the memory unit 51 (step S215).

Next, the laser control unit 2 determines whether or not the pulse counter value N is larger than the number of oscillation pulses Np (step S216). When determining that the pulse counter value N is not larger than the number of oscillation pulses Np (step S216; N), the laser control unit 2 returns to the process in step S212.

When determining that the pulse counter value N is larger than the number of oscillation pulses Np (step S216; Y), the laser control unit 2 calculates an average pulse energy Ave·Eb and an average charging voltage Ave·Vb when the target pulse energy Et is set to the reference energy Etb (step S217) as expressed by equations below.

$$Ave\cdot Eb = \Sigma Ebn/Np$$

$$Ave\cdot Vb = \Sigma Vbn/Np$$

Next, the laser control unit 2 sets the pulse counter value N to 0 (step S218).

Next, the laser control unit 2 calculates the value of the control gain Gc as expressed by equations below (step S219), and finishes the process.

$$\Delta V/\Delta E = (Ave\cdot Vb - Ave\cdot Va)(Ave\cdot Eb - Ave\cdot Ea)$$

$$Gc = Gs\cdot \Delta V/\Delta E$$

Figure 4:
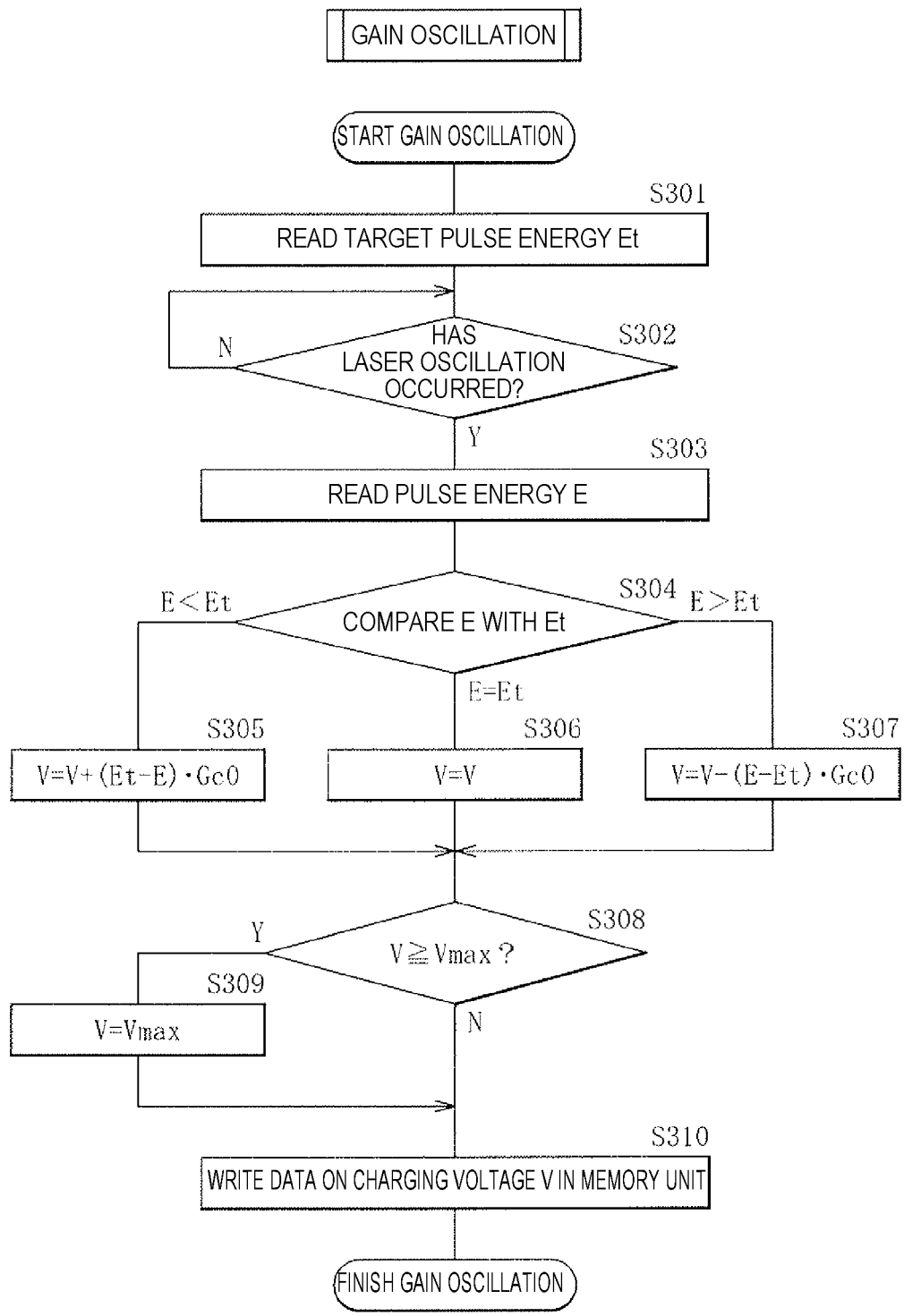
FIG. 4 is a flowchart of an example of a subroutine of gain oscillation in the calculation process of the control gain in FIG. 3.

FIG. 4 is a flowchart of an example of the subroutine of gain oscillation in the calculation process of the control gain in FIG. 3.

The laser control unit 2 first reads the target pulse energy Et from the memory unit 51 (step S301). Next, the laser control unit 2 determines whether or not laser oscillation has occurred (step S302). When determining that the laser oscillation has not occurred (step S302; N), the laser control unit 2 repeats the process in step S302.

When determining that the laser oscillation has occurred (step S302; Y), the laser control unit 2 reads the value of the pulse energy E from the pulse energy detector 30 (step S303).

Next, the laser control unit 2 compares the pulse energy E with the target pulse energy Et (step S304). When determining that the pulse energy E is substantially equal to the target pulse energy Et (E=Et), the laser control unit 2 takes data on the current charging voltage V as it is as data on the charging voltage V (step S306).

When determining that the pulse energy E is lower than the target pulse energy Et (E<Et), the laser control unit 2 adds a value obtained by multiplying a difference (Et−E) between the target pulse energy Et and the pulse energy E by an initial value Gc0 of the control gain Gc to the charging voltage V to obtain a new charging voltage V as expressed by an equation below (step S305).

$$V = V + (Et - E)\cdot Gc0$$

When determining that the pulse energy E is higher than the target pulse energy Et (E>Et), the laser control unit 2 subtracts a value obtained by multiplying a difference (E−Et) between the pulse energy E and the target pulse energy Et by the initial value Gc0 of the control gain Gc from the charging voltage V to obtain a new charging voltage V as expressed by an equation below (step S307).

$$V = V - (E - Et)\cdot Gc0$$

Next, the laser control unit 2 determines whether or not the charging voltage V has reached a predetermined maximum value Vmax or higher (step S308). When determining that the charging voltage V has not reached the predetermined maximum value Vmax or higher (step S308; N), the laser control unit 2 writes data on the charging voltage V in the memory unit 51 (step S310), and finishes the gain oscillation process.

When determining that the charging voltage V has reached the predetermined maximum value Vmax or higher (step S308; Y), the laser control unit 2 takes the maximum value Vmax as the charging voltage V (step S309), writes data on the charging voltage V in the memory unit 51 (step S310), and finishes the gain oscillation process.

The initial value Gc0 of the control gain Gc may be, for example, 0.1 to 2. After the control gain Gc is calculated, the initial value Gc0 may be set to the calculated value (Gc0=Gc).

Figure 5:
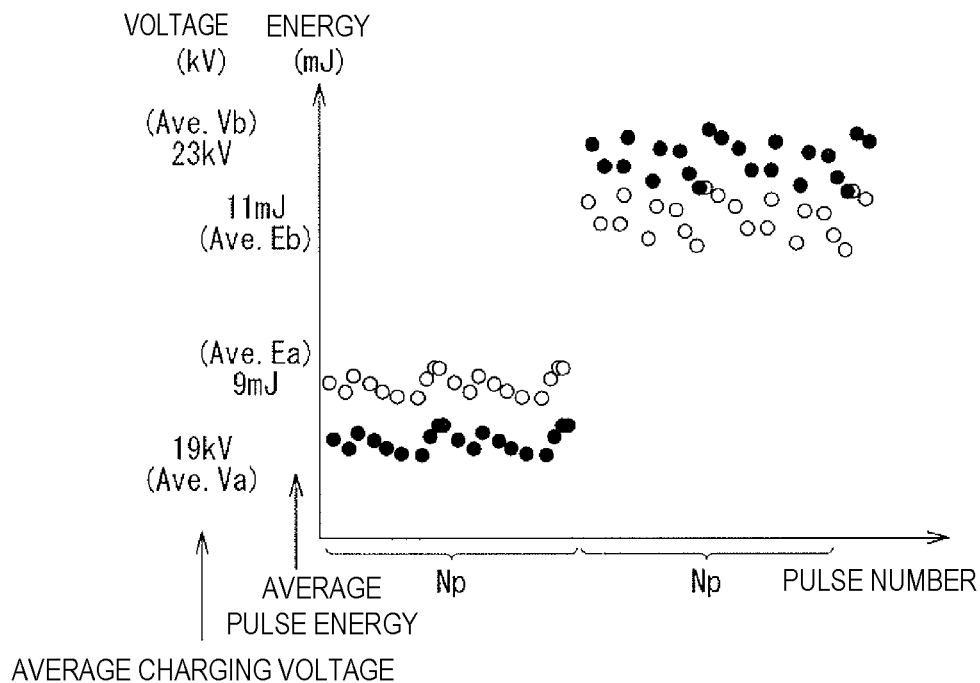
FIG. 5 shows a first example of measurement values of a pulse energy and a charging voltage for each pulse in the laser apparatus according to Comparative Example 1.
Figure 6:
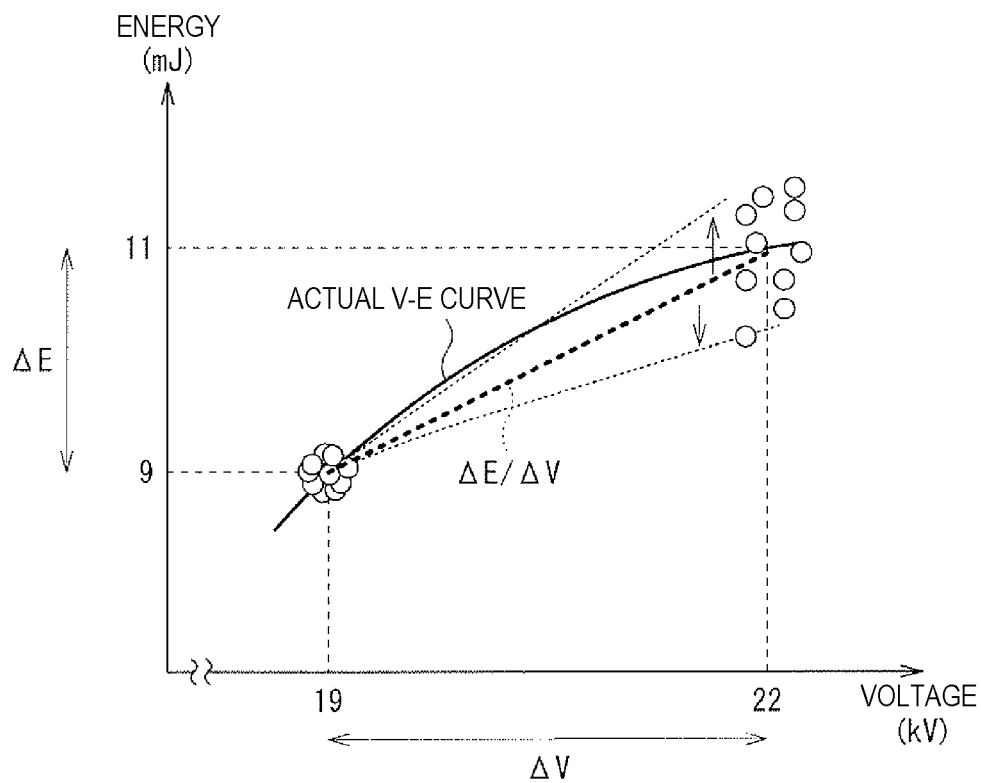
FIG. 6 shows a first example of changes in the pulse energy with respect to changes in the charging voltage in the laser apparatus according to Comparative Example 1.

FIG. 5 shows a first example of measurement values of the pulse energy E and the charging voltage V for each pulse in the laser apparatus 101 according to Comparative Example 1. FIG. 6 shows a first example of changes in the pulse energy E with respect to changes in the charging voltage V in the laser apparatus 101 according to Comparative Example 1. In FIG. 5, the horizontal axis represents pulse number of the pulse laser beam Lp and the vertical axis represents pulse energy E (mJ) and charging voltage V (kV). In FIG. 6, the horizontal axis represents charging voltage V (kV) and the vertical axis represents pulse energy E (mJ).

In the example in FIG. 5, according to calculation in step S209 in FIG. 3, the average pulse energy Ave·Ea is 9 mJ, and the average charging voltage Ave·Va is 19 kV. According to calculation in step S217 in FIG. 3, the average pulse energy Ave·Eb is 11 mJ and the average charging voltage Ave·Vb is 23 kV.

An inverse proportion of a linear tilt ΔE/ΔV in FIG. 6 corresponds to ΔV/ΔE calculated in step S219 in FIG. 3. As shown in FIG. 6, there is a deviation between the tilt ΔE/ΔV and a relationship curve V-E of the actual charging voltage V and pulse energy E. The tilt ΔE/ΔV may change according to variations in the pulse energy E. This also causes a deviation of ΔV/ΔE calculated in step S219 in FIG. 3, which may reduce calculation accuracy of the control gain Gc.

Figure 7:
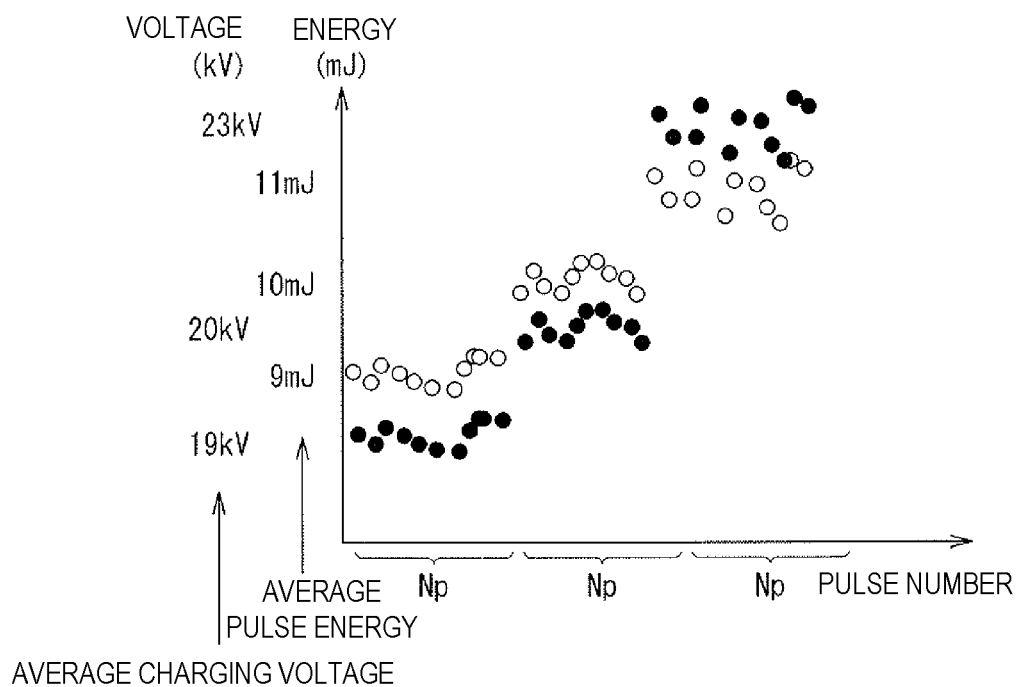
FIG. 7 shows a second example of measurement values of a pulse energy and a charging voltage for each pulse in the laser apparatus according to Comparative Example 1.
Figure 8:
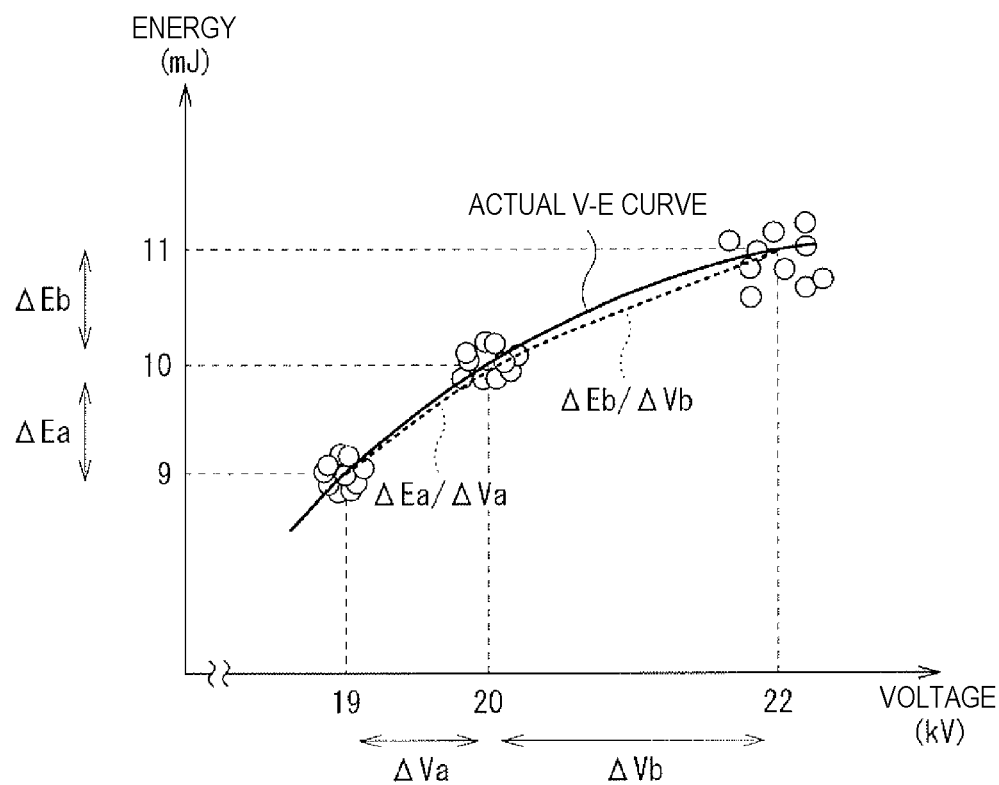
FIG. 8 shows a second example of changes in the pulse energy with respect to changes in the charging voltage in the laser apparatus according to Comparative Example 1.

FIG. 7 shows a second example of measurement values of the pulse energy E and the charging voltage V for each pulse in the laser apparatus 101 according to Comparative Example 1. FIG. 8 shows a second example of changes in the pulse energy E with respect to changes in the charging voltage V in the laser apparatus 101 according to Comparative Example 1. In FIG. 7, the horizontal axis represents pulse number of the pulse laser beam Lp and the vertical axis represents pulse energy E (mJ) and charging voltage V (kV). In FIG. 8, the horizontal axis represents charging voltage V (kV) and the vertical axis represents pulse energy E (mJ).

In the laser apparatus 101 according to Comparative Example 1, a plurality of control gains Gca, Gcb corresponding to values of target pulse energies Et may be calculated, for example as expressed below:

$$Et \leq 10: Gca = Gs \cdot \Delta Va / \Delta Ea$$

$$Et > 10: Gcb = Gs \cdot \Delta Vb / \Delta Eb$$

For example, as shown in FIG. 7, in the laser apparatus 101, the gain oscillation may be performed in three separate stages to calculate three average pulse energies and three average charging voltages. In this case, the control gain Gca may be calculated based on an inverse proportion (ΔVa/ΔEa) of a linear tilt ΔEa/ΔVa in FIG. 8. Also, the control gain Gcb may be calculated based on an inverse proportion (ΔVb/ΔEb) of a linear tilt ΔEb/ΔVb in FIG. 8.

[1.1.3 Problem of Comparative Example 1]

As described above, in the laser apparatus 101 according to Comparative Example 1, the charging voltage V and the pulse energy E are changed stepwise to calculate the control gain Gc. In this case, calculation accuracy may be reduced due to variations in the pulse energy E. If averaging is performed with an increased number of pulses in calculation of the control gain Gc to improve the calculation accuracy of the control gain Gc, calculation time may increase. Thus, a development for technology of accurately calculating the control gain Gc in a short time is desired.

1.2 Comparative Example 2

[1.2.1 Configuration of Comparative Example 2]

Figure 9:
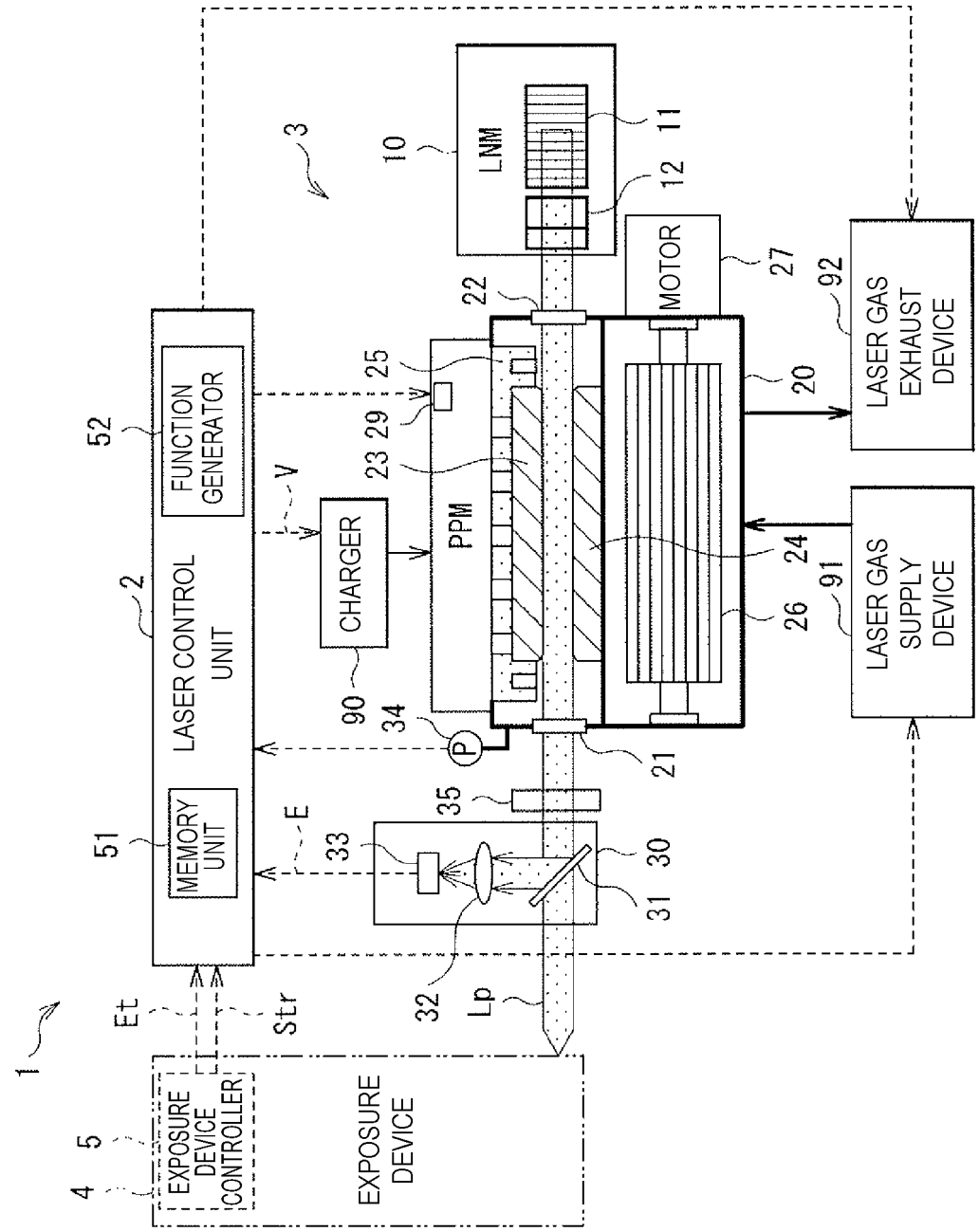
FIG. 9 schematically shows an exemplary configuration of a laser apparatus according to Comparative Example 2.

FIG. 9 schematically shows an exemplary configuration of a laser apparatus 1 according to Comparative Example 2.

The laser apparatus 1 according to Comparative Example 2 includes a function generator 52 added to the laser control unit 2 in the laser apparatus 101 according to Comparative Example 1.

As described later, in the laser apparatus 1, when performing a calculation process of a control gain Gc, the laser control unit 2 uses the function generator 52 to periodically vary a target pulse energy Et at a modulation frequency Fm with a predetermined reference energy being a center of variation.

The function of the function generator 52 may be achieved by hardware, or by the laser control unit 2 executing a program corresponding to the function of the function generator 52.

Other configurations may be substantially similar to those of the laser apparatus 101 according to Comparative Example 1.

[1.2.2 Operation of Comparative Example 2]

Figure 10:
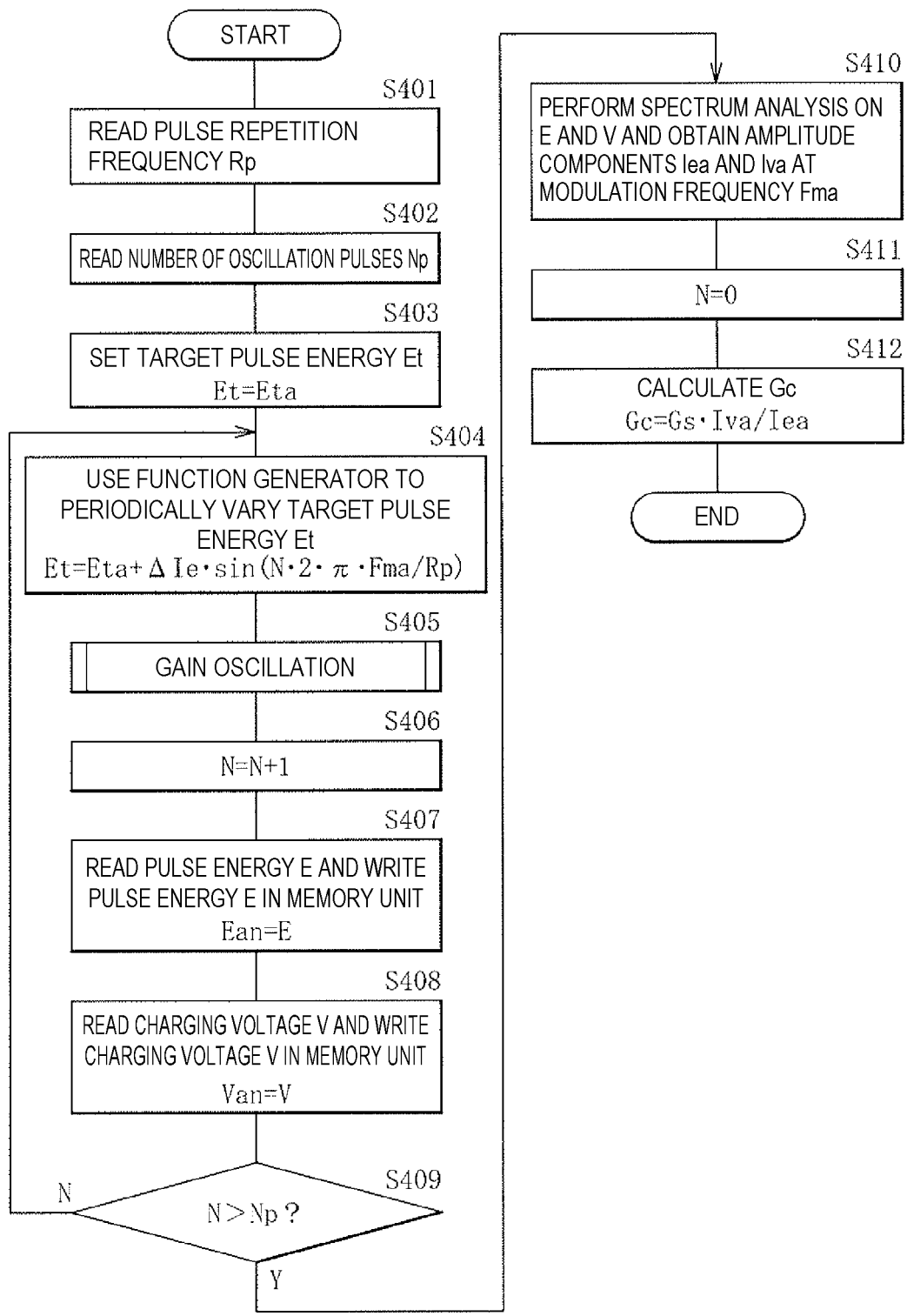
FIG. 10 is a flowchart of an example of a calculation process of a control gain by a laser control unit in the laser apparatus according to Comparative Example 2.

In the laser apparatus 1, a memory unit 51 stores data on a pulse energy E and a charging voltage V when the target pulse energy Et is periodically varied at the modulation frequency Fm with the laser apparatus 1 having control. The laser apparatus 1 performs a spectrum analysis on a data row of the stored pulse energy E and charging voltage V. The spectrum analysis may use Fourier analysis, discrete Fourier analysis, fast Fourier analysis, or the like. The laser apparatus 1 calculates an amplitude component Ie of the pulse energy E at the modulation frequency Fm and an amplitude component Iv of the charging voltage V. The laser apparatus 1 calculates the control gain Gc based on a relationship Iv/Ie between the amplitude component Ie and the amplitude component Iv at that time. With reference to FIG. 10, a specific calculation process will be described below.

(Specific Example of Calculation Process of Control Gain in Comparative Example 2)

FIG. 10 is a flowchart of an example of a calculation process of the control gain Gc by the laser control unit 2 in the laser apparatus 1 according to Comparative Example 2.

The process in FIG. 10 may be performed, for example, according to an instruction from an exposure device 4, after replacement of a laser gas, or after adjustment of pressure of the laser gas. The process in FIG. 10 may be performed at predetermined intervals.

The laser control unit 2 first reads a pulse repetition frequency Rp from an exposure device controller 5 or the memory unit 51 (step S401). Then, the laser control unit 2 reads the number of oscillation pulses Np from the exposure device controller 5 or the memory unit 51 (step S402). The number of oscillation pulses Np is preferably, for example, 400 to 1500. The number of oscillation pulses Np is more preferably a power of 2 such as 512 or 1024.

Next, the laser control unit 2 sets the target pulse energy Et to a reference energy Eta (step S403). The laser control unit 2 writes the set target pulse energy Et in the memory unit 51.

Next, the laser control unit 2 uses the function generator 52 to periodically vary the target pulse energy Et with the reference energy Eta being the center of variation as expressed by an equation below (step S404). Fma is a modulation frequency of the target pulse energy Et. Rp/Fma is desirably an integer. Rp/Fma is desirably in the range of 4 to 10. An amplitude ΔIe is desirably in the range of 0.5 mJ to 2 mJ. The amplitude ΔIe may be determined by a ratio to the reference energy Eta. For example, ΔIe may be 5% to 10% of Eta.

$$Et = Eta + \Delta Ie \cdot \sin(N \cdot 2 \cdot \pi Fma/Rp)$$

Next, the laser control unit 2 performs a gain oscillation process (step S405). This gain oscillation process may be substantially similar to, for example, the subroutine in FIG. 4.

Next, the laser control unit 2 sets a pulse counter value N to N+1 (step S406).

Next, the laser control unit 2 reads the value of the pulse energy E from the pulse energy detector 30, and writes, as Ean, the value of the pulse energy E for an n-th pulse in the memory unit 51 (step S407).

Next, the laser control unit 2 reads the value of the charging voltage V set for a charger 90 from the memory unit 51, and writes, as Van, the value of the charging voltage V for the n-th pulse in the memory unit 51 (step S408).

Next, the laser control unit 2 determines whether or not the pulse counter value N is larger than the number of oscillation pulses Np (step S409). When determining that the pulse counter value N is not larger than the number of oscillation pulses Np (step S409; N), the laser control unit 2 returns to the process in step S404.

When determining that the pulse counter value N is larger than the number of oscillation pulses Np (step S409; Y), the laser control unit 2 performs a spectrum analysis on a data row of the stored pulse energy E and charging voltage V, and obtains an amplitude component Iea of the pulse energy E at the modulation frequency Fma and an amplitude component Iva of the charging voltage V at the modulation frequency Fma (step S410). The spectrum analysis may use Fourier transform, discrete Fourier transform, fast Fourier transform, or the like.

Next, the laser control unit 2 sets the pulse counter value N to 0 (step S411).

Next, the laser control unit 2 calculates the value of the control gain Gc as expressed by an equation below (step S412), and finishes the process. A desirable value of coefficient Gs is, for example, 0.3 to 1 so as to prevent divergence of the control.

$$Gc = Gs \cdot \Delta V / \Delta E = Gs \cdot Iva/Iea$$

Figure 11:
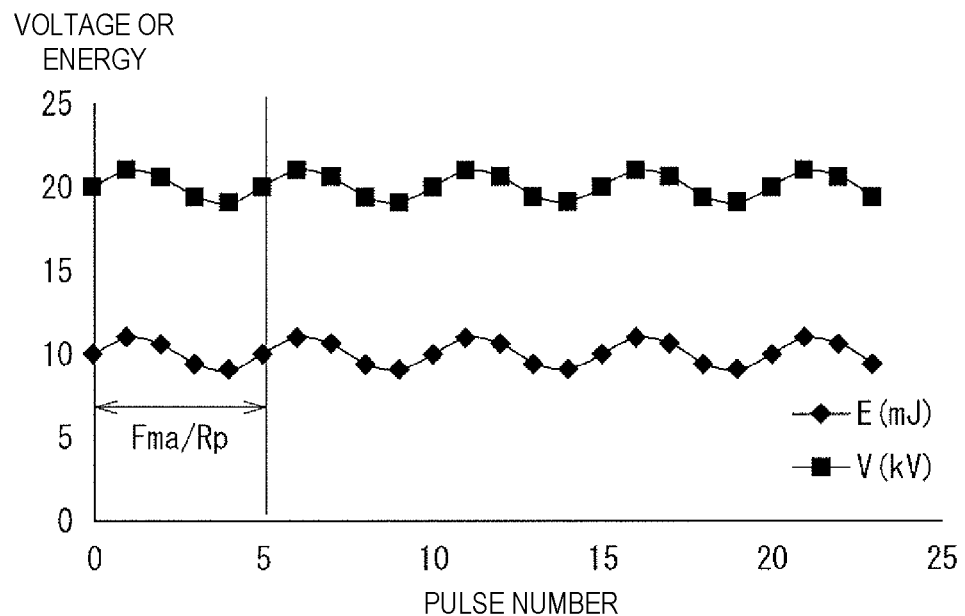
FIG. 11 shows an example of measurement values of a pulse energy and a charging voltage for each pulse in the laser apparatus according to Comparative Example 2.
Figure 12:
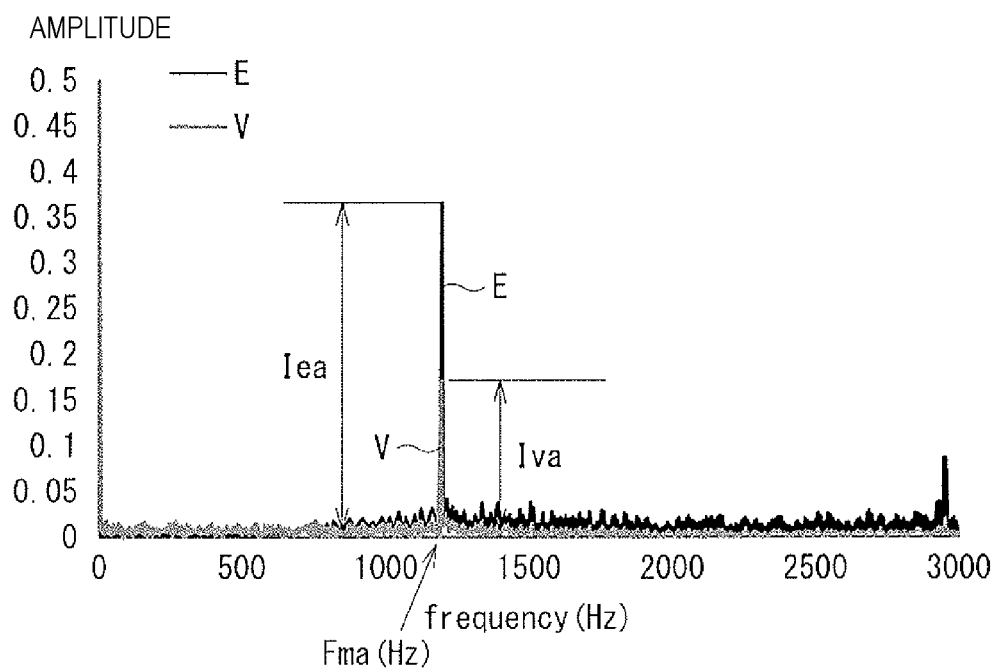
FIG. 12 shows an example of a result of a spectrum analysis on the pulse energy and the charging voltage in FIG. 11.

FIG. 11 shows an example of measurement values of the pulse energy E and the charging voltage V for each pulse in the laser apparatus 1 according to Comparative Example 2. FIG. 12 shows an example of a result of the spectrum analysis on the pulse energy E and the charging voltage V in FIG. 11. In FIG. 11, the horizontal axis represents pulse number of the pulse laser beam Lp and the vertical axis represents pulse energy E (mJ) or charging voltage V (kV). In Comparative Example 2, the horizontal axis in FIG. 11 corresponds to time since the pulse repetition frequency Rp is constant. In FIG. 12, the horizontal axis represents frequency (Hz) and the vertical axis represents amplitude value.

The spectrum analysis process in step S410 in FIG. 10 obtains the amplitude components Iea, Iva, for example, as shown in FIG. 12.

Other operations may be substantially similar to those of the laser apparatus 101 according to Comparative Example 1.

[1.2.3 Problem of Comparative Example 2]

Figure 13:
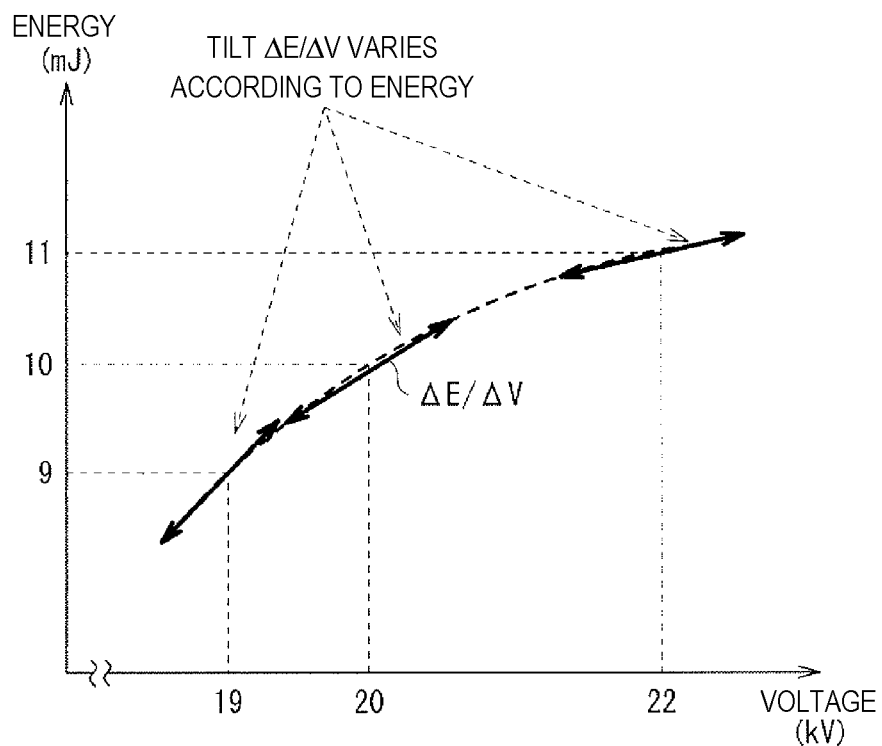
FIG. 13 shows a first example of changes in the pulse energy with respect to changes in the charging voltage in the laser apparatus according to Comparative Example 2.
Figure 14:
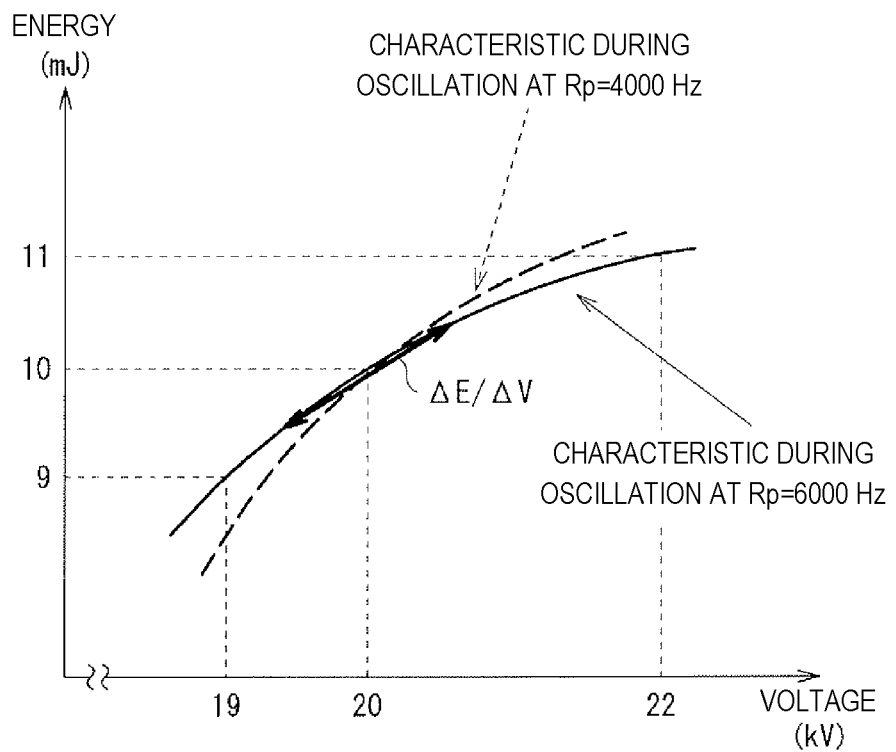
FIG. 14 shows a second example of changes in the pulse energy with respect to changes in the charging voltage in the laser apparatus according to Comparative Example 2.

FIG. 13 shows a first example of changes in the pulse energy E with respect to changes in the charging voltage V in the laser apparatus 1 according to Comparative Example 2. FIG. 14 shows a second example of changes in the pulse energy E with respect to changes in the charging voltage V in the laser apparatus 1 according to Comparative Example 2. In FIGS. 13 and 14, the horizontal axis represents charging voltage V (kV) and the vertical axis represents pulse energy E (mJ). FIG. 14 shows a characteristic during oscillation at a pulse repetition frequency Rp=4000 Hz and a characteristic during oscillation at Rp=6000 Hz.

An inverse proportion of a linear tilt ΔE/ΔV in FIGS. 13 and 14 corresponds to Iva/Iea for the control gain Gc calculated in step S412 in FIG. 10.

As shown in FIG. 13, the tilt ΔE/ΔV varies according to the value of the pulse energy E, and calculating the control gain Gc based on one target pulse energy Et may reduce accuracy of the energy control. Thus, a plurality of control gains Gc corresponding to the values of the target pulse energies Et are desirably calculated.

As shown in FIG. 13, the tilt ΔE/ΔV varies according to the value of the pulse repetition frequency Rp, and calculating the control gain Gc based on one pulse repetition frequency Rp may reduce accuracy of the energy control. Thus, a plurality of control gains Gc corresponding to values of a plurality of pulse repetition frequencies Rp are desirably calculated.

<2. Embodiment 1> (Laser Apparatus Using a Plurality of Control Gains Corresponding to Values of Target Pulse Energies)

Next, a laser apparatus according to Embodiment 1 of the present disclosure will be described. Substantially the same components as those of the laser apparatus according to the comparative examples are denoted by the same reference numerals, and descriptions are omitted as appropriate.

[2.1 Configuration]

The laser apparatus according to Embodiment 1 may include a function generator 52 added to the laser control unit 2 in the laser apparatus 101 according to Comparative Example 1 substantially similarly to the laser apparatus 1 according to Comparative Example 2.

The laser apparatus according to Embodiment 1 is different from the laser apparatus 1 according to Comparative Example 2 in an energy control process and a calculation process of a control gain Gc by the laser control unit 2.

In the laser apparatus according to Embodiment 1, the laser control unit 2 may be a pulse energy control unit that periodically varies a target pulse energy Et at a predetermined modulation frequency with each of a plurality of reference energies being a center of variation. The reference energies may be, for example, Eta, Etb, Etc. The predetermined modulation frequency may be, for example, Fma.

The laser control unit 2 may be a gain calculation unit that calculates a plurality of control gains, for example, Gca, Gcb, Gcc corresponding to the reference energies.

The laser control unit 2 as the gain calculation unit may calculate an amplitude component of a pulse energy E when periodically varying the target pulse energy Et at the predetermined modulation frequency with each of the reference energies being the center of variation. The laser control unit 2 may calculate an amplitude component of a charging voltage V corresponding to a voltage applied between a pair of discharge electrodes 23, 24 when periodically varying the target pulse energy Et at the predetermined modulation frequency with each of the reference energies being the center of variation. The calculated amplitude components of the pulse energy E may be, for example, Iea, Ieb, Iec. The calculated amplitude components of the charging voltage V may be, for example, Iva, Ivb, Ivc. The laser control unit 2 may calculate the control gains based on the amplitude components of the pulse energy E and the amplitude components of the charging voltage V.

The laser control unit 2 may be a voltage control unit that controls the charging voltage V corresponding to the voltage applied between the discharge electrodes 23, 24 based on the target pulse energy Et, the pulse energy E detected by a pulse energy detector 30, and further the control gains.

Other configurations may be substantially similar to those of the laser apparatus according to the comparative examples.

[2.2 Operation]

The laser control unit 2 may calculate the control gains Gca, Gcb, Gcc by periodically varying the target pulse energy Et at the predetermined modulation frequency Fma with each of the reference energies Eta, Etb, Etc being the center of variation. Thus, for example, the control gains Gca, Gcb, Gcc corresponding to the values of the target pulse energies Et may be calculated as the control gains Gc as expressed below. For example, the control gain Gca may be calculated based on the reference energy Eta. For example, the control gain Gcb may be calculated based on the reference energy Etb. For example, the control gain Gcc may be calculated based on the reference energy Etc. A magnitude relation of the reference energies Eta, Etb, Etc may satisfy Eta<Etb<Etc. Set values of the target pulse energies Et mentioned below are merely examples and not limited to them.

$$Et \leq 9.5: Gca = Gs \cdot Iva/Iea$$

$$9.5 \leq Et 10.5: Gcb = Gs \cdot Ivb/Ieb$$

$$10.5 < Et: Gcc = Gs \cdot Ivc/Iec$$

(Specific Example of Calculation Process of Control Gain in Embodiment 1)

Figure 15:
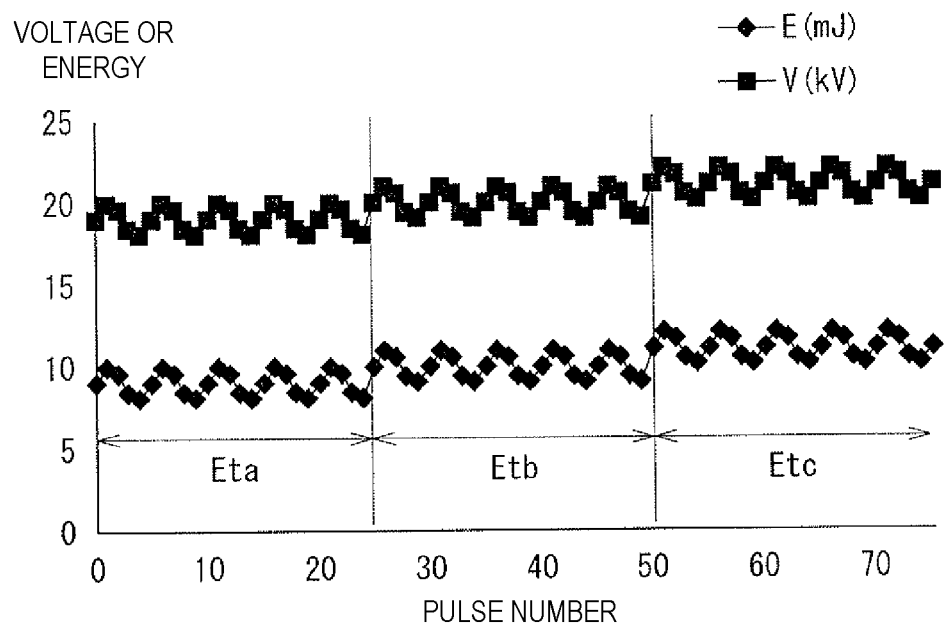
FIG. 15 shows an example of measurement values of a pulse energy and a charging voltage for each pulse in a laser apparatus according to Embodiment 1.
Figure 16:
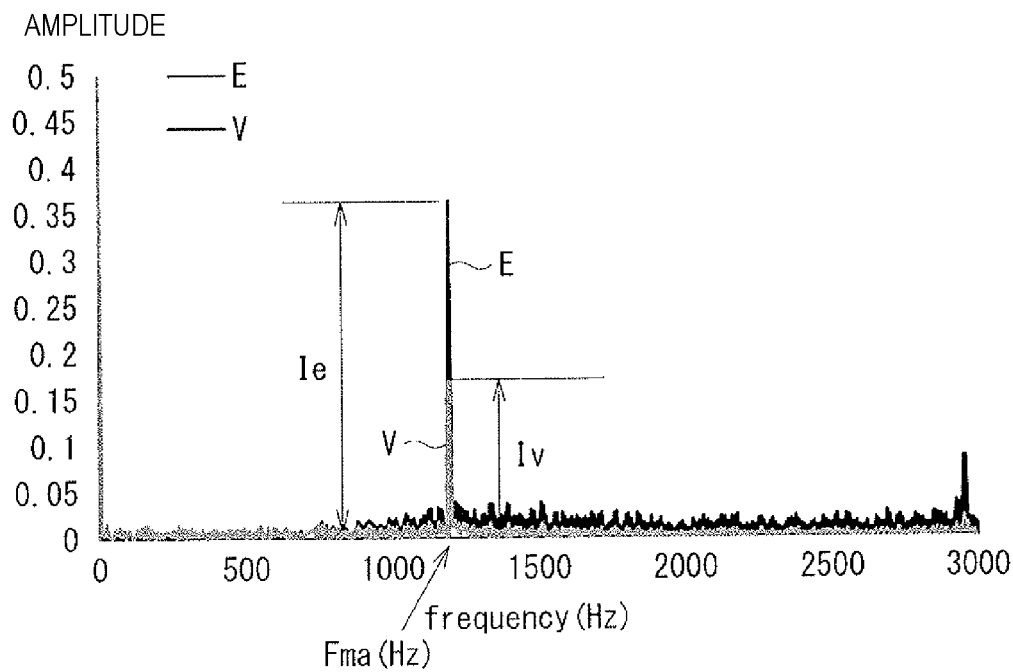
FIG. 16 shows an example of a result of a spectrum analysis on the pulse energy and the charging voltage in FIG. 15.

FIG. 15 shows an example of measurement values of the pulse energy E and the charging voltage V for each pulse in the laser apparatus according to Embodiment 1. FIG. 16 shows an example of a result of a spectrum analysis on the pulse energy E and the charging voltage V in FIG. 15. In FIG. 15, the horizontal axis represents pulse number of a pulse laser beam Lp and the vertical axis represents pulse energy E (mJ) or charging voltage V (kV). In Embodiment 1, the horizontal axis in FIG. 15 corresponds to time since a pulse repetition frequency Rp is constant. In FIG. 16, the horizontal axis represents frequency (Hz) and the vertical axis represents amplitude value.

Figure 17:
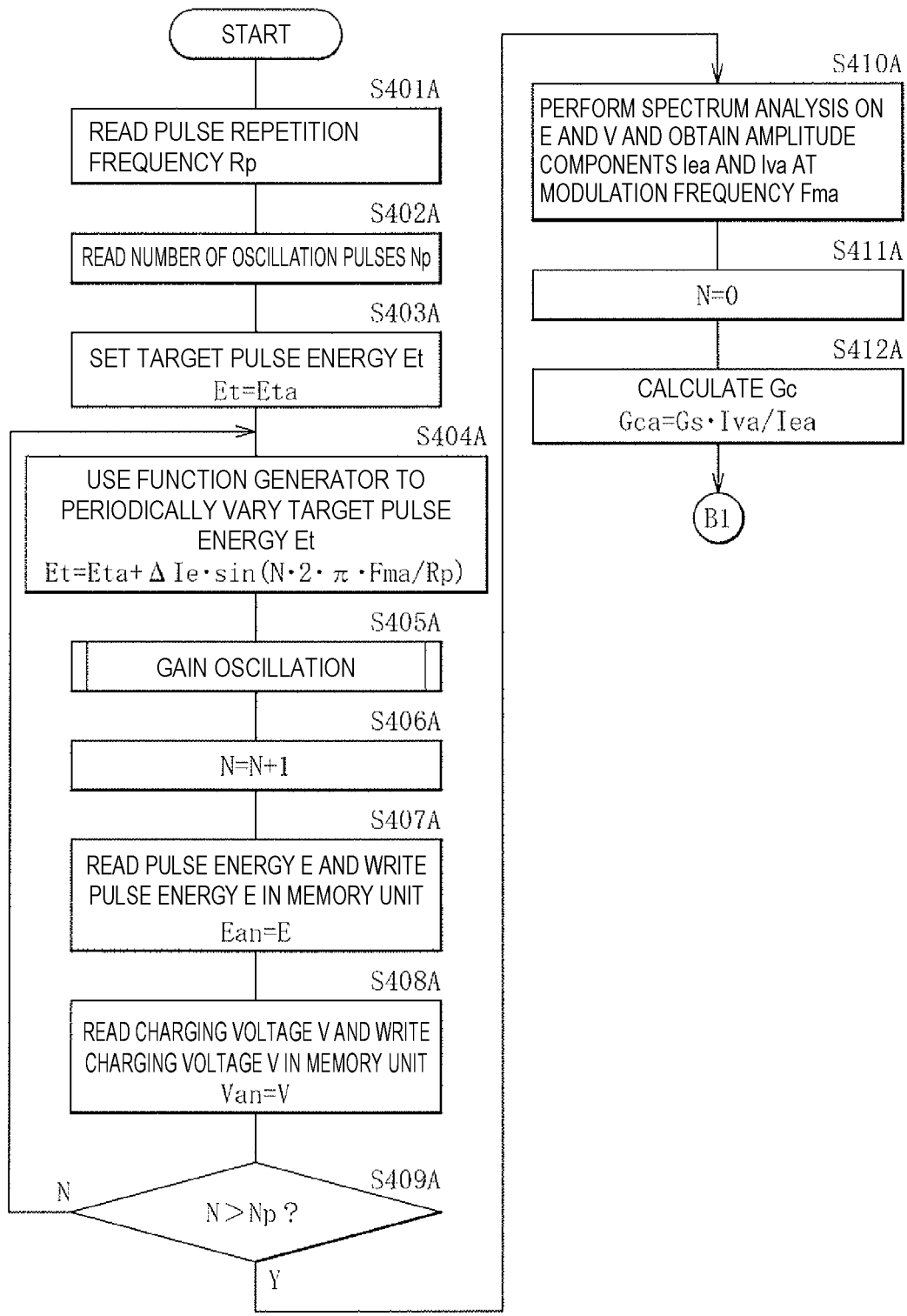
FIG. 17 is a flowchart of an example of a calculation process of a control gain by a laser control unit in the laser apparatus according to Embodiment 1.
Figure 18:
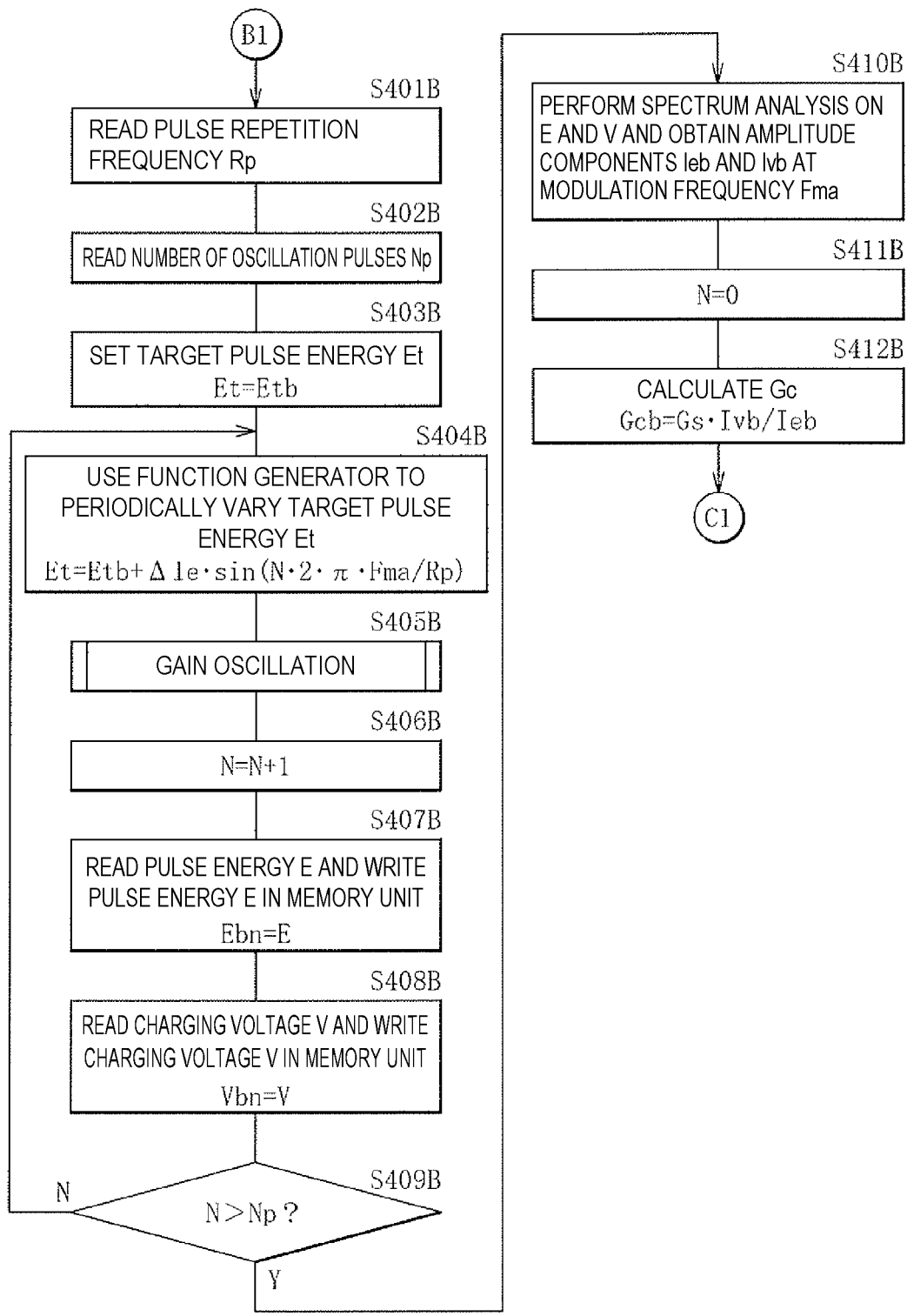
FIG. 18 is a flowchart following FIG. 17.
Figure 19:
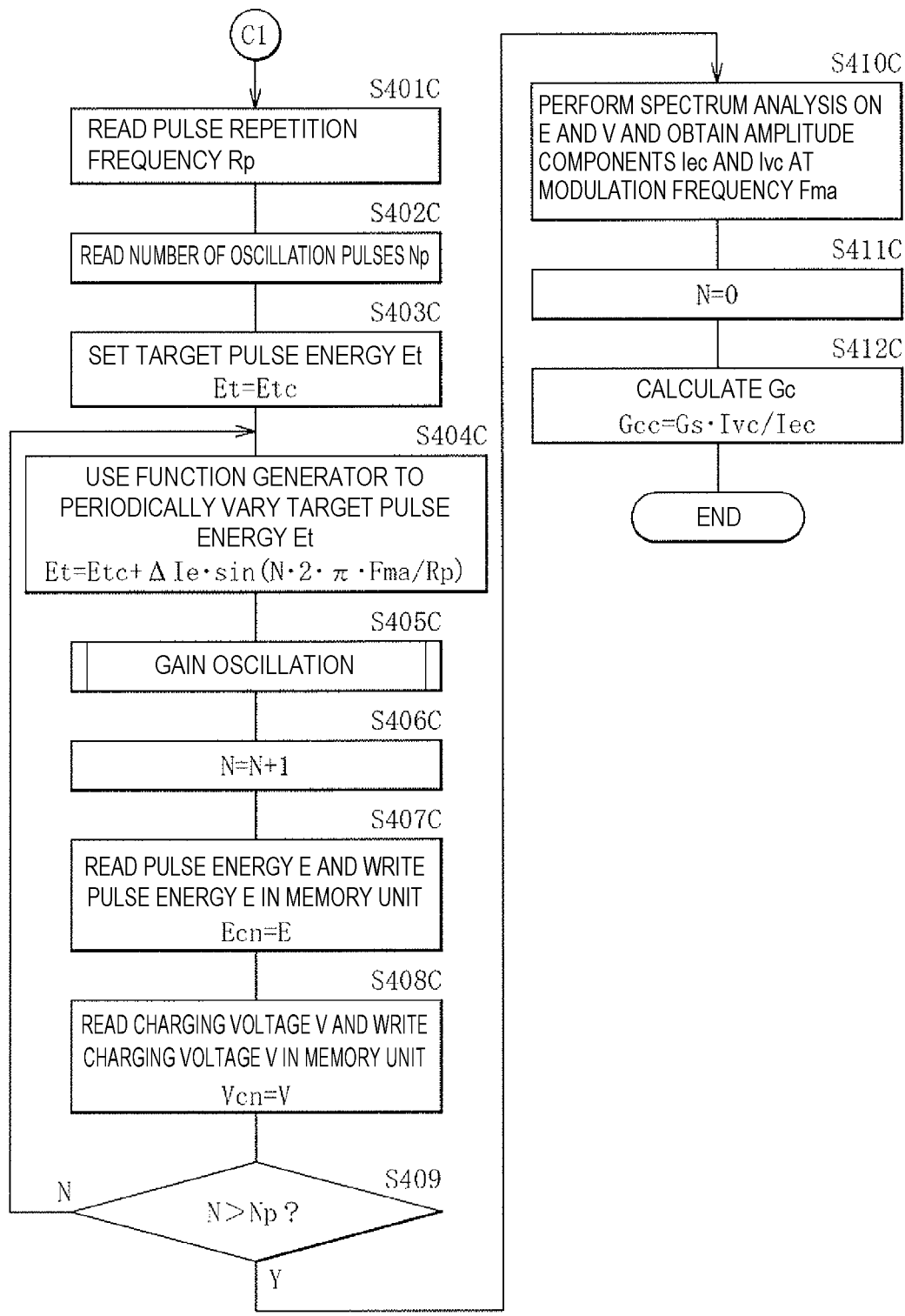
FIG. 19 is a flowchart following FIG. 18.

FIG. 17 is a flowchart of an example of a calculation process of the control gain Gc by the laser control unit 2 in the laser apparatus according to Embodiment 1. FIG. 18 is a flowchart following FIG. 17. FIG. 19 is a flowchart following FIG. 18.

In the process in FIGS. 17 to 19, the amplitude components Ie (Iea, Ieb, Iec) of the pulse energy E and the amplitude components Iv (Iva, Ivb, Ivc) of the charging voltage V, for example, as shown in FIG. 16 may be calculated by the spectrum analysis.

The process in FIGS. 17 to 19 may be performed, for example, according to an instruction from an exposure device 4, after replacement of a laser gas, or after adjustment of pressure of the laser gas. The process may be performed at predetermined intervals.

As shown in FIG. 17, the laser control unit 2 first reads a pulse repetition frequency Rp from an exposure device controller 5 or a memory unit 51 (step S401A). Then, the laser control unit 2 reads the number of oscillation pulses Np from the exposure device controller 5 or the memory unit 51 (step S402A). The number of oscillation pulses Np is preferably, for example, 400 to 1500. The number of oscillation pulses Np is more preferably a power of 2 such as 512 or 1024.

Next, the laser control unit 2 sets the target pulse energy Et to a reference energy Eta (step S403A). The laser control unit 2 writes the set target pulse energy Et in the memory unit 51.

Next, the laser control unit 2 uses the function generator 52 to periodically vary the target pulse energy Et with the reference energy Eta being the center of variation as expressed by an equation below (step S404A). Fma is a modulation frequency of the target pulse energy Et. Rp/Fma is desirably an integer. Rp/Fma is desirably in the range of 4 to 10. An amplitude ΔIe is desirably in the range of 0.5 mJ to 2 mJ. The amplitude ΔIe may be determined by a ratio to the reference energy Eta. For example, ΔIe may be 5% to 10% of Eta. Rp may be, for example, 6000 Hz. Fma may be, for example, 1200 Hz.

$$Et = Eta + \Delta Ie \cdot \sin(N \cdot 2 \cdot \pi \cdot Fma/Rp)$$

Next, the laser control unit 2 performs a gain oscillation process (step S405A). This gain oscillation process may be substantially similar to, for example, the subroutine in FIG. 4.

Next, the laser control unit 2 sets a pulse counter value N to N+1 (step S406A).

Next, the laser control unit 2 reads the value of the pulse energy E from the pulse energy detector 30, and writes, as Ean, the value of the pulse energy E for an n-th pulse in the memory unit 51 (step S407A).

Next, the laser control unit 2 reads the value of the charging voltage V set for a charger 90 from the memory unit 51, and writes, as Van, the value of the charging voltage V for the n-th pulse in the memory unit 51 (step S408A).

Next, the laser control unit 2 determines whether or not the pulse counter value N is larger than the number of oscillation pulses Np (step S409A). When determining that the pulse counter value N is not larger than the number of oscillation pulses Np (step S409A; N), the laser control unit 2 returns to the process in step S404A.

When determining that the pulse counter value N is larger than the number of oscillation pulses Np (step S409A; Y), the laser control unit 2 performs a spectrum analysis on a data row of the stored pulse energy E and charging voltage V, and obtains an amplitude component Iea of the pulse energy E at the modulation frequency Fma and an amplitude component Iva of the charging voltage V at the modulation frequency Fma (step S410A). The spectrum analysis may use Fourier transform, discrete Fourier transform, fast Fourier transform, or the like.

Next, the laser control unit 2 sets the pulse counter value N to 0 (step S411A).

Next, the laser control unit 2 calculates a value Gca of the control gain Gc as expressed by an equation below (step S412A), and goes to the process in FIG. 18. A desirable value of coefficient Gs is, for example, 0.3 to 1 so as to prevent divergence of control.

$$Gca=Gs \cdot \Delta V/\Delta E=Gs \cdot Iva/Iea$$

In the process in FIG. 18, the laser control unit 2 first reads a pulse repetition frequency Rp from the exposure device controller 5 or the memory unit 51 (step S401B). Then, the laser control unit 2 reads the number of oscillation pulses Np from the exposure device controller 5 or the memory unit 51 (step S402B). The number of oscillation pulses Np is preferably, for example, 400 to 1500. The number of oscillation pulses Np is more preferably a power of 2 such as 512 or 1024.

Next, the laser control unit 2 sets the target pulse energy Et to a reference energy Etb (step S403B). The laser control unit 2 writes the set target pulse energy Et in the memory unit 51.

Next, the laser control unit 2 uses the function generator 52 to periodically vary the target pulse energy Et with the reference energy Etb being the center of variation as expressed by an equation below (step S404B). Fma is a modulation frequency of the target pulse energy Et. Rp/Fma is desirably an integer. Rp/Fma is desirably in the range of 4 to 10. An amplitude $\Delta$Ie is desirably in the range of 0.5 mJ to 2 mJ. The amplitude $\Delta$Ie may be determined by a ratio to the reference energy Etb. For example, $\Delta$Ie may be 5% to 10% of Etb. Rp may be, for example, 6000 Hz. Fma may be, for example, 1200 Hz.

$$Et=Etb+\Delta Ie \cdot \sin(N \cdot 2 \cdot \pi \cdot Fma/Rp)$$

Next, the laser control unit 2 performs a gain oscillation process (step S405B). This gain oscillation process may be substantially similar to, for example, the subroutine in FIG. 4.

Next, the laser control unit 2 sets the pulse counter value N to N+1 (step S406B).

Next, the laser control unit 2 reads the value of the pulse energy E from the pulse energy detector 30, and writes, as Ebn, the value of the pulse energy E for an n-th pulse in the memory unit 51 (step S407B).

Next, the laser control unit 2 reads the value of the charging voltage V set for the charger 90 from the memory unit 51, and writes, as Vbn, the value of the charging voltage V for the n-th pulse in the memory unit 51 (step S408B).

Next, the laser control unit 2 determines whether or not the pulse counter value N is larger than the number of oscillation pulses Np (step S409B). When determining that the pulse counter value N is not larger than the number of oscillation pulses Np (step S409B; N), the laser control unit 2 returns to the process in step S404B.

When determining that the pulse counter value N is larger than the number of oscillation pulses Np (step S409B; Y), the laser control unit 2 performs a spectrum analysis on a data row of the stored pulse energy E and charging voltage V, and obtains an amplitude component Ieb of the pulse energy E at the modulation frequency Fma and an amplitude component Ivb of the charging voltage V at the modulation frequency Fma (step S410B). The spectrum analysis may use Fourier transform, discrete Fourier transform, fast Fourier transform, or the like.

Next, the laser control unit 2 sets the pulse counter value N to 0 (step S411B).

Next, the laser control unit 2 calculates a value Gcb of the control gain Gc as expressed by an equation below (step S412B), and goes to the process in FIG. 19. A desirable value of coefficient Gs is, for example, 0.3 to 1 so as to prevent divergence of control.

$$Gcb=Gs \cdot \Delta V/\Delta E=Gs \cdot Ivb/Ieb$$

In the process in FIG. 19, the laser control unit 2 first reads a pulse repetition frequency Rp from the exposure device controller 5 or the memory unit 51 (step S401C). Then, the laser control unit 2 reads the number of oscillation pulses Np from the exposure device controller 5 or the memory unit 51 (step S402C). The number of oscillation pulses Np is preferably, for example, 400 to 1500. The number of oscillation pulses Np is more preferably a power of 2 such as 512 or 1024.

Next, the laser control unit 2 sets the target pulse energy Et to a reference energy Etc (step S403C). The laser control unit 2 writes the set target pulse energy Et in the memory unit 51.

Next, the laser control unit 2 uses the function generator 52 to periodically vary the target pulse energy Et with the reference energy Etc being a center of variation as expressed by an equation below (step S404C). Fma is a modulation frequency of the target pulse energy Et. Rp/Fma is desirably an integer. Rp/Fma is desirably in the range of 4 to 10. An amplitude $\Delta$Ie is desirably in the range of 0.5 mJ to 2 mJ. The amplitude $\Delta$Ie may be determined by a ratio to the reference energy Etc. For example, $\Delta$Ie may be 5% to 10% of Etc. Rp may be, for example, 6000 Hz. Fma may be, for example, 1200 Hz.

$$Et=Etc+\Delta Ie \cdot \sin(N \cdot 2 \cdot \pi \cdot Fma/Rp)$$

Next, the laser control unit 2 performs a gain oscillation process (step S405C). This gain oscillation process may be substantially similar to, for example, the subroutine in FIG. 4.

Next, the laser control unit 2 sets the pulse counter value N to N+1 (step S406C).

Next, the laser control unit 2 reads the value of the pulse energy E from the pulse energy detector 30, and writes, as Ecn, the value of the pulse energy E for an n-th pulse in the memory unit 51 (step S407C).

Next, the laser control unit 2 reads the value of the charging voltage V set for the charger 90 from the memory unit 51, and writes, as Vcn, the value of the charging voltage V for the n-th pulse in the memory unit 51 (step S408C).

Next, the laser control unit 2 determines whether or not the pulse counter value N is larger than the number of oscillation pulses Np (step S409C). When determining that the pulse counter value N is not larger than the number of oscillation pulses Np (step S409C; N), the laser control unit 2 returns to the process in step S404C.

When determining that the pulse counter value N is larger than the number of oscillation pulses Np (step S409C; Y), the laser control unit 2 performs a spectrum analysis on a data row of the stored pulse energy E and charging voltage V, and obtains an amplitude component Iec of the pulse energy E at the modulation frequency Fma and an amplitude component Ivc of the charging voltage V at the modulation frequency Fma (step S410C). The spectrum analysis may use Fourier transform, discrete Fourier transform, fast Fourier transform, or the like.

Next, the laser control unit 2 sets the pulse counter value N to 0 (step S411C).

Next, the laser control unit 2 calculates a value Gcc of the control gain Gc as expressed by an equation below (step S412C), and finishes the process. A desirable value of coefficient Gs is, for example, 0.3 to 1 so as to prevent divergence of control.

$$Gcc = Gs \cdot \Delta V / \Delta E = Gs \cdot Ivc / Iec$$

(Specific Example of Energy Control in Embodiment 1)

Figure 20:
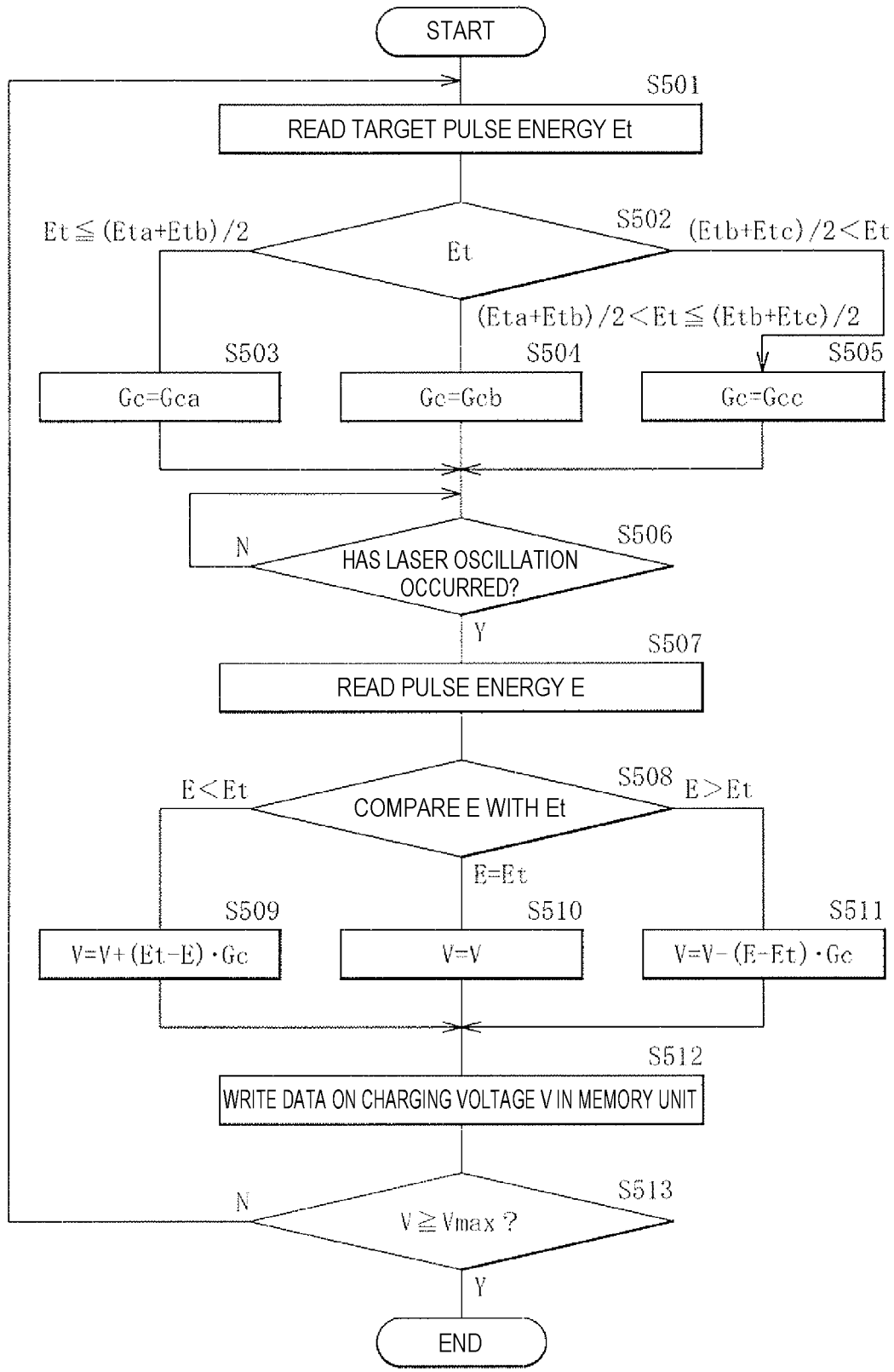
FIG. 20 is a flowchart of an example of control of a pulse energy by the laser control unit in the laser apparatus according to Embodiment 1.

FIG. 20 is a flowchart of an example of control of the pulse energy E by the laser control unit 2 in the laser apparatus according to Embodiment 1.

The laser control unit 2 first reads the target pulse energy Et from the exposure device controller 5 or the memory unit 51 (step S501).

Next, the laser control unit 2 determines which of the control gains Gca, Gcb, Gcc the target pulse energy Et corresponds to (step S502). The control gains Gca, Gcb, Gcc may be calculated according to the flowcharts in FIGS. 17 to 19.

When determining that the target pulse energy Et is a predetermined value or lower, for example, Et≤(Eta+Etb)/2 is satisfied, the laser control unit 2 sets the value of the control gain Gc to Gca (step S503).

When determining that the target pulse energy Et is within a predetermined range, for example, (Eta+Etb)/2<Et≤(Etb+Etc)/2 is satisfied, the laser control unit 2 sets the value of the control gain Gc to Gcb (step S504).

When determining that the target pulse energy Et is higher than the predetermined value, for example, (Etb+Etc)/2<Et is satisfied, the laser control unit 2 sets the value of the control gain Gc to Gcc (step S505).

Next, the laser control unit 2 determines whether or not laser oscillation has occurred (step S506). When determining that the laser oscillation has not occurred (step S506; N), the laser control unit 2 repeats the process in step S506.

When determining that the laser oscillation has occurred (step S506; Y), the laser control unit 2 reads the value of the pulse energy E from the pulse energy detector 30 (step S507).

Next, the laser control unit 2 compares the pulse energy E with the target pulse energy Et (step S508). When determining that the pulse energy E is substantially equal to the target pulse energy Et (E=Et), the laser control unit 2 takes data on the current charging voltage V as it is as data on the charging voltage V (step S510), and writes the data in the memory unit 51 (step S512).

When determining that the pulse energy E is lower than the target pulse energy Et (E<Et), the laser control unit 2 adds a value obtained by multiplying a difference (Et−E) between the target pulse energy Et and the pulse energy E by the control gain Gc to the charging voltage V to obtain a new charging voltage V as expressed by an equation below (step S509), and writes data on the charging voltage V in the memory unit 51 (step S512).

$$V = V + (Et - E) \cdot Gc$$

When determining that the pulse energy E is higher than the target pulse energy Et (E>Et), the laser control unit 2 subtracts a value obtained by multiplying a difference (E−Et) between the pulse energy E and the target pulse energy Et by the control gain Gc from the charging voltage V to obtain a new charging voltage V as expressed by an equation below (step S511), and writes data on the charging voltage V in the memory unit 51 (step S513).

$$V = V - (E - Et) \cdot Gc$$

Next, the laser control unit 2 determines whether or not the charging voltage V has reached a predetermined maximum value Vmax or higher (step S513). When determining that the charging voltage V has not reached the predetermined maximum value Vmax or higher (step S513; N), the laser control unit 2 returns to the process in step S501. When determining that the charging voltage V has reached the predetermined maximum value Vmax or higher (step S513; Y), the laser control unit 2 finishes the energy control process.

Other operations may be substantially similar to those of the laser apparatus according to the comparative examples.

[2.3 Effect]

With the laser apparatus of Embodiment 1, the plurality of control gains Gca, Gcb, Gcc corresponding to the values of the target pulse energies Et are calculated, thereby improving control accuracy of the pulse energy E when the target pulse energy Et is changed.

In Embodiment 1, the example in which the laser control unit 2 calculates the three control gains Gca, Gcb, Gcc and performs the energy control based on the three control gains Gca, Gcb, Gcc is described. However, not limited to three, two or four or more control gains Gc may be calculated. The laser control unit 2 may perform the energy control based on the two or four or more control gains Gc.

<3. Embodiment 2> (Laser Apparatus Using a Plurality of Control Gains Corresponding to Values of Target Pulse Energies and Values of Modulation Frequencies)

Next, a laser apparatus according to Embodiment 2 of the present disclosure will be described. Substantially the same components as those of the laser apparatus according to the comparative examples or Embodiment 1 are denoted by the same reference numerals, and descriptions are omitted as appropriate.

[3.1 Configuration]

A laser apparatus according to Embodiment 2 may include a function generator 52 added to the laser control unit 2 in the laser apparatus 101 according to Comparative Example 1 substantially similarly to the laser apparatus 1 according to Comparative Example 2.

The laser apparatus according to Embodiment 2 is different from the laser apparatus 1 according to Comparative Example 2 in an energy control process and a calculation process of a control gain Gc by the laser control unit 2.

In the laser apparatus according to Embodiment 2, the laser control unit 2 may be a pulse energy control unit that periodically varies a target pulse energy Et at modulation frequencies corresponding to a plurality of reference energies with each of the reference energies being a center of variation. The reference energies may be, for example, Eta, Etb, Etc. The modulation frequencies corresponding to the reference energies may be, for example, Fma, Fmb, Fmc.

The laser control unit 2 may be a gain calculation unit that calculates a plurality of control gains, for example, Gca, Gcb, Gcc corresponding to the reference energies.

The laser control unit 2 as the gain calculation unit may calculate an amplitude component of a pulse energy E when periodically varying the target pulse energy Et at the modulation frequencies corresponding to the reference energies with each of the reference energies being the center of variation. The laser control unit 2 may calculate an amplitude component of a charging voltage V corresponding to a voltage applied between a pair of discharge electrodes 23, 24 when periodically varying the target pulse energy Et at the modulation frequencies corresponding to the reference energies with each of the reference energies being the center of variation. The calculated amplitude components of the pulse energy E may be, for example, Iea, Ieb, Iec. The calculated amplitude components of the charging voltage V may be, for example, Iva, Ivb, Ivc. The laser control unit 2 may calculate the control gains based on the amplitude components of the pulse energy E and the amplitude components of the charging voltage V.

Other configurations may be substantially similar to those of the laser apparatus according to the comparative examples or Embodiment 1.

[3.2 Operation]

The laser control unit 2 may calculate the control gains Gca, Gcb, Gcc by periodically varying the target pulse energy Et at the modulation frequencies Fma, Fmb, Fmc corresponding to the reference energies Eta, Etb, Etc with each of the reference energies Eta, Etb, Etc being the center of variation. Thus, the control gains Gca, Gcb, Gcc corresponding to the values of the target pulse energies Et and the values of the modulation frequencies may be calculated as the control gains Gc, for example, as expressed below. For example, the control gain Gca may be calculated based on the reference energy Eta and the modulation frequency Fma. For example, the control gain Gcb may be calculated based on the reference energy Etb and the modulation frequency Fmb. For example, the control gain Gcc may be calculated based on the reference energy Etc and the modulation frequency Fmc. A magnitude relation of the reference energies Eta, Etb, Etc may satisfy Eta<Etb<Etc. A magnitude relation of the modulation frequencies Fma, Fmb, Fmc may satisfy Fma>Fmb>Fmc. Set values of the target pulse energies Et mentioned below are merely examples and not limited to them.

$Et≤9.5$: $Gca=Gs·Iva/Iea$ $9.5<Et≤10.5$: $Gcb=Gs·Ivb/Ieb$ $10.5<Et$: $Gcc=Gs·Ivc/Iec$ (Specific Example of Calculation Process of Control Gain in Embodiment 2)

Figure 21:
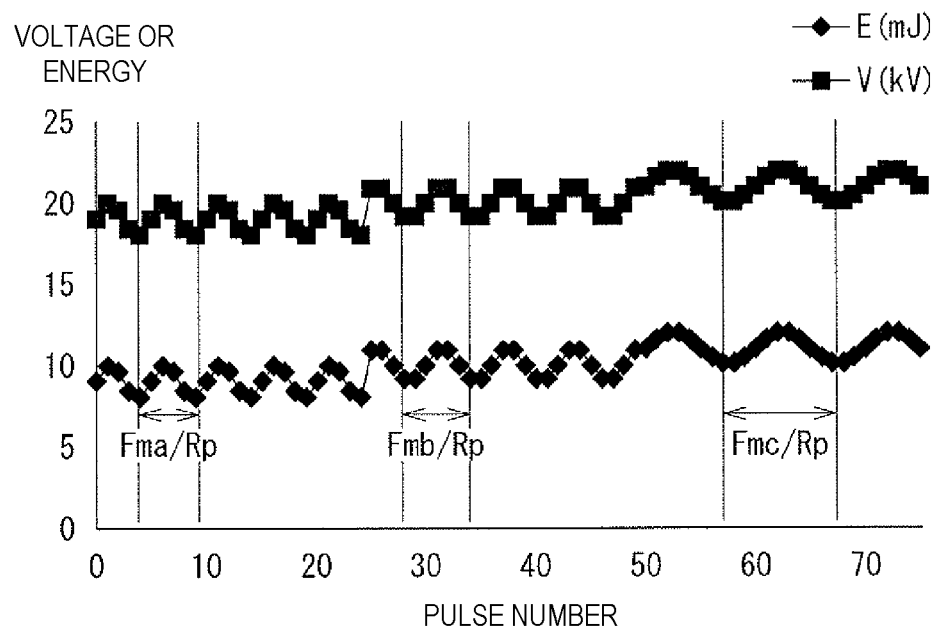
FIG. 21 shows an example of measurement values of a pulse energy and a charging voltage for each pulse in a laser apparatus according to Embodiment 2.
Figure 22:
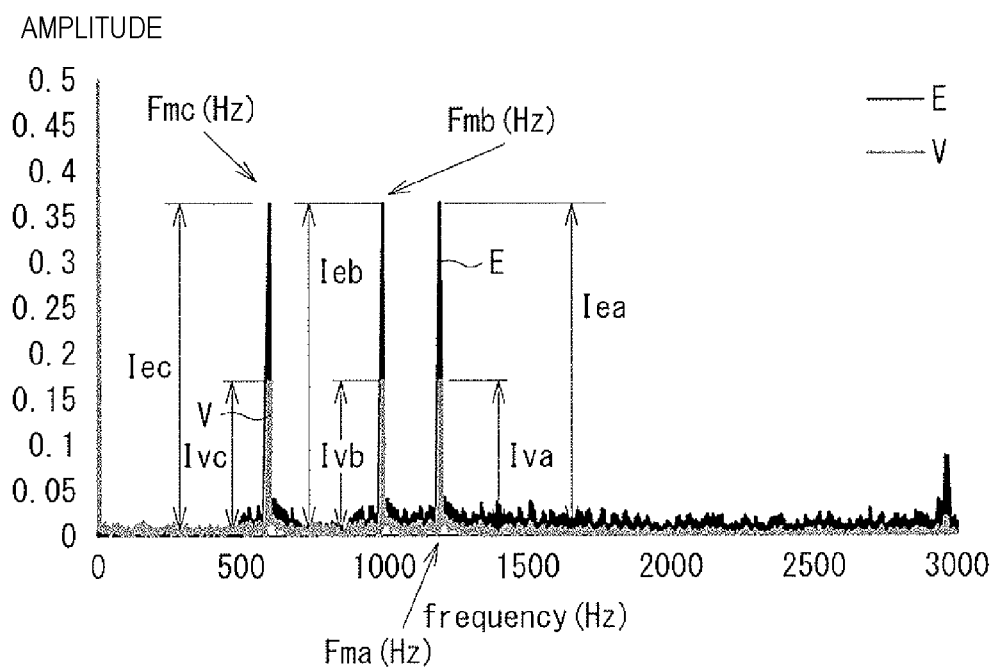
FIG. 22 shows an example of a result of a spectrum analysis on the pulse energy and the charging voltage in FIG. 21.

FIG. 21 shows an example of measurement values of the pulse energy E and the charging voltage V for each pulse in the laser apparatus according to Embodiment 2 of the present disclosure. FIG. 22 shows an example of a result of a spectrum analysis on the pulse energy E and the charging voltage V in FIG. 21. In FIG. 21, the horizontal axis represents pulse number of a pulse laser beam Lp and the vertical axis represents pulse energy E (mJ) or charging voltage V (kV). In Embodiment 2, the horizontal axis in FIG. 21 corresponds to time since a pulse repetition frequency Rp is constant. In FIG. 22, the horizontal axis represents frequency (Hz) and the vertical axis represents amplitude value.

Figure 23:
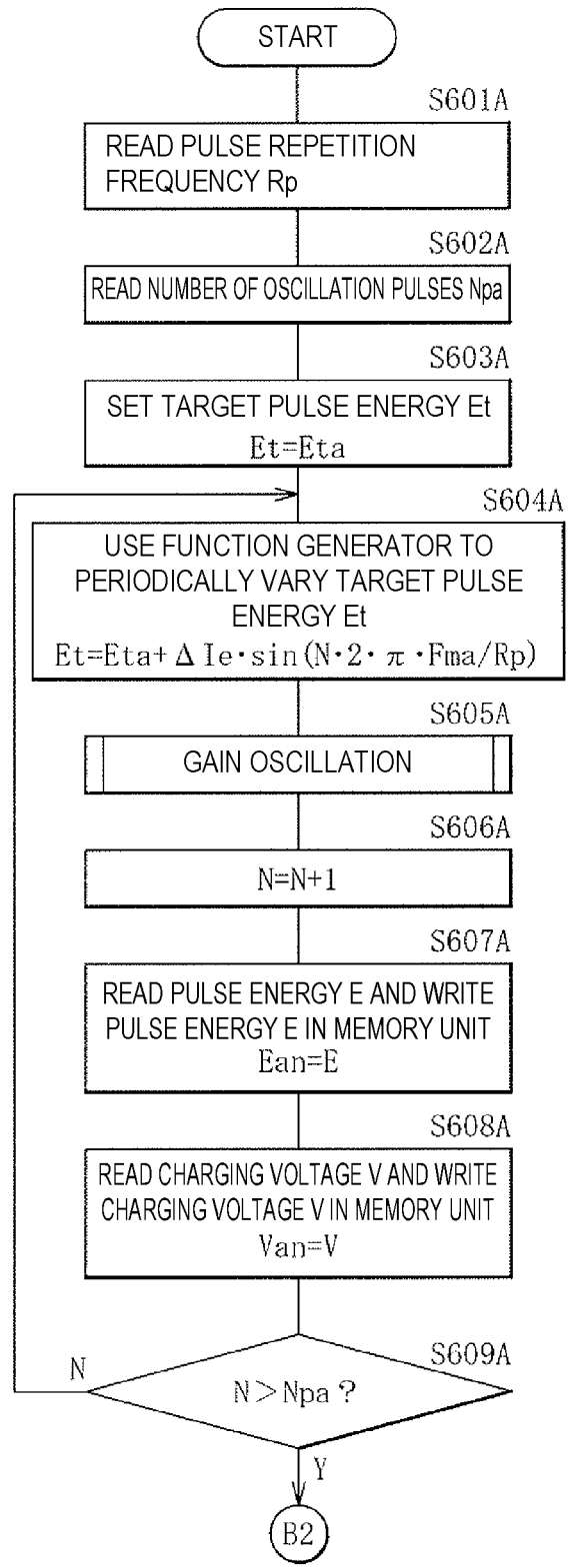
FIG. 23 is a flowchart of an example of a calculation process of a control gain by a laser control unit in the laser apparatus according to Embodiment 2.
Figure 24:
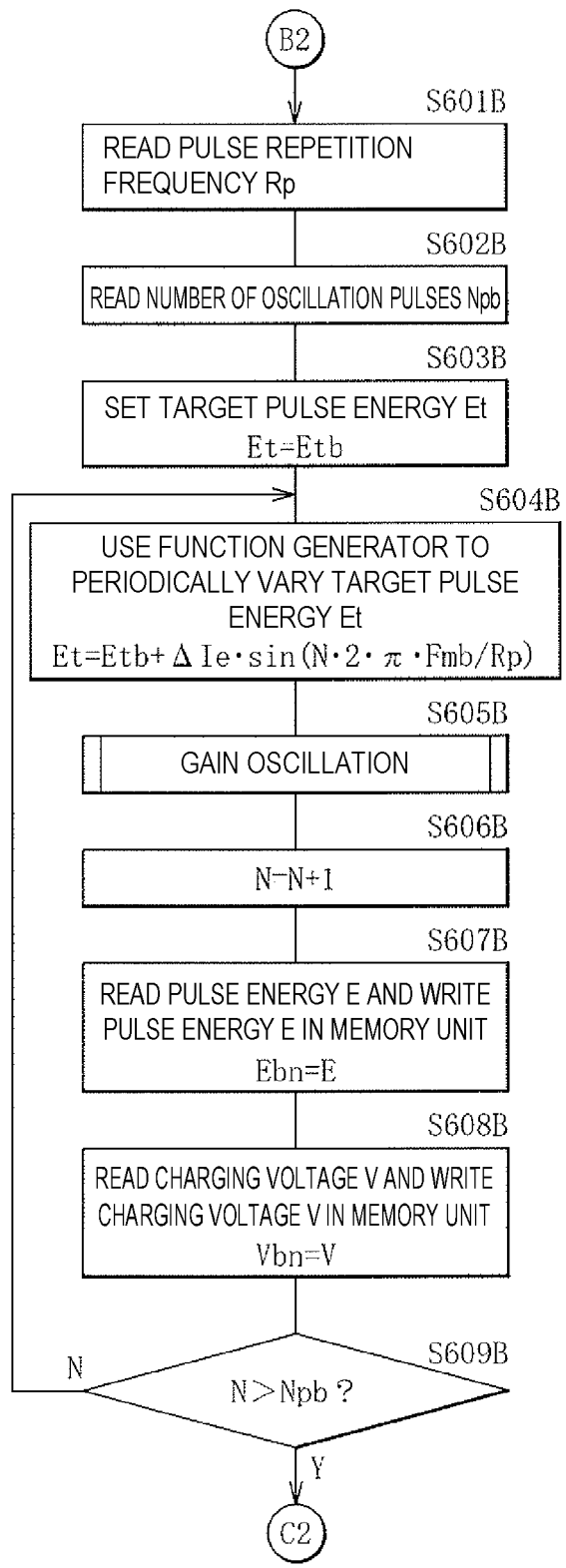
FIG. 24 is a flowchart following FIG. 23.
Figure 25:
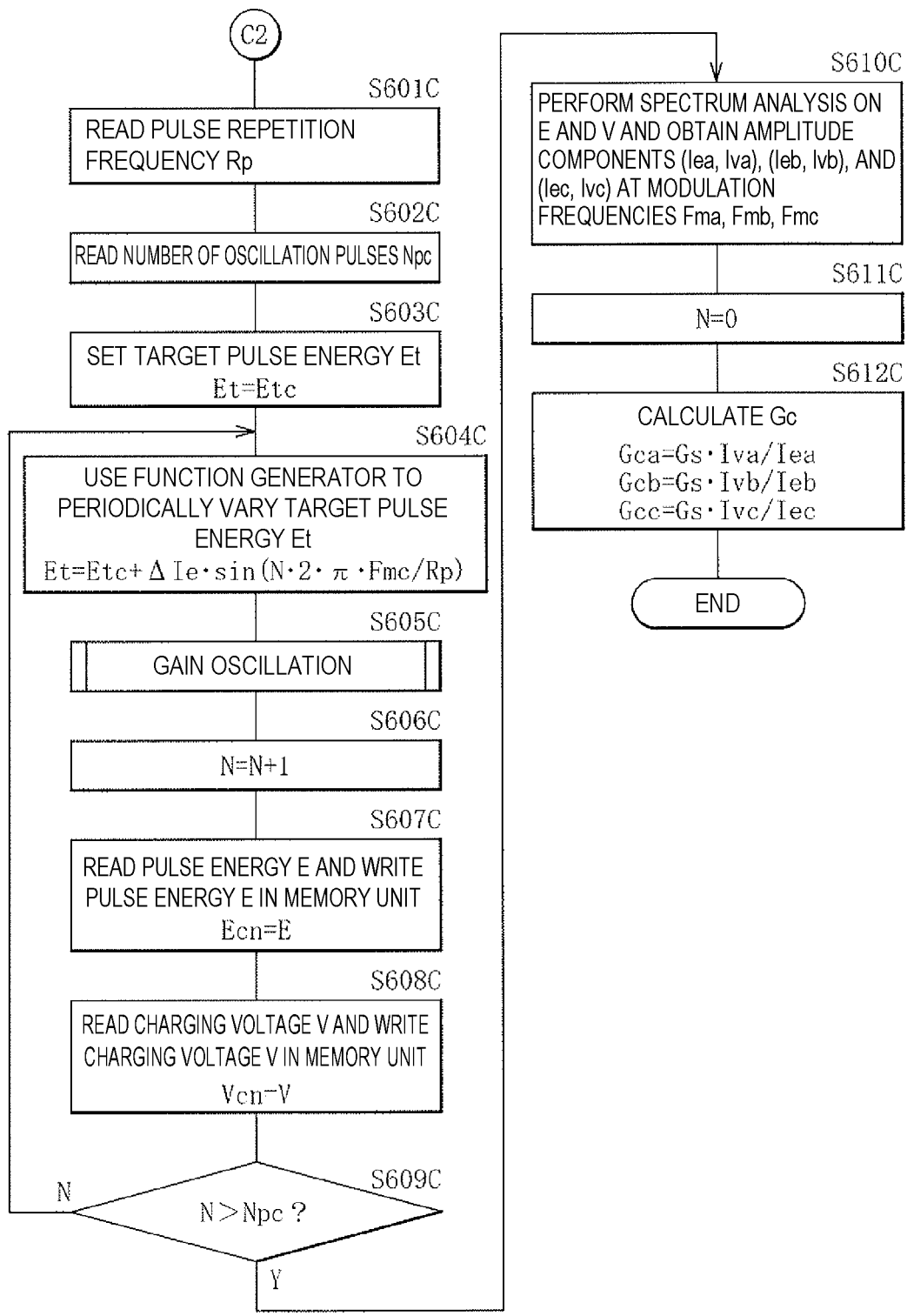
FIG. 25 is a flowchart following FIG. 24.

FIG. 23 is a flowchart of an example of a calculation process of the control gain Gc by the laser control unit 2 in the laser apparatus according to Embodiment 2. FIG. 24 is a flowchart following FIG. 23. FIG. 25 is a flowchart following FIG. 24.

In the process in FIGS. 23 to 25, the amplitude components Ie (Iea, Ieb, Iec) of the pulse energy E and the amplitude components Iv (Iva, Ivb, Ivc) of the charging voltage V, for example, as shown in FIG. 22 may be calculated by the spectrum analysis.

The process in FIGS. 23 to 25 may be performed, for example, according to an instruction from an exposure device 4, after replacement of a laser gas, or after adjustment of pressure of the laser gas. The process may be performed at predetermined intervals.

As shown in FIG. 23, the laser control unit 2 first reads a pulse repetition frequency Rp from an exposure device controller 5 or a memory unit 51 (step S601A). Then, the laser control unit 2 reads the number of oscillation pulses Np=Npa from the exposure device controller 5 or the memory unit 51 (step S602A). The number of oscillation pulses Npa is preferably, for example, 400 to 1500. The number of oscillation pulses Npa is more preferably a power of 2 such as 512 or 1024.

Next, the laser control unit 2 sets the target pulse energy Et to a reference energy Eta (step S603A). The laser control unit 2 writes the set target pulse energy Et in the memory unit 51.

Next, the laser control unit 2 uses the function generator 52 to periodically vary the target pulse energy Et with the reference energy Eta being the center of variation as expressed by an equation below (step S604A). Fma is a modulation frequency of the target pulse energy Et corresponding to the reference energy Eta. Rp/Fma is desirably an integer. Rp/Fma is desirably in the range of 4 to 10. An amplitude ΔIe is desirably in the range of 0.5 mJ to 2 mJ. The amplitude ΔIe may be determined by a ratio to the reference energy Eta. For example, ΔIe may be 5% to 10% of Eta. Rp may be, for example, 6000 Hz. Fma may be, for example, 1200 Hz.

$Et=Eta+ΔIe·\sin(N·2·π·Fma/Rp)$

Next, the laser control unit 2 performs a gain oscillation process (step S605A). This gain oscillation process may be substantially similar to, for example, the subroutine in FIG. 4.

Next, the laser control unit 2 sets a pulse counter value N to N+1 (step S606A).

Next, the laser control unit 2 reads the value of the pulse energy E from a pulse energy detector 30, and writes, as Ean, the value of the pulse energy E for an n-th pulse in the memory unit 51 (step S607A).

Next, the laser control unit 2 reads the value of the charging voltage V set for a charger 90 from the memory unit 51, and writes, as Van, the value of the charging voltage V for the n-th pulse in the memory unit 51 (step S608A).

Next, the laser control unit 2 determines whether or not the pulse counter value N is larger than the number of oscillation pulses Np=Npa (step S609A). When determining that the pulse counter value N is not larger than the number of oscillation pulses Np=Npa (step S609A; N), the laser control unit 2 returns to the process in step S604A.

When determining that the pulse counter value N is larger than the number of oscillation pulses Np=Npa (step S609A; Y), the laser control unit 2 goes to the process in FIG. 24.

In the process in FIG. 24, the laser control unit 2 first reads a pulse repetition frequency Rp from the exposure device controller 5 or the memory unit 51 (step S601B). Then, the laser control unit 2 reads the number of oscillation pulses Np=Npb from the exposure device controller 5 or the memory unit 51 (step S602B). The number of oscillation pulses Npb is preferably, for example, 400 to 1500. The number of oscillation pulses Npb is more preferably a power of 2 such as 512 or 1024.

Next, the laser control unit 2 sets the target pulse energy Et to a reference energy Etb (step S603B). The laser control unit 2 writes the set target pulse energy Et in the memory unit 51.

Next, the laser control unit 2 uses the function generator 52 to periodically vary the target pulse energy Et with the reference energy Etb being the center of variation as expressed by an equation below (step S604B). Fmb is a modulation frequency of the target pulse energy Et corresponding to the reference energy Etb. Rp/Fmb is desirably an integer. Rp/Fmb is desirably in the range of 4 to 10. An amplitude ΔIe is desirably in the range of 0.5 mJ to 2 mJ. The amplitude ΔIe may be determined by a ratio to the reference energy Etb. For example, ΔIe may be 5% to 10% of Etb. Rp may be, for example, 6000 Hz. Fmb may be, for example, 1200 Hz.

$$Et=Etb+\Delta Ie\cdot\sin(N\cdot 2\cdot\pi Fmb/Rp)$$

Next, the laser control unit 2 performs a gain oscillation process (step S605B). This gain oscillation process may be substantially similar to, for example, the subroutine in FIG. 4.

Next, the laser control unit 2 sets the pulse counter value N to N+1 (step S606B).

Next, the laser control unit 2 reads the value of the pulse energy E from the pulse energy detector 30, and writes, as Ebn, the value of the pulse energy E for an n-th pulse in the memory unit 51 (step S607B).

Next, the laser control unit 2 reads the value of the charging voltage V set for the charger 90 from the memory unit 51, and writes, as Vbn, the value of the charging voltage V for the n-th pulse in the memory unit 51 (step S608B).

Next, the laser control unit 2 determines whether or not the pulse counter value N is larger than the number of oscillation pulses Np=Npb (step S609B). When determining that the pulse counter value N is not larger than the number of oscillation pulses Np=Npb (step S609B; N), the laser control unit 2 returns to the process in step S604B.

When determining that the pulse counter value N is larger than the number of oscillation pulses Np=Npb (step S609B; Y), the laser control unit 2 goes to the process in FIG. 25.

In the process in FIG. 25, the laser control unit 2 first reads a pulse repetition frequency Rp from the exposure device controller 5 or the memory unit 51 (step S601C). Then, the laser control unit 2 reads the number of oscillation pulses Np=Npc from the exposure device controller 5 or the memory unit 51 (step S602C). The number of oscillation pulses Npc is preferably, for example, 400 to 1500. The number of oscillation pulses Npc is more preferably a power of 2 such as 512 or 1024.

Next, the laser control unit 2 sets the target pulse energy Et to a reference energy Etc (step S603C). The laser control unit 2 writes the set target pulse energy Et in the memory unit 51.

Next, the laser control unit 2 uses the function generator 52 to periodically vary the target pulse energy Et with the reference energy Etc being the center of variation as expressed by an equation below (step S604C). Fmc is a modulation frequency of the target pulse energy Et corresponding to the reference energy Etc. Rp/Fmc is desirably an integer. Rp/Fmc is desirably in the range of 4 to 10. An amplitude ΔIe is desirably in the range of 0.5 mJ to 2 mJ. The amplitude ΔIe may be determined by a ratio to the reference energy Etc. For example, ΔIe may be 5% to 10% of Etc. Rp may be, for example, 6000 Hz. Fmc may be, for example, 600 Hz.

$$Et=Etc+\Delta Ie\cdot\sin(N\cdot 2\cdot\pi\cdot Fmc/Rp)$$

Next, the laser control unit 2 performs a gain oscillation process (step S605C). This gain oscillation process may be substantially similar to, for example, the subroutine in FIG. 4.

Next, the laser control unit 2 sets the pulse counter value N to N+1 (step S606C).

Next, the laser control unit 2 reads the value of the pulse energy E from the pulse energy detector 30, and writes, as Ecn, the value of the pulse energy E for an n-th pulse in the memory unit 51 (step S607C).

Next, the laser control unit 2 reads the value of the charging voltage V set for the charger 90 from the memory unit 51, and writes, as Vcn, the value of the charging voltage V for the n-th pulse in the memory unit 51 (step S608C).

Next, the laser control unit 2 determines whether or not the pulse counter value N is larger than the number of oscillation pulses Np=Npc (step S609C). When determining that the pulse counter value N is not larger than the number of oscillation pulses Np=Npc (step S609C; N), the laser control unit 2 returns to the process in step S604C.

When determining that the pulse counter value N is larger than the number of oscillation pulses Np=Npc (step S609C; Y), the laser control unit 2 performs a spectrum analysis on a data row of the stored pulse energy E and charging voltage V, and collectively obtains amplitude components Iea, Ieb, Iec of the pulse energies E at the modulation frequencies Fma, Fmb, Fmc and amplitude components Iva, Ivb, Ivc of the charging voltages V at the modulation frequencies Fma, Fmb, Fmc (step S610C). The spectrum analysis may use Fourier transform, discrete Fourier transform, fast Fourier transform, or the like.

Next, the laser control unit 2 sets the pulse counter value N to 0 (step S611C).

Next, the laser control unit 2 collectively calculates values Gca, Gcb, Gcc of the plurality of control gains Gc as expressed by equations below (step S612C), and finishes the process. A desirable value of coefficient Gs is, for example, 0.3 to 1 so as to prevent divergence of control.

$$Gca=Gs\cdot\Delta V/\Delta E=Gs\cdot Iva/Iea$$

$$Gcb=Gs\cdot\Delta V/\Delta E=Gs\cdot Ivb/Ieb$$

$$Gcc=Gs\cdot\Delta V/\Delta E=Gs\cdot Ivc/Iec$$

(Specific Example of Energy Control in Embodiment 2)

Energy control in Embodiment 2 may be substantially similar to the control in FIG. 20. In the control in FIG. 20, the control gains Gca, Gcb, Gcc may be calculated according to the flowcharts in FIGS. 23 to 25.

Other operations may be substantially similar to the laser apparatus according to the comparative examples or Embodiment 1.

[3.3 Effect]

With the laser apparatus of Embodiment 2, the plurality of control gains Gca, Gcb, Gcc corresponding to the values of the target pulse energies Et are calculated, thereby improving control accuracy of the pulse energy E when the target pulse energy Et is changed. At this time, the amplitude components Ie of the pulse energies E and the amplitude components Iv of the charging voltages V when the value of the target pulse energy Et is changed can be collectively obtained by the spectrum analysis at the end, thereby reducing a processing time required for calculating the control gains Gca, Gcb, Gcc.

In Embodiment 2, the example in which the laser control unit 2 calculates the three control gains Gca, Gcb, Gcc and performs the energy control based on the three control gains Gca, Gcb, Gcc is described. However, not limited to three, two or four or more control gains Gc may be calculated. The laser control unit 2 may perform the energy control based on the two or four or more control gains Gc.

Other effects may be substantially similar to those of the laser apparatus according to the comparative examples or Embodiment 1.

<4. Embodiment 3> (Laser Apparatus Using a Plurality of Control Gains Corresponding to Values of Pulse Repetition Frequencies)

Next, a laser apparatus according to Embodiment 3 of the present disclosure will be described. Substantially the same components as those of the laser apparatus according to the comparative examples or Embodiment 1 or 2 are denoted by the same reference numerals, and descriptions are omitted as appropriate.

[4.1 Configuration]

A laser apparatus according to Embodiment 3 may include a function generator 52 added to the laser control unit 2 in the laser apparatus 101 according to Comparative Example 1 substantially similarly to the laser apparatus 1 according to Comparative Example 2.

The laser apparatus according to Embodiment 3 is different from the laser apparatus 1 according to Comparative Example 2 in an energy control process and a calculation process of a control gain Gc by the laser control unit 2.

In the laser apparatus according to Embodiment 3, the laser control unit 2 may be a pulse energy control unit that periodically varies a target pulse energy Et at modulation frequencies corresponding to a plurality of pulse repetition frequencies with a predetermined reference energy being a center of variation. The predetermined reference energy may be, for example, Eta. The pulse repetition frequencies may be, for example, Rpa, Rpb, Rpc. The modulation frequencies corresponding to the pulse repetition frequencies may be, for example, Fma, Fmb, Fmc.

The laser control unit 2 may be a gain calculation unit that calculates a plurality of control gains, for example, Gca, Gcb, Gcc corresponding to the pulse repetition frequencies.

The laser control unit 2 as the gain calculation unit may calculate an amplitude component of a pulse energy E when periodically varying the target pulse energy Et at the modulation frequencies corresponding to the pulse repetition frequencies with the predetermined reference energy being the center of variation. The laser control unit 2 may calculate an amplitude component of a charging voltage V corresponding to a voltage applied between a pair of discharge electrodes 23, 24 when periodically varying the target pulse energy Et at the modulation frequencies corresponding to the pulse repetition frequencies with the predetermined reference energy being the center of variation. The calculated amplitude components of the pulse energy E may be, for example, Iea, Ieb, Iec. The calculated amplitude components of the charging voltage V may be, for example, Iva, Ivb, Ivc. The laser control unit 2 may calculate the control gains based on the amplitude components of the pulse energy E and the amplitude components of the charging voltage V.

A laser chamber 20 may emit a pulse laser beam Lp having a pulse energy E corresponding to the voltage applied between the discharge electrodes 23, 24 at each of the plurality of pulse repetition frequencies.

Other configurations may be substantially similar to those of the laser apparatus according to the comparative examples or Embodiment 1 or 2.

[4.2 Operation]

The laser control unit 2 may calculate the control gains Gca, Gcb, Gcc by periodically varying the target pulse energy Et at the modulation frequencies Fma, Fmb, Fmc corresponding to the pulse repetition frequencies Rpa, Rpb, Rpc with the predetermined reference energy Eta being the center of variation. Thus, the control gains Gca, Gcb, Gcc corresponding to the pulse repetition frequencies Rpa, Rpb, Rpc may be calculated as the control gains Gc, for example, as expressed below. For example, the modulation frequency Fma may correspond to the pulse repetition frequency Rpa, the modulation frequency Fmb may correspond to the pulse repetition frequency Rpb, and the modulation frequency Fmc may correspond to the pulse repetition frequency Rpc. A magnitude relation of the modulation frequencies Fma, Fmb, Fmc may satisfy Fma>Fmb>Fmc. A magnitude relation of the pulse repetition frequencies Rpa, Rpb, Rpc may satisfy Rpa>Rpb>Rpc. The pulse repetition frequency Rpa may be, for example, 6000 Hz. The pulse repetition frequency Rpb may be, for example, 5000 Hz. The pulse repetition frequency Rpc may be, for example, 3000 Hz. These values of the pulse repetition frequencies Rpa, Rpb, Rpc are merely examples and not limited to them.

$$Rpa:Gca=Gs \cdot Iva/Iea$$

$$Rpb:Gcb=Gs \cdot Ivb/Ieb$$

$$Rpc:Gcc=Gs \cdot Ivc/Iec$$

(Specific Example of Calculation Process of Control Gain in Embodiment 3)

Figure 26:
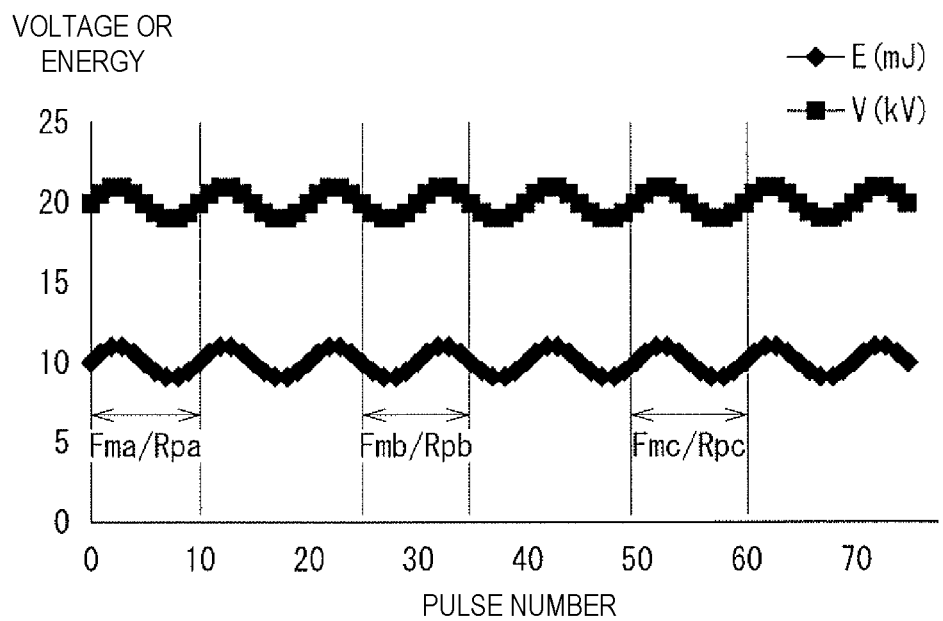
FIG. 26 shows an example of measurement values of a pulse energy and a charging voltage for each pulse in a laser apparatus according to Embodiment 3.
Figure 27:
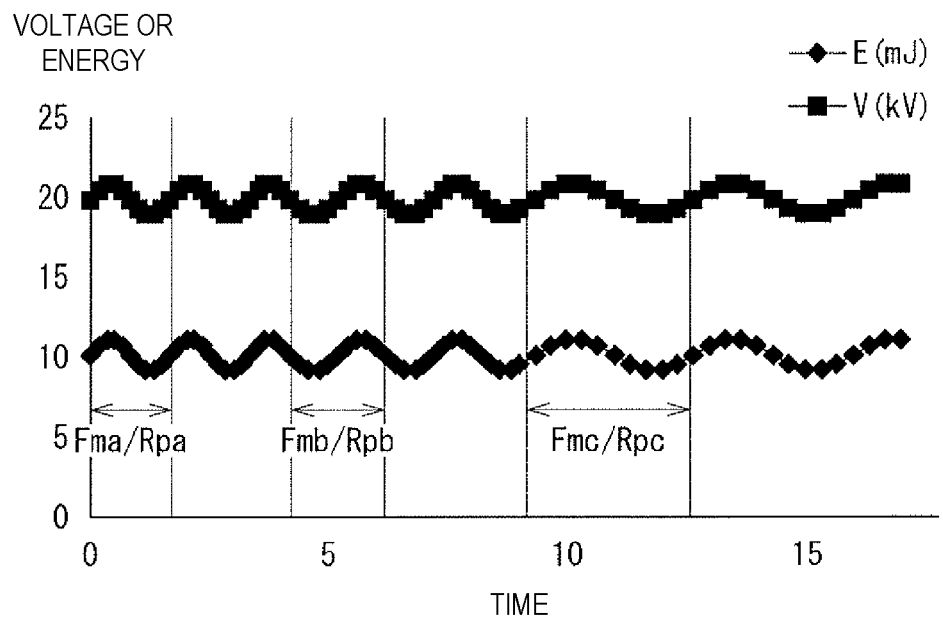
FIG. 27 shows an example of measurement values of a pulse energy and a charging voltage for each unit time in the laser apparatus according to Embodiment 3.
Figure 28:
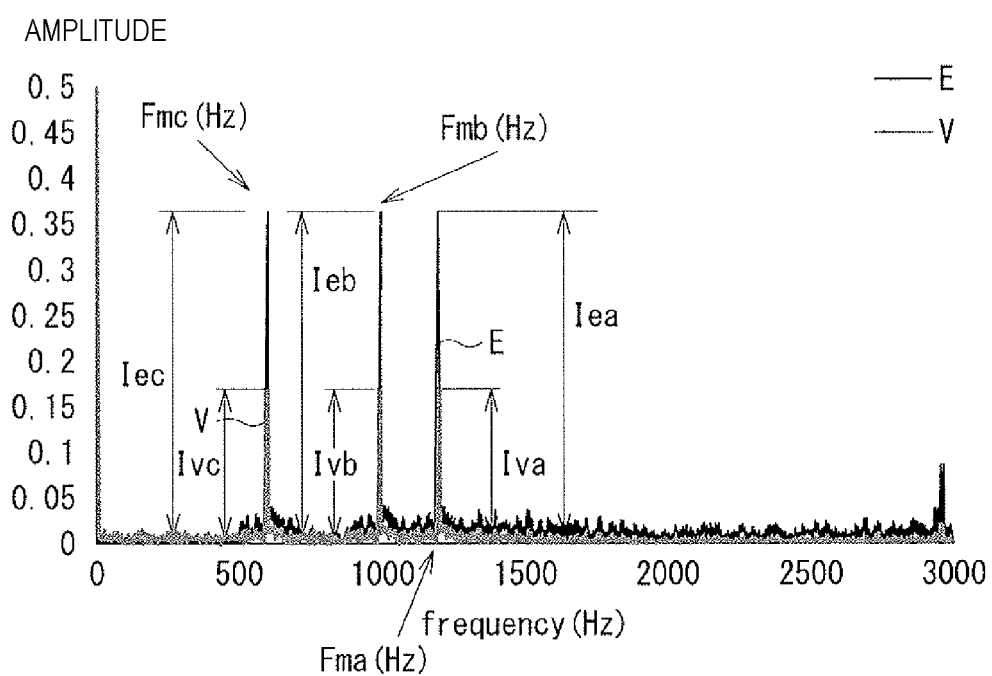
FIG. 28 shows an example of a result of a spectrum analysis on the pulse energy and the charging voltage in FIG. 26.

FIG. 26 shows an example of measurement values of the pulse energy E and the charging voltage V for each pulse in the laser apparatus according to Embodiment 3 of the present disclosure. FIG. 27 shows an example of measurement values of the pulse energy E and the charging voltage V for each unit time in the laser apparatus according to Embodiment 3. FIG. 28 shows an example of a result of a spectrum analysis on the pulse energy E and the charging voltage V in FIG. 26. In FIG. 26, the horizontal axis represents pulse number of a pulse laser beam Lp and the vertical axis represents pulse energy E (mJ) or charging voltage V (kV). FIG. 27 shows measurement values with the horizontal axis representing time rather than the pulse number in FIG. 26. In FIG. 28, the horizontal axis represents frequency (Hz) and the vertical axis represents amplitude value.

Figure 29:
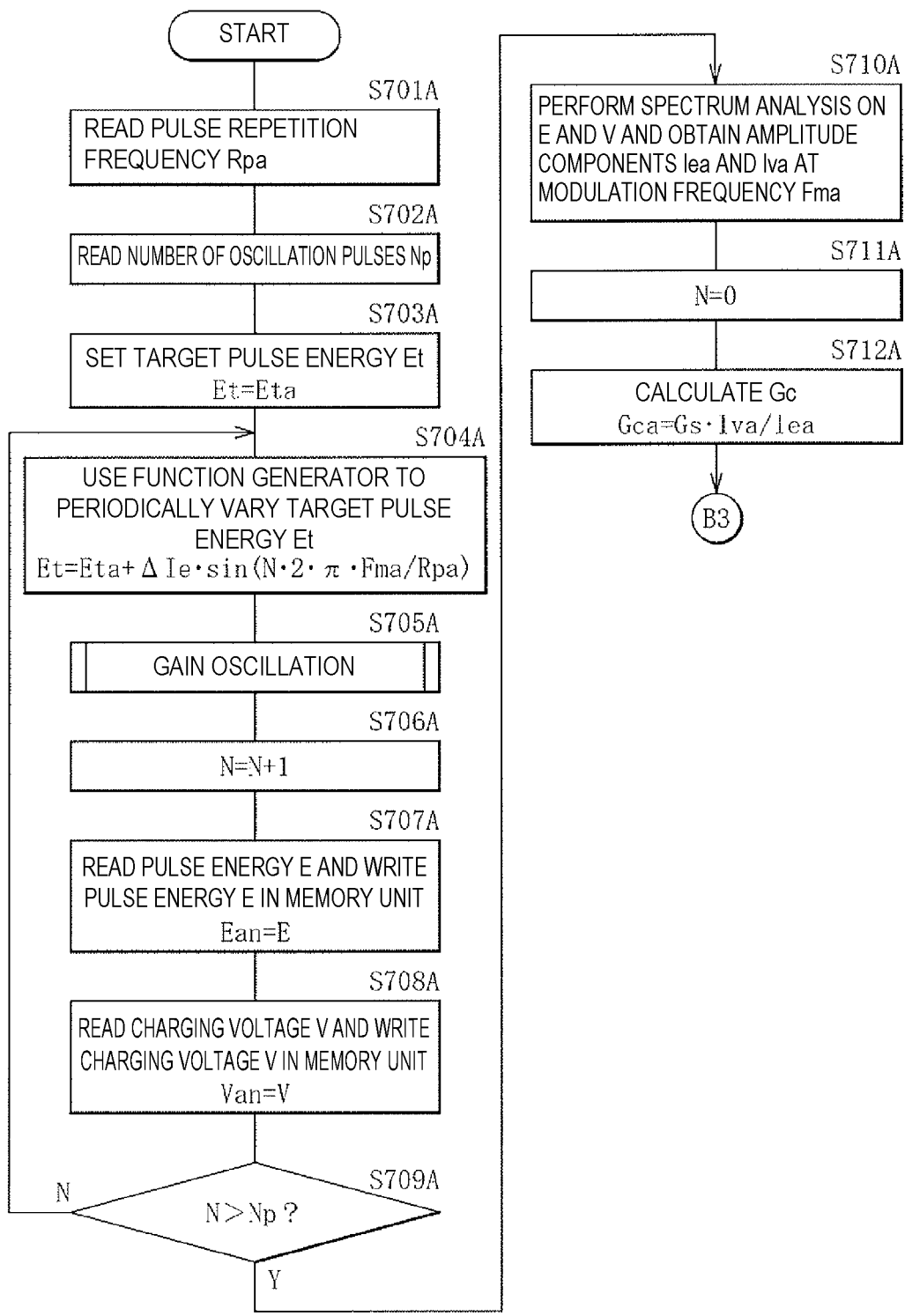
FIG. 29 is a flowchart of an example of a calculation process of a control gain by a laser control unit in the laser apparatus according to Embodiment 3.
Figure 30:
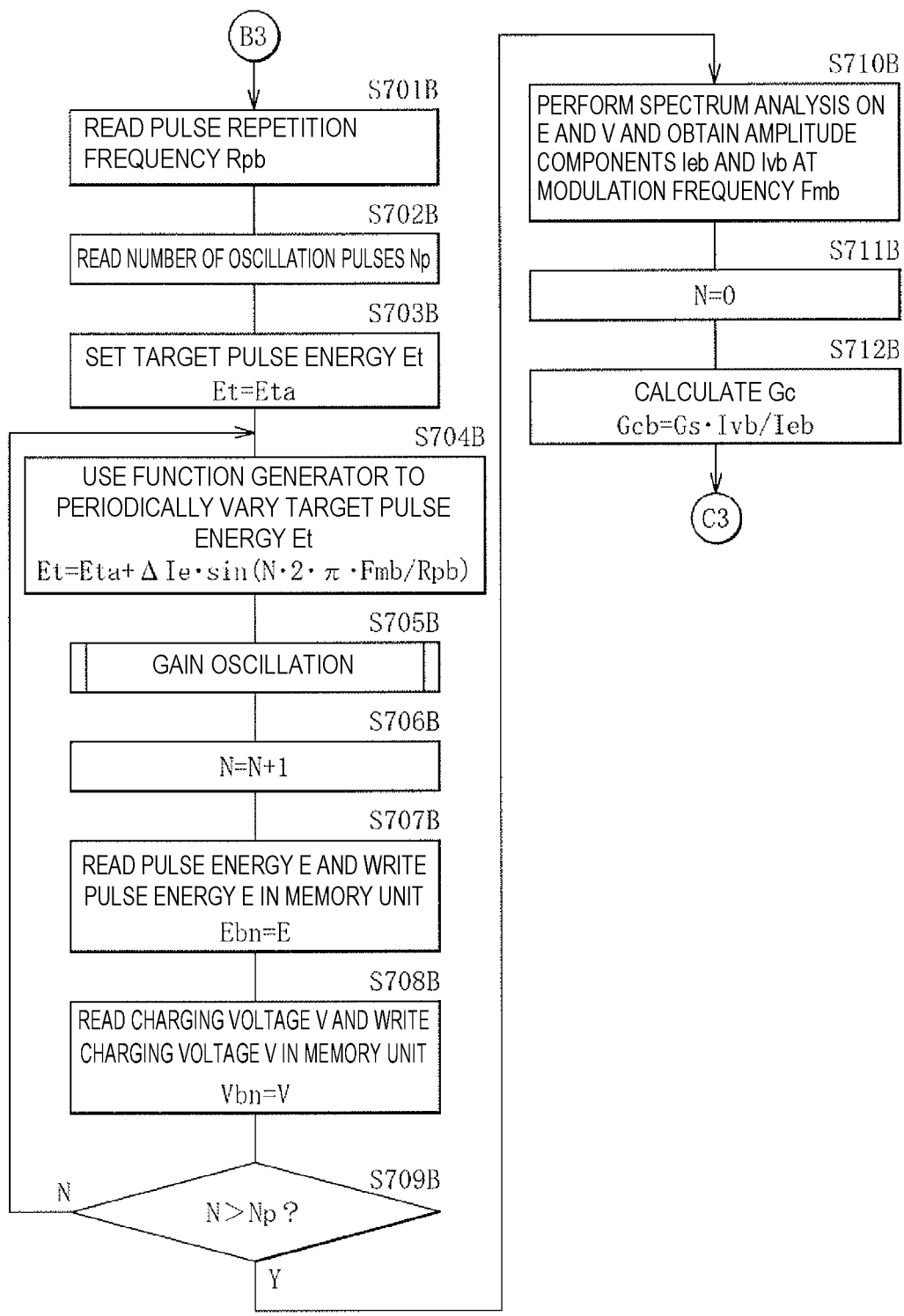
FIG. 30 is a flowchart following FIG. 29.
Figure 31:
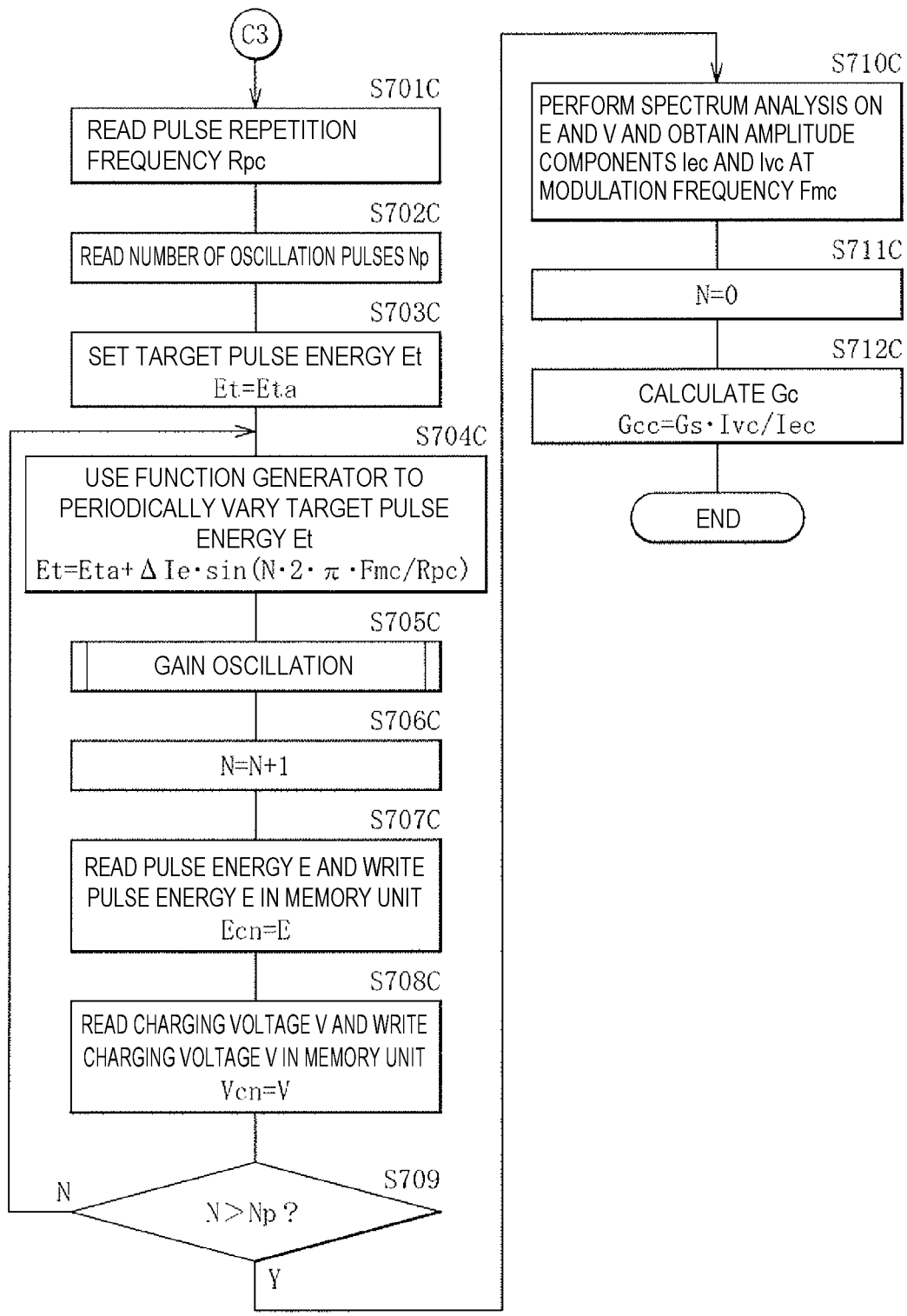
FIG. 31 is a flowchart following FIG. 30.

FIG. 29 is a flowchart of an example of a calculation process of the control gain Gc by the laser control unit 2 in the laser apparatus according to Embodiment 3. FIG. 30 is a flowchart following FIG. 29. FIG. 31 is a flowchart following FIG. 30.

In the process in FIGS. 29 to 31, the amplitude components Ie (Iea, Ieb, Iec) of the pulse energy E and the amplitude components Iv (Iva, Ivb, Ivc) of the charging voltage V, for example, as shown in FIG. 28 may be calculated by the spectrum analysis.

The process in FIGS. 29 to 31 may be performed, for example, according to an instruction from an exposure device 4, after replacement of a laser gas, or after adjustment of pressure of the laser gas. The process may be performed at predetermined intervals.

As shown in FIG. 29, the laser control unit 2 first reads a pulse repetition frequency Rp=Rpa from an exposure device controller 5 or a memory unit 51 (step S701A). Then, the laser control unit 2 reads the number of oscillation pulses Np from the exposure device controller 5 or the memory unit 51 (step S702A). The number of oscillation pulses Np is preferably, for example, 400 to 1500. The number of oscillation pulses Np is more preferably a power of 2 such as 512 or 1024.

Next, the laser control unit 2 sets the target pulse energy Et to a reference energy Eta (step S703A). The laser control unit 2 writes the set target pulse energy Et in the memory unit 51.

Next, the laser control unit 2 uses the function generator 52 to periodically vary the target pulse energy Et with the reference energy Eta being the center of variation as expressed by an equation below (step S704A). Fma is a modulation frequency of the target pulse energy Et corresponding to the pulse repetition frequency Rpa. Rpa/Fma is desirably an integer. Rpa/Fma is desirably in the range of 4 to 10. An amplitude ΔIe is desirably in the range of 0.5 mJ to 2 mJ. The amplitude ΔIe may be determined by a ratio to the reference energy Eta. For example, ΔIe may be 5% to 10% of Eta. Rpa may be, for example, 6000 Hz. Fma may be, for example, 1200 Hz.

$$Et=Eta+\Delta Ie\cdot\sin(N\cdot 2\cdot\pi\cdot Fma/Rpa)$$

Next, the laser control unit 2 performs a gain oscillation process (step S705A). This gain oscillation process may be substantially similar to, for example, the subroutine in FIG. 4.

Next, the laser control unit 2 sets a pulse counter value N to N+1 (step S706A).

Next, the laser control unit 2 reads the value of the pulse energy E from a pulse energy detector 30, and writes, as Ean, the value of the pulse energy E for an n-th pulse in the memory unit 51 (step S707A).

Next, the laser control unit 2 reads the value of the charging voltage V set for a charger 90 from the memory unit 51, and writes, as Van, the value of the charging voltage V for the n-th pulse in the memory unit 51 (step S708A).

Next, the laser control unit 2 determines whether or not the pulse counter value N is larger than the number of oscillation pulses Np (step S709A). When determining that the pulse counter value N is not larger than the number of oscillation pulses Np (step S709A; N), the laser control unit 2 returns to the process in step S704A.

When determining that the pulse counter value N is larger than the number of oscillation pulses Np (step S709A; Y), the laser control unit 2 performs a spectrum analysis on a data row of the stored pulse energy E and charging voltage V, and obtains an amplitude component Iea of the pulse energy E at the modulation frequency Fma and an amplitude component Iva of the charging voltage V at the modulation frequency Fma (step S710A). The spectrum analysis may use Fourier transform, discrete Fourier transform, fast Fourier transform, or the like.

Next, the laser control unit 2 sets the pulse counter value N to 0 (step S711A).

Next, the laser control unit 2 calculates a value Gca of the control gain Gc as expressed by an equation below (step S712A), and goes to the process in FIG. 30. A desirable value of coefficient Gs is, for example, 0.3 to 1 so as to prevent divergence of control.

$$Gca=Gs\cdot\Delta V/\Delta E=Gs\cdot Iva/Iea$$

In the process in FIG. 30, the laser control unit 2 first reads a pulse repetition frequency Rp=Rpb from the exposure device controller 5 or the memory unit 51 (step S701B). Next, the laser control unit 2 reads the number of oscillation pulses Np from the exposure device controller 5 or the memory unit 51 (step S702B). The number of oscillation pulses Np is preferably, for example, 400 to 1500. The number of oscillation pulses Np is more preferably a power of 2 such as 512 or 1024.

Next, the laser control unit 2 sets the target pulse energy Et to the reference energy Eta (step S703B). The laser control unit 2 writes the set target pulse energy Et in the memory unit 51.

Next, the laser control unit 2 uses the function generator 52 to periodically vary the target pulse energy Et with the reference energy Eta being the center of variation as expressed by an equation below (step S704B). Fmb is a modulation frequency of the target pulse energy Et corresponding to the pulse repetition frequency Rpb. Rpb/Fmb is desirably an integer. Rpb/Fmb is desirably in the range of 4 to 10. An amplitude ΔIe is desirably in the range of 0.5 mJ to 2 mJ. The amplitude ΔIe may be determined by a ratio to the reference energy Eta. For example, ΔIe may be 5% to 10% of Eta. Rpb may be, for example, 5000 Hz. Fmb may be, for example, 1000 Hz.

$$Et=Eta+\Delta Ie\cdot\sin(N\cdot 2\cdot\pi\cdot Fmb/Rpb)$$

Next, the laser control unit 2 performs a gain oscillation process (step S705B). This gain oscillation process may be substantially similar to, for example, the subroutine in FIG. 4.

Next, the laser control unit 2 sets the pulse counter value N to N+1 (step S706B).

Next, the laser control unit 2 reads the value of the pulse energy E from the pulse energy detector 30, and writes, as Ebn, the value of the pulse energy E for an n-th pulse in the memory unit 51 (step S707B).

Next, the laser control unit 2 reads the value of the charging voltage V set for the charger 90 from the memory unit 51, and writes, as Vbn, the value of the charging voltage V for the n-th pulse in the memory unit 51 (step S708B).

Next, the laser control unit 2 determines whether or not the pulse counter value N is larger than the number of oscillation pulses Np (step S709B). When determining that the pulse counter value N is not larger than the number of oscillation pulses Np (step S709B; N), the laser control unit 2 returns to the process in step S704B.

When determining that the pulse counter value N is larger than the number of oscillation pulses Np (step S709B; Y), the laser control unit 2 performs a spectrum analysis on a data row of the stored pulse energy E and charging voltage V, and obtains an amplitude component Ieb of the pulse energy E at the modulation frequency Fmb and an amplitude component Ivb of the charging voltage V at the modulation frequency Fmb (step S710B). The spectrum analysis may use Fourier transform, discrete Fourier transform, fast Fourier transform, or the like.

Next, the laser control unit 2 sets the pulse counter value N to 0 (step S711B).

Next, the laser control unit 2 calculates a value Gcb of the control gain Gc as expressed by an equation below (step S712B), and goes to the process in FIG. 31. A desirable value of coefficient Gs is, for example, 0.3 to 1 so as to prevent divergence of control.

$$Gcb=Gs\cdot\Delta V/\Delta E=Gs\cdot Ivb/Ieb$$

In the process in FIG. 31, the laser control unit 2 first reads a pulse repetition frequency Rp=Rpc from the exposure device controller 5 or the memory unit 51 (step S701C). Then, the laser control unit 2 reads the number of oscillation pulses Np from the exposure device controller 5 or the memory unit 51 (step S702C). The number of oscillation pulses Np is preferably, for example, 400 to 1500. The number of oscillation pulses Np is more preferably a power of 2 such as 512 or 1024.

Next, the laser control unit 2 sets the target pulse energy Et to the reference energy Eta (step S703C). The laser control unit 2 writes the set target pulse energy Et in the memory unit 51.

Next, the laser control unit 2 uses the function generator 52 to periodically vary the target pulse energy Et with the reference energy Eta being the center of variation as expressed by an equation below (step S704C). Fmc is a modulation frequency of the target pulse energy Et corresponding to the pulse repetition frequency Rpc. Rpc/Fmc is desirably an integer. Rpc/Fmc is desirably in the range of 4 to 10. An amplitude ΔIe is desirably in the range of 0.5 mJ to 2 mJ. The amplitude ΔIe may be determined by a ratio to the reference energy Eta. For example, ΔIe may be 5% to 10% of Eta. Rpc may be, for example, 3000 Hz. Fmc may be, for example, 600 Hz.

$$Et = Eta + \Delta Ie \cdot \sin(N \cdot 2 \cdot \pi \cdot Fmc/Rpc)$$

Next, the laser control unit 2 performs a gain oscillation process (step S705C). This gain oscillation process may be substantially similar to, for example, the subroutine in FIG. 4.

Next, the laser control unit 2 sets the pulse counter value N to N+1 (step S706C).

Next, the laser control unit 2 reads the value of the pulse energy E from the pulse energy detector 30, and writes, as Ecn, the value of the pulse energy E for an n-th pulse in the memory unit 51 (step S707C).

Next, the laser control unit 2 reads the value of the charging voltage V set for the charger 90 from the memory unit 51, and writes, as Vcn, the value of the charging voltage V for the n-th pulse in the memory unit 51 (step S708C).

Next, the laser control unit 2 determines whether or not the pulse counter value N is larger than the number of oscillation pulses Np (step S709C). When determining that the pulse counter value N is not larger than the number of oscillation pulses Np (step S709C; N), the laser control unit 2 returns to the process in step S704C.

When determining that the pulse counter value N is larger than the number of oscillation pulses Np (step S709C; Y), the laser control unit 2 performs a spectrum analysis on a data row of the stored pulse energy E and charging voltage V, and obtains an amplitude component Iec of the pulse energy E at the modulation frequency Fmc and an amplitude component Ivc of the charging voltage V at the modulation frequency Fmc (step S710C). The spectrum analysis may use Fourier transform, discrete Fourier transform, fast Fourier transform, or the like.

Next, the laser control unit 2 sets the pulse counter value N to 0 (step S711C).

Next, the laser control unit 2 calculates a value Gcc of the control gain Gc as expressed by an equation below (step S712C), and finishes the process. A desirable value of coefficient Gs is, for example, 0.3 to 1 so as to prevent divergence of control.

$$Gcc = Gs \cdot \Delta V / \Delta E = Gs \cdot Ivc / Iec$$

(Specific Example of Energy Control in Embodiment 3)

Figure 32:
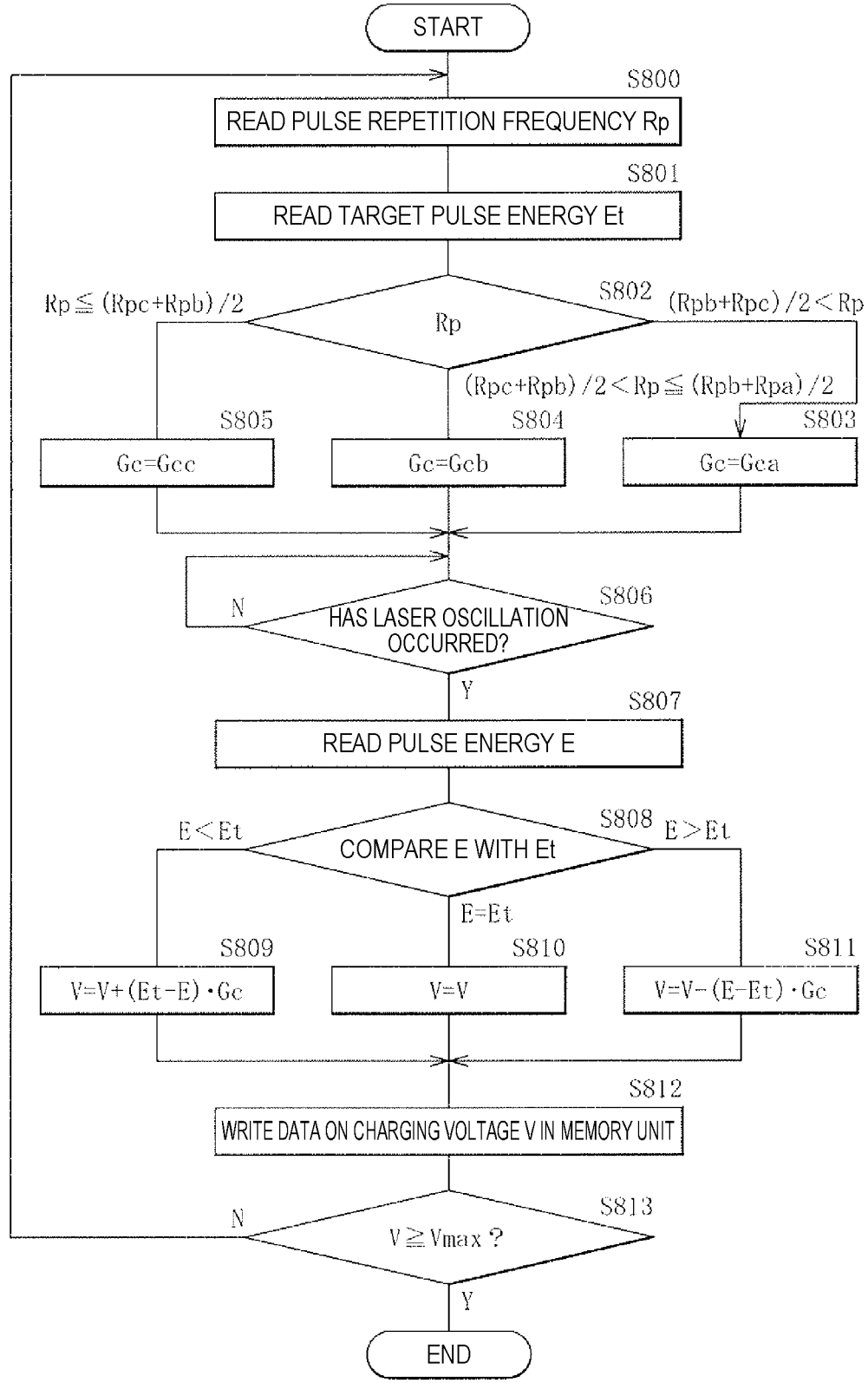
FIG. 32 is a flowchart of an example of control of a pulse energy by the laser control unit in the laser apparatus according to Embodiment 3.

FIG. 32 is a flowchart of an example of control of the pulse energy by the laser control unit 2 in the laser apparatus according to Embodiment 3.

The laser control unit 2 first reads the pulse repetition frequency Rp from the exposure device controller 5 or the memory unit 51 (step S800).

Next, the laser control unit 2 reads the target pulse energy Et from the exposure device controller 5 or the memory unit 51 (step S801).

Next, the laser control unit 2 determines which of the control gains Gca, Gcb, Gcc the pulse repetition frequency Rp corresponds to (step S802). The control gains Gca, Gcb, Gcc may be calculated according to the flowcharts in FIGS. 29 to 31.

When determining that the pulse repetition frequency Rp is higher than a predetermined value, for example, (Rpb+Rpa)/2<Rp is satisfied, the laser control unit 2 sets the value of the control gain Gc to Gca (step S803).

When determining that the pulse repetition frequency Rp is within a predetermined range, for example, (Rpc+Rpb)/2<Rp≤(Rpb+Rpa)/2 is satisfied, the laser control unit 2 sets the value of the control gain Gc to Gcb (step S804).

When determining that the pulse repetition frequency Rp is the predetermined value or lower, for example, Rp≤(Rpc+Rpb)/2 is satisfied, the laser control unit 2 sets the value of the control gain Gc to Gcc (step S805).

Next, the laser control unit 2 determines whether or not laser oscillation has occurred (step S806). When determining that the laser oscillation has not occurred (step S806; N), the laser control unit 2 repeats the process in step S806.

When determining that the laser oscillation has occurred (step S806; Y), the laser control unit 2 reads the value of the pulse energy E from the pulse energy detector 30 (step S807).

Next, the laser control unit 2 compares the pulse energy E with the target pulse energy Et (step S808). When determining that the pulse energy E is substantially equal to the target pulse energy Et (E=Et), the laser control unit 2 takes data on the current charging voltage V as it is as data on the charging voltage V (step S810), and writes the data in the memory unit 51 (step S812).

When determining that the pulse energy E is lower than the target pulse energy Et (E<Et), the laser control unit 2 adds a value obtained by multiplying a difference (Et−E) between the target pulse energy Et and the pulse energy E by the control gain Gc to the charging voltage V to obtain a new charging voltage V as expressed by an equation below (step S809), and writes data on the charging voltage V in the memory unit 51 (step S812).

$$V = V + (Et - E) \cdot Gc$$

When determining that the pulse energy E is higher than the target pulse energy Et (E>Et), the laser control unit 2 subtracts a value obtained by multiplying a difference (E−Et) between the pulse energy E and the target pulse energy Et by the control gain Gc from the charging voltage V to obtain a new charging voltage V as expressed by an equation below (step S811), and writes data on the charging voltage V in the memory unit 51 (step S813).

$$V = V - (E - Et) \cdot Gc$$

Next, the laser control unit 2 determines whether or not the charging voltage V has reached a predetermined maximum value Vmax or higher (step S813). When determining that the charging voltage V has not reached the predetermined maximum value Vmax or higher (step S813; N), the laser control unit 2 returns to the process in step S800. When determining that the charging voltage V has reached the predetermined maximum value Vmax or higher (step S813; Y), the laser control unit 2 finishes the energy control process.

Other operations may be substantially similar to those of the laser apparatus according to the comparative examples or Embodiment 1 or 2.

[4.3 Effect]

With the laser apparatus of Embodiment 3, the plurality of control gains Gca, Gcb, Gcc corresponding to the plurality of pulse repetition frequencies Rpa, Rpb, Rpc are calculated, thereby improving control accuracy of the pulse energy E when the pulse repetition frequency Rp is changed.

In Embodiment 3, the example in which the laser control unit 2 calculates the three control gains Gca, Gcb, Gcc based on the three pulse repetition frequencies Rpa, Rpb, Rpc is described. However, two or more pulse repetition frequencies Rp may be used. The laser control unit 2 may calculate two or four or more control gains Gc corresponding to the number of the pulse repetition frequencies Rp. The laser control unit 2 may perform the energy control based on the two or four or more control gains Gc.

Other effects may be substantially similar to those of the laser apparatus according to the comparative examples or Embodiment 1 or 2.

<5. Embodiment 4> (Laser Apparatus Using a Plurality of Control Gains Corresponding to Values of Target Pulse Energies and Values of Pulse Repetition Frequencies)

Next, a laser apparatus according to Embodiment 4 of the present disclosure will be described. Substantially the same components as those of the laser apparatus according to the comparative examples or Embodiment 1, 2, or 3 are denoted by the same reference numerals, and descriptions are omitted as appropriate.

[5.1 Configuration]

A laser apparatus according to Embodiment 4 may include a function generator 52 added to the laser control unit 2 in the laser apparatus 101 according to Comparative Example 1 substantially similarly to the laser apparatus 1 according to Comparative Example 2.

The laser apparatus according to Embodiment 4 is different from the laser apparatus 1 according to Comparative Example 2 in an energy control process and a calculation process of a control gain Gc by the laser control unit 2.

In the laser apparatus according to Embodiment 4, the laser control unit 2 may be a pulse energy control unit that periodically varies a target pulse energy Et at modulation frequencies corresponding to a plurality of pulse repetition frequencies with each of a plurality of reference energies being a center of variation. The reference energies may be, for example, Eta, Etb, Etc. The pulse repetition frequencies may be, for example, Rpa, Rpb, Rpc. The modulation frequencies corresponding to the pulse repetition frequencies may be, for example, Fma, Fmb, Fmc.

The laser control unit 2 may be a gain calculation unit that calculates a plurality of control gains, for example, Gcaa, Gcba, Gcca, Gcab, Gcbb, Gccb, Gcac, Gcbc, Gccc corresponding to the reference energies and the pulse repetition frequencies.

The laser control unit 2 as the gain calculation unit may calculate an amplitude component of a pulse energy E when periodically varying the target pulse energy Et at the modulation frequencies corresponding to the pulse repetition frequencies with each of the reference energies being the center of variation. The laser control unit 2 may calculate an amplitude component of a charging voltage V corresponding to a voltage applied between a pair of discharge electrodes 23, 24 when periodically varying the target pulse energy Et at the modulation frequencies corresponding to the pulse repetition frequencies with each of the reference energies being the center of variation. The calculated amplitude components of the pulse energy E may be, for example, Ieaa, Ieab, Ieac, Ieba, Iebb, Iebc, Ieca, Iecb, Iecc. The calculated amplitude components of the charging voltage V may be, for example, Ivaa, Ivab, Ivac, Ivba, Ivbb, Ivbc, Ivca, Ivcb, Ivcc.

The laser control unit 2 may calculate the control gains based on the amplitude components of the pulse energy E and the amplitude components of the charging voltage V.

A laser chamber 20 may emit a pulse laser beam Lp having a pulse energy E corresponding to the voltage applied between the discharge electrodes 23, 24 at each of the pulse repetition frequencies.

Other configurations may be substantially similar to those of the laser apparatus according to the comparative examples or Embodiment 1, 2, or 3.

[5.2 Operation]

The laser control unit 2 may calculate the control gains Gcaa, Gcba, Gcca, Gcab, Gcbb, Gccb, Gcac, Gcbc, Gccc by periodically varying the target pulse energy Et at the modulation frequencies Fma, Fmb, Fmc corresponding to the pulse repetition frequencies Rpa, Rpb, Rpc with each of the reference energies Eta, Etb, Etc being the center of variation. Thus, the control gains Gcaa, Gcba, Gcca, Gcab, Gcbb, Gccb, Gcac, Gcbc, Gccc corresponding to the values of the target pulse energies Et and the values of the pulse repetition frequencies may be calculated as the control gains Gc, for example, as expressed below. For example, the control gains Gcaa, Gcba, Gcca may be calculated based on the reference energy Eta. For example, the control gains Gcab, Gcbb, Gccb may be calculated based on the reference energy Etb. For example, the control gains Gcac, Gcbc, Gccc may be calculated based on the reference energy Etc. A magnitude relation of the reference energies Eta, Etb, Etc may satisfy Eta<Etb<Etc. For example, the modulation frequency Fma may correspond to the pulse repetition frequency Rpa, the modulation frequency Fmb may correspond to the pulse repetition frequency Rpb, and the modulation frequency Fmc may correspond to the pulse repetition frequency Rpc. A magnitude relation of the modulation frequencies Fma, Fmb, Fmc may satisfy Fma>Fmb>Fmc. A magnitude relation of the pulse repetition frequencies Rpa, Rpb, Rpc may satisfy Rpa>Rpb>Rpc. The pulse repetition frequency Rpa may be, for example, 6000 Hz. The pulse repetition frequency Rpb may be, for example, 5000 Hz. The pulse repetition frequency Rpc may be, for example, 3000 Hz. These values of the pulse repetition frequencies Rpa, Rpb, Rpc are merely examples and not limited to them. Set values of the target pulse energies Et mentioned below are merely examples and not limited to them.

$Rpa, Et \leq 9.5: Gcaa = Gs \cdot Ivaa/Ieaa$ $Rpb, Et \leq 9.5: Gcba = Gs \cdot Ivba/Ieba$ $Rpc, Et \leq 9.5: Gcca = Gs \cdot Ivca/Ieca$ $Rpa, 9.5 < Et \leq 10.5: Gcab = Gs \cdot Ivab/Ieab$ $Rpb, 9.5 < Et \leq 10.5: Gcbb = Gs \cdot Ivbb/Iebb$ $Rpc, 9.5 < Et \leq 10.5: Gccb = Gs \cdot Ivcb/Iecb$ $Rpa, 10.5 < Et: Gcac = Gs \cdot Ivac/Ieac$ $Rpb, 10.5 < Et: Gcbc = Gs \cdot Ivbc/Iebc$ $Rpc, 10.5 < Et: Gccc = Gs \cdot Ivcc/Iecc$ (Specific Example of Calculation Process of Control Gain in Embodiment 4)

Figure 33:
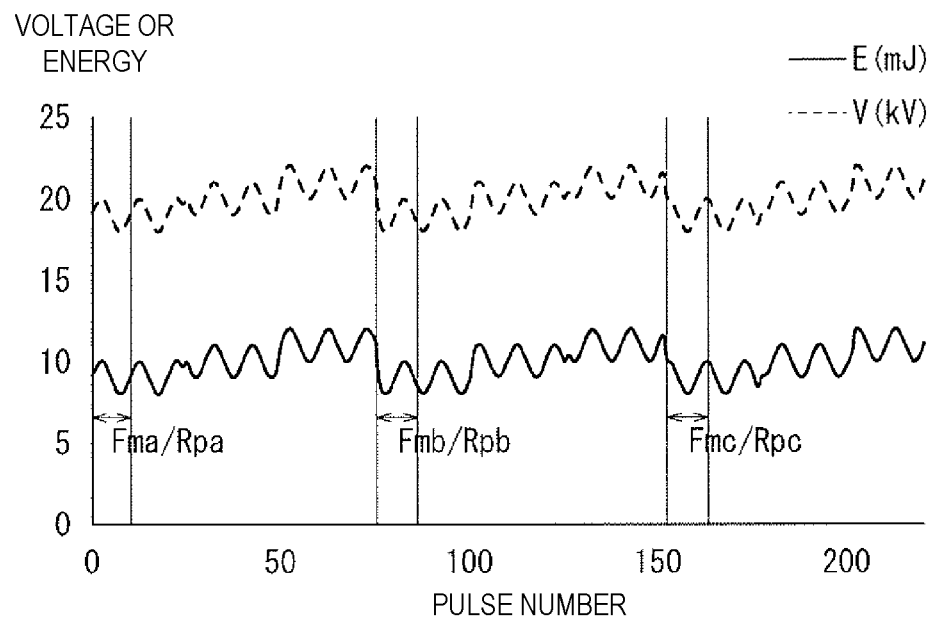
FIG. 33 shows an example of measurement values of a pulse energy and a charging voltage for each pulse in the laser apparatus according to Embodiment 4.
Figure 34:
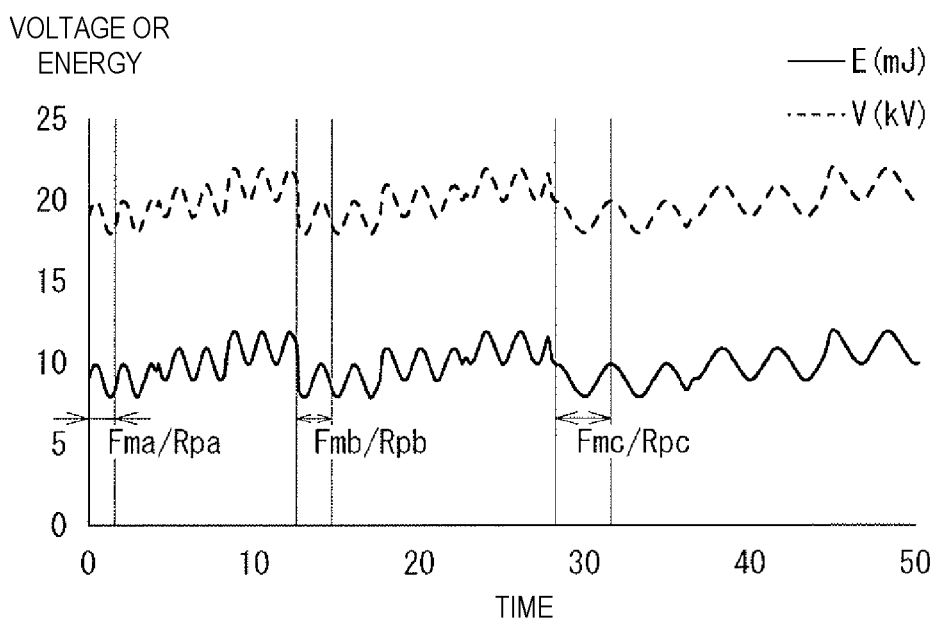
FIG. 34 shows an example of measurement values of a pulse energy and a charging voltage for each unit time in the laser apparatus according to Embodiment 4.
Figure 35:
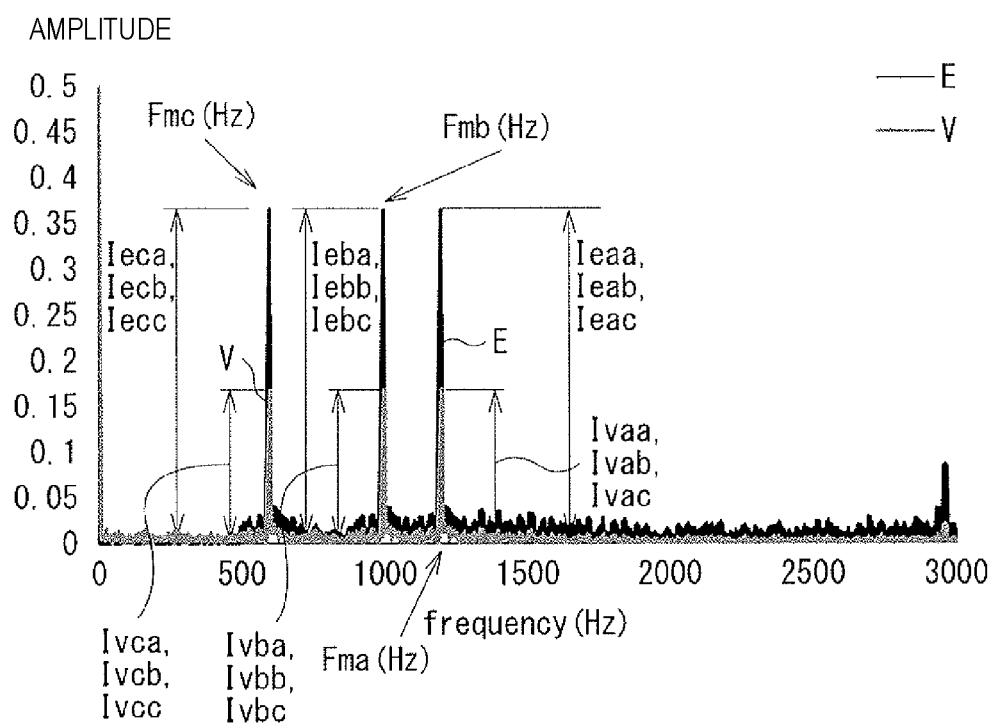
FIG. 35 shows an example of a result of a spectrum analysis on the pulse energy and the charging voltage in FIG. 33.

FIG. 33 shows an example of measurement values of the pulse energy E and the charging voltage V for each pulse in the laser apparatus according to Embodiment 4 of the present disclosure. FIG. 34 shows an example of measurement values of the pulse energy E and the charging voltage V for each unit time in the laser apparatus according to Embodiment 4. FIG. 35 shows an example of a result of a spectrum analysis on the pulse energy E and the charging voltage V in FIG. 33. In FIG. 33, the horizontal axis represents pulse number of a pulse laser beam Lp and the vertical axis represents pulse energy E (mJ) or charging voltage V (kV). FIG. 34 shows measurement values with the horizontal axis representing time rather than the pulse number in FIG. 33. In FIG. 35, the horizontal axis represents frequency (Hz) and the vertical axis represents amplitude value.

Figure 36:
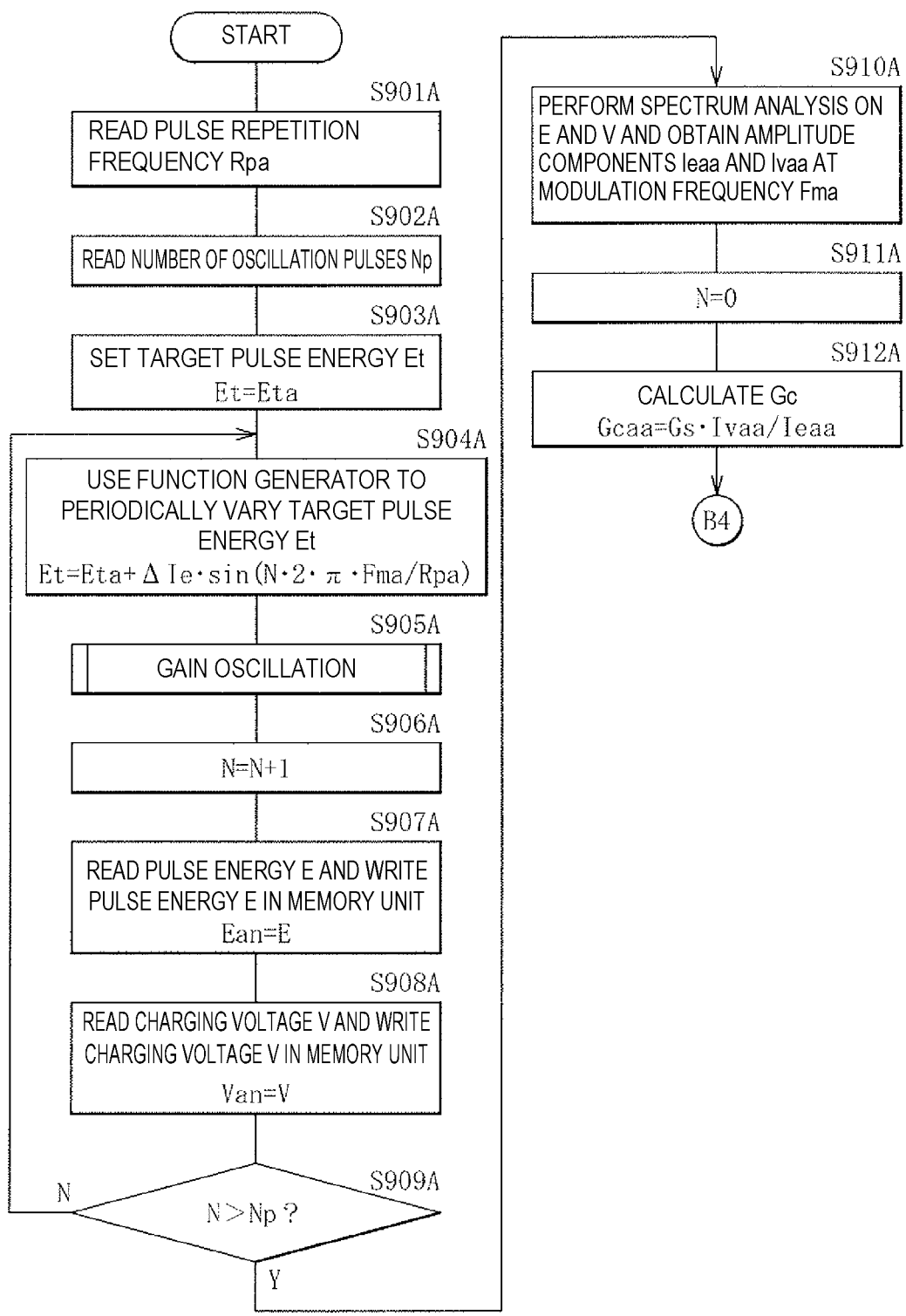
FIG. 36 is a flowchart of an example of a calculation process of a control gain by a laser control unit in the laser apparatus according to Embodiment 4.
Figure 37:
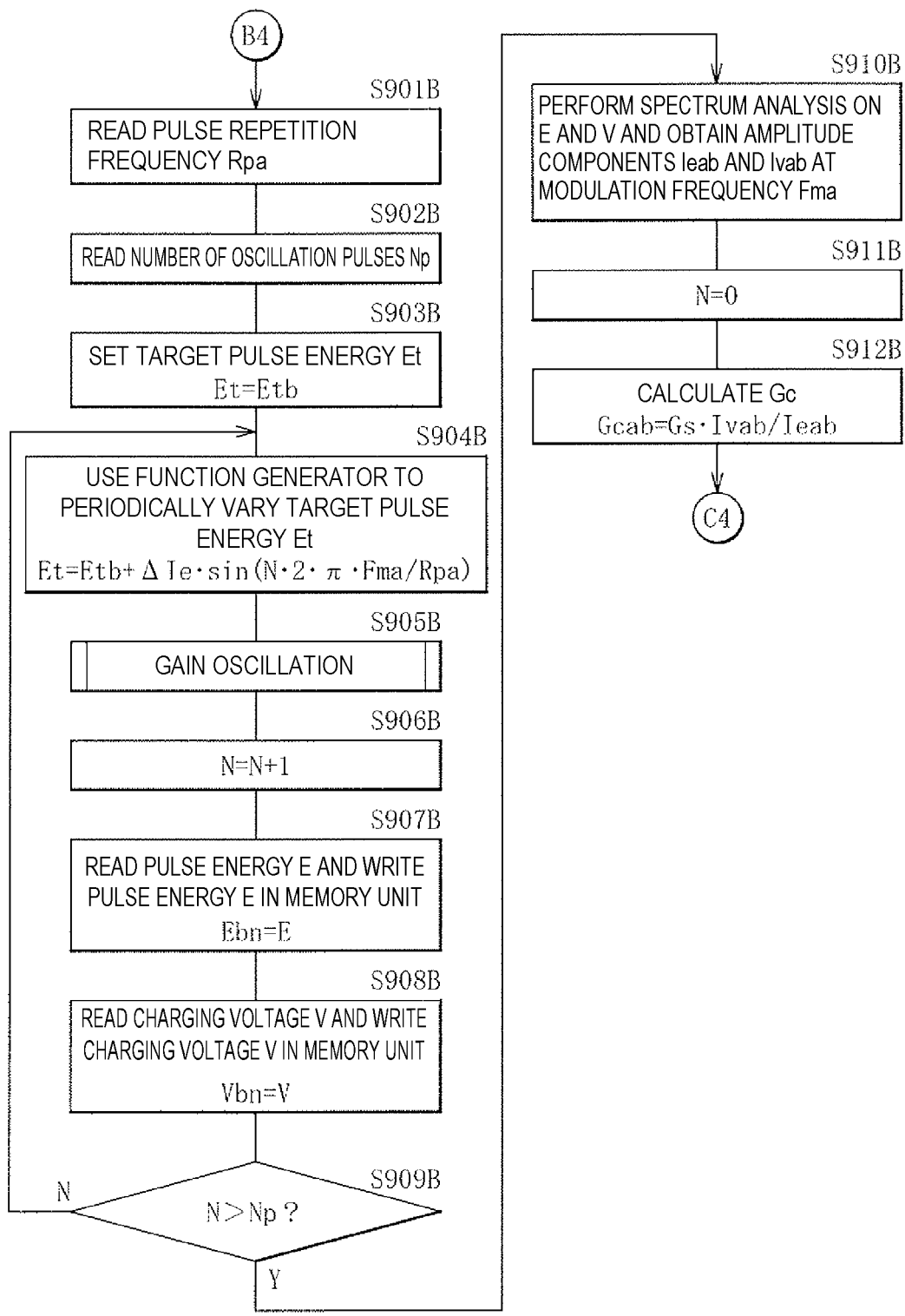
FIG. 37 is a flowchart following FIG. 36.
Figure 38:
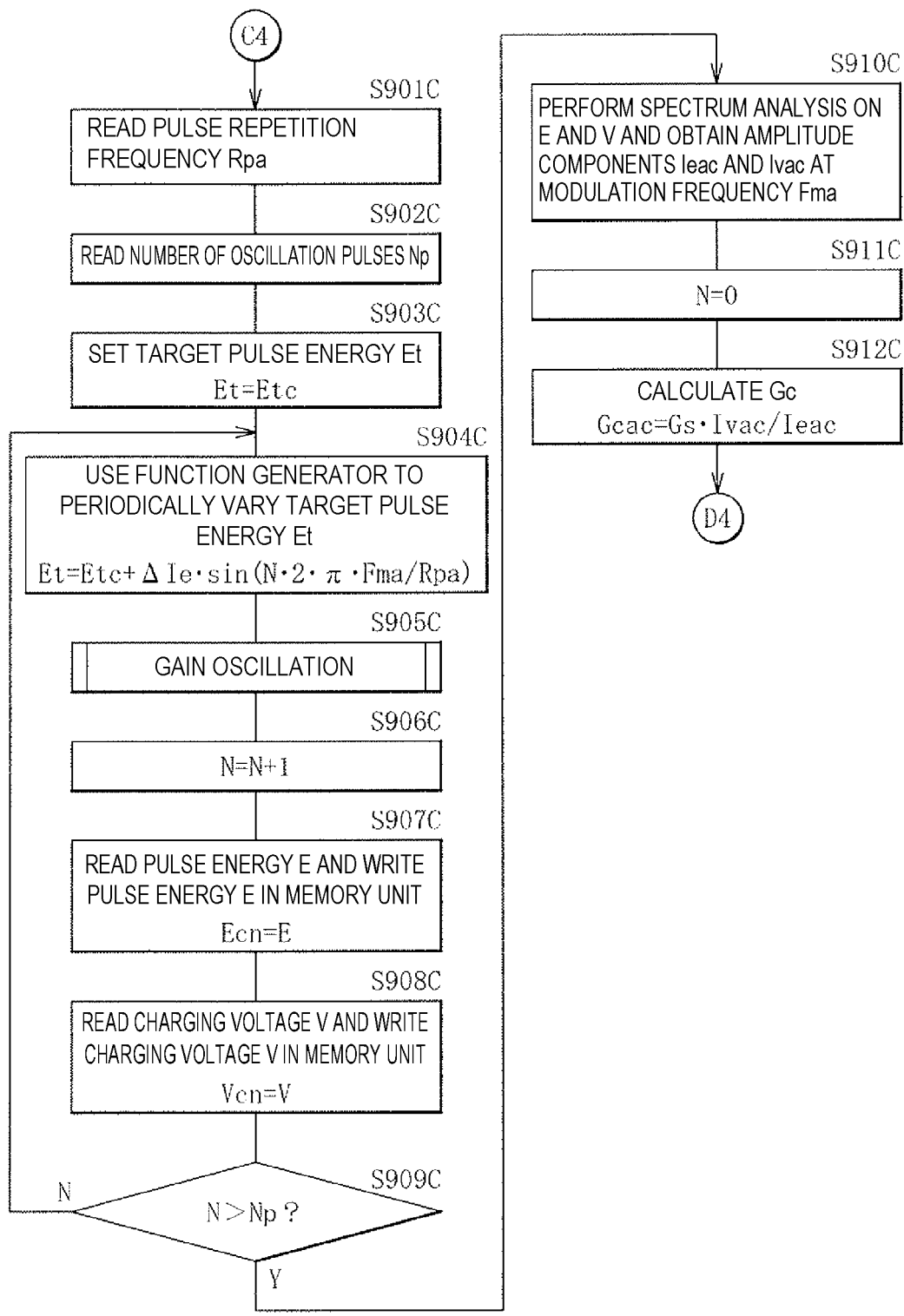
FIG. 38 is a flowchart following FIG. 37.
Figure 39:
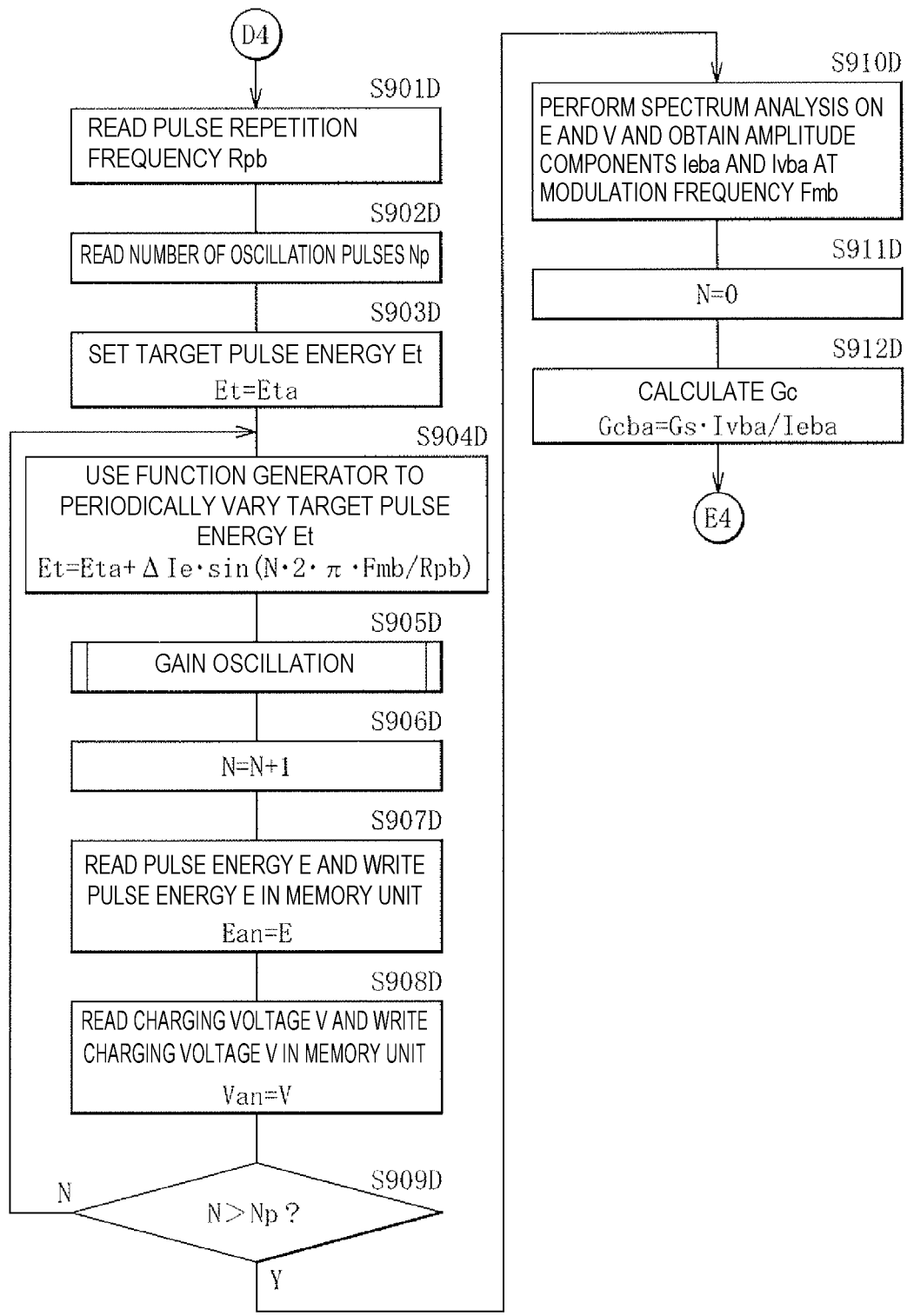
FIG. 39 is a flowchart following FIG. 38.
Figure 40:
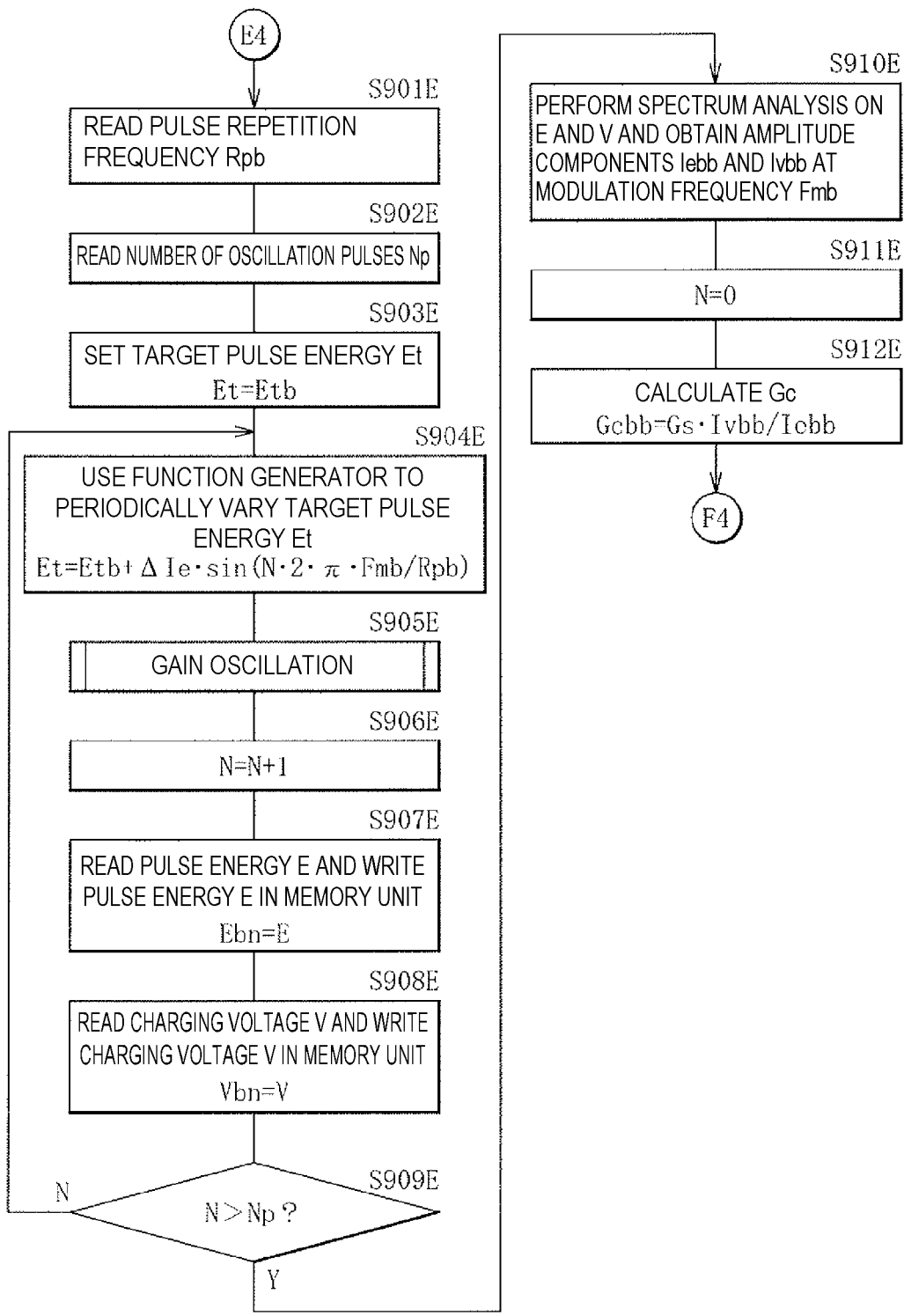
FIG. 40 is a flowchart following FIG. 39.
Figure 41:
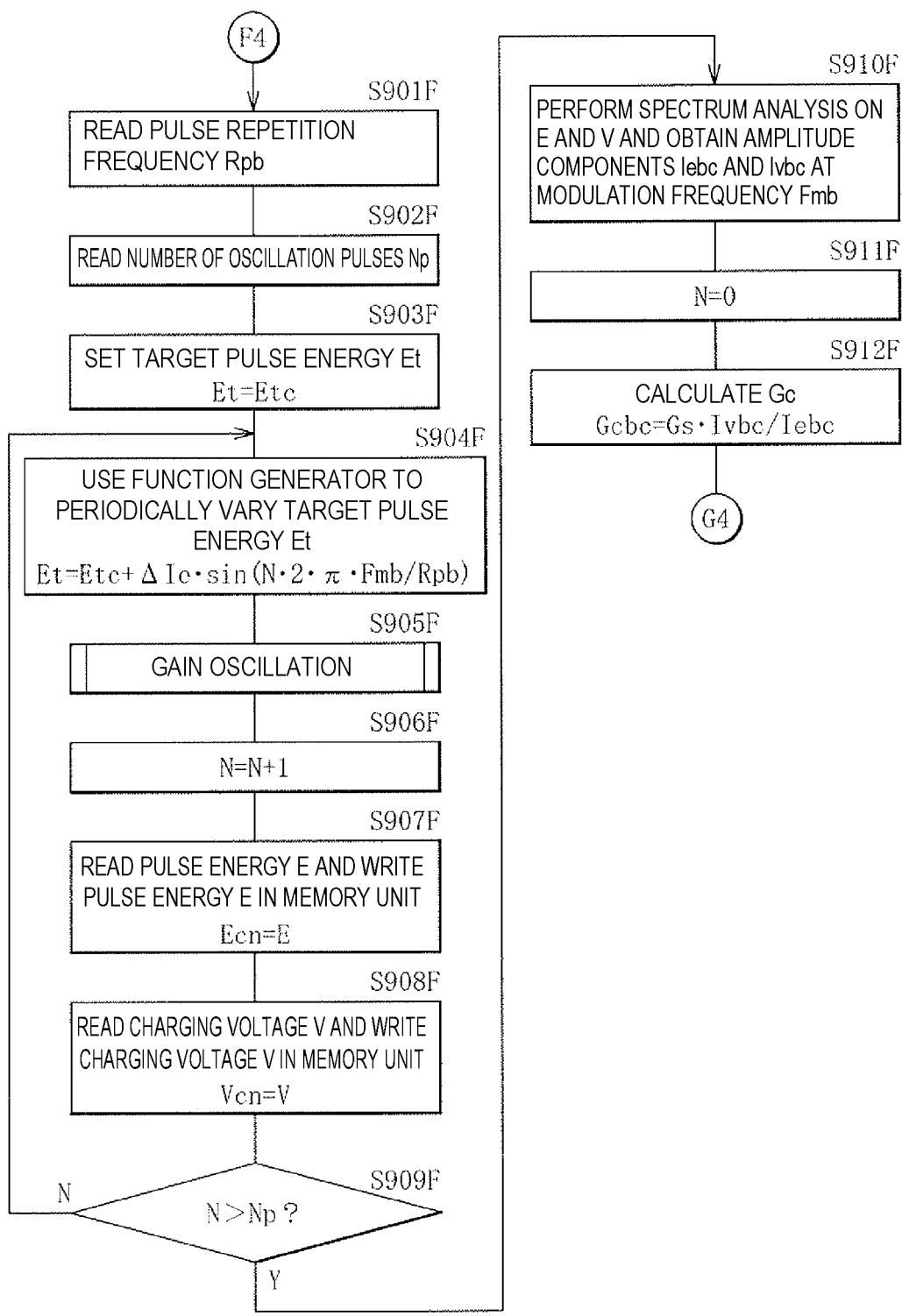
FIG. 41 is a flowchart following FIG. 40.
Figure 42:
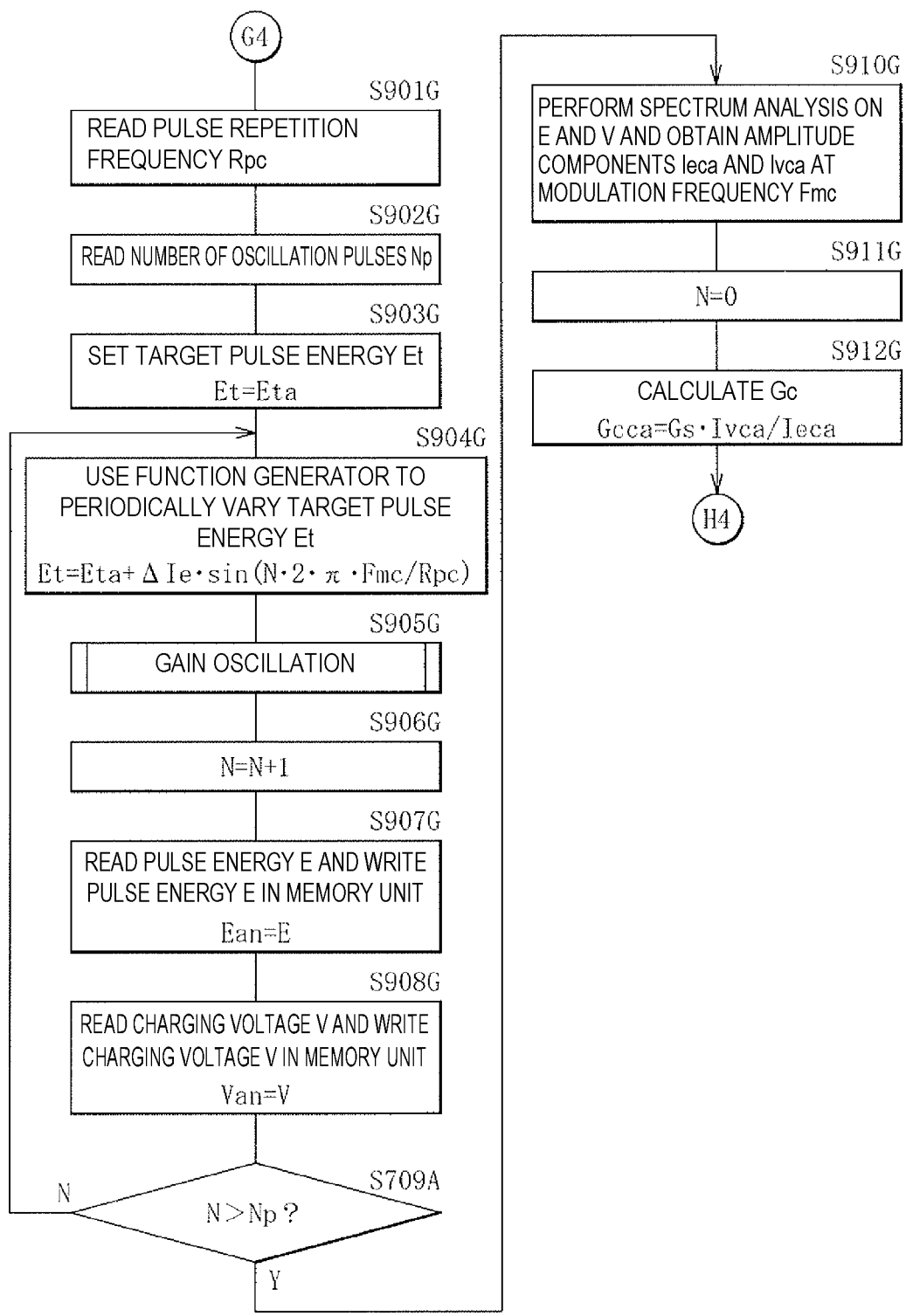
FIG. 42 is a flowchart following FIG. 41.
Figure 43:
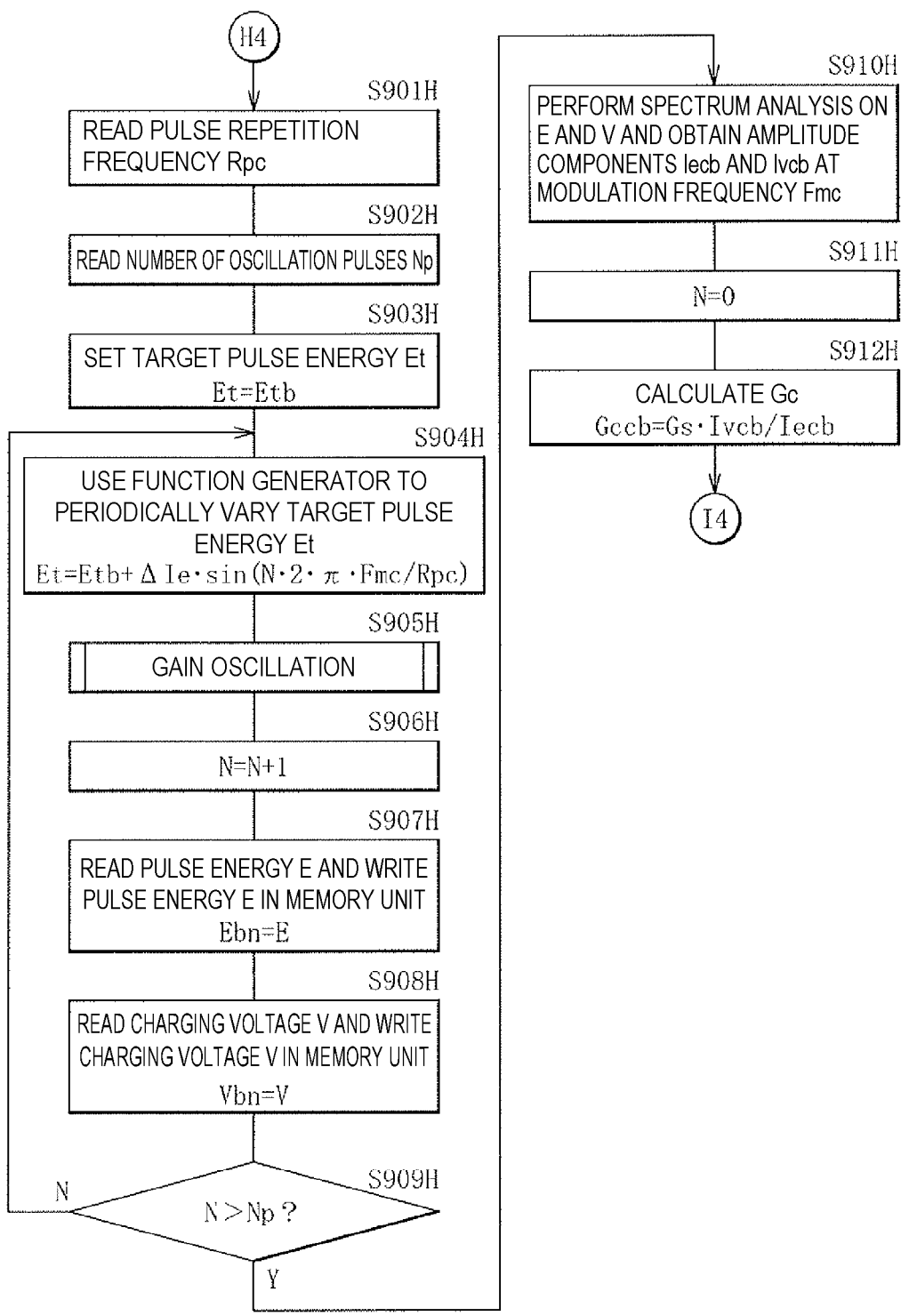
FIG. 43 is a flowchart following FIG. 42.
Figure 44:
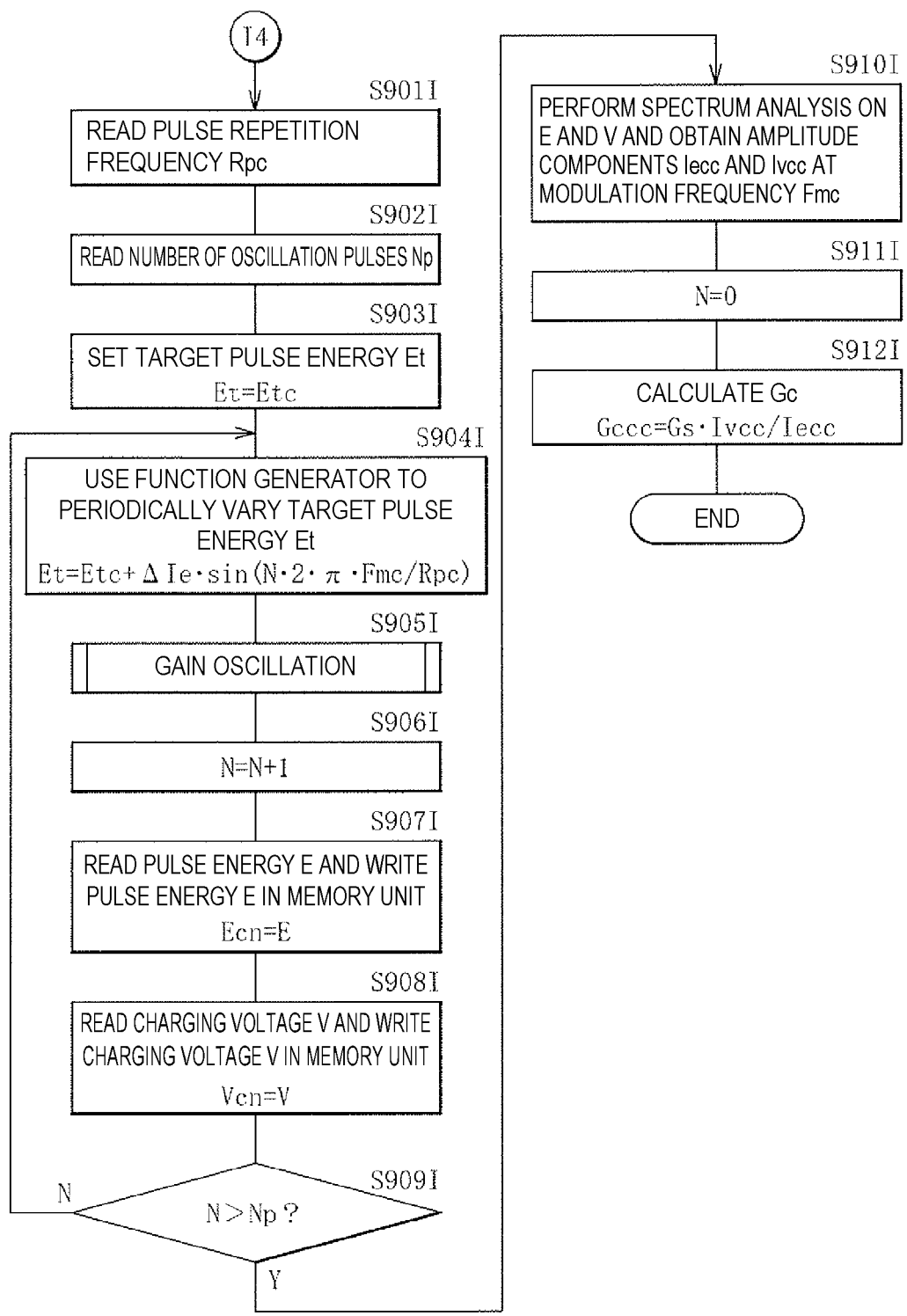
FIG. 44 is a flowchart following FIG. 43.

FIG. 36 is a flowchart of an example of a calculation process of the control gain by the laser control unit in the laser apparatus according to Embodiment 4. FIG. 37 is a flowchart following FIG. 36. FIG. 38 is a flowchart following FIG. 37. FIG. 39 is a flowchart following FIG. 38. FIG. 40 is a flowchart following FIG. 39. FIG. 41 is a flowchart following FIG. 40. FIG. 42 is a flowchart following FIG. 41. FIG. 43 is a flowchart following FIG. 42. FIG. 44 is a flowchart following FIG. 43.

In the process in FIGS. 36 to 44, the amplitude components Ie (Ieaa, Ieab, Ieac, Ieba, Iebb, Iebc, Ieca, Iecb, Iecc) of the pulse energy E and the amplitude components Iv (Ivaa, Ivab, Ivac, Ivba, Ivbb, Ivbc, Ivca, Ivcb, Ivcc) of the charging voltage V, for example, as shown in FIG. 35 may be calculated by the spectrum analysis.

The process in FIGS. 36 to 44 may be performed, for example, according to an instruction from an exposure device 4, after replacement of a laser gas, or after adjustment of pressure of the laser gas. The process may be performed at predetermined intervals.

As shown in FIG. 36, the laser control unit 2 first reads a pulse repetition frequency Rp=Rpa from an exposure device controller 5 or a memory unit 51 (step S901A). Then, the laser control unit 2 reads the number of oscillation pulses Np from the exposure device controller 5 or the memory unit 51 (step S902A). The number of oscillation pulses Np is preferably, for example, 400 to 1500. The number of oscillation pulses Np is more preferably a power of 2 such as 512 or 1024.

Next, the laser control unit 2 sets the target pulse energy Et to a reference energy Eta (step S903A). The laser control unit 2 writes the set target pulse energy Et in the memory unit 51.

Next, the laser control unit 2 uses the function generator 52 to periodically vary the target pulse energy Et with the reference energy Eta being the center of variation as expressed by an equation below (step S904A). Fma is a modulation frequency of the target pulse energy Et corresponding to the pulse repetition frequency Rpa. Rpa/Fma is desirably an integer. Rpa/Fma is desirably in the range of 4 to 10. An amplitude ΔIe is desirably in the range of 0.5 mJ to 2 mJ. The amplitude ΔIe may be determined by a ratio to the reference energy Eta. For example, ΔIe may be 5% to 10% of Eta. Rpa may be, for example, 6000 Hz. Fma may be, for example, 1200 Hz.

$$Et=Eta+\Delta Ie \cdot \sin(N \cdot 2 \cdot \pi \cdot Fma/Rpa)$$

Next, the laser control unit 2 performs a gain oscillation process (step S905A). This gain oscillation process may be substantially similar to, for example, the subroutine in FIG. 4.

Next, the laser control unit 2 sets a pulse counter value N to N+1 (step S906A).

Next, the laser control unit 2 reads the value of the pulse energy E from a pulse energy detector 30, and writes, as Ean, the value of the pulse energy E for an n-th pulse in the memory unit 51 (step S907A).

Next, the laser control unit 2 reads the value of the charging voltage V set for a charger 90 from the memory unit 51, and writes, as Van, the value of the charging voltage V for the n-th pulse in the memory unit 51 (step S908A).

Next, the laser control unit 2 determines whether or not the pulse counter value N is larger than the number of oscillation pulses Np (step S909A). When determining that the pulse counter value N is not larger than the number of oscillation pulses Np (step S909A; N), the laser control unit 2 returns to the process in step S904A.

When determining that the pulse counter value N is larger than the number of oscillation pulses Np (step S909A; Y), the laser control unit 2 performs a spectrum analysis on a data row of the stored pulse energy E and charging voltage V, and obtains an amplitude component Ieaa of the pulse energy E at the modulation frequency Fma and an amplitude component Ivaa of the charging voltage V at the modulation frequency Fma (step S910A). The spectrum analysis may use Fourier transform, discrete Fourier transform, fast Fourier transform, or the like.

Next, the laser control unit 2 sets the pulse counter value N to 0 (step S911A).

Next, the laser control unit 2 calculates a value Gcaa of the control gain Gc as expressed by an equation below (step S912A), and goes to the process in FIG. 37. A desirable value of coefficient Gs is, for example, 0.3 to 1 so as to prevent divergence of control.

$$Gcaa=Gs \cdot \Delta V/\Delta E=Gs \cdot Ivaa/Ieaa$$

In the process in FIG. 37, the laser control unit 2 first reads a pulse repetition frequency Rp=Rpa from the exposure device controller 5 or the memory unit 51 (step S901B). Then, the laser control unit 2 reads the number of oscillation pulses Np from the exposure device controller 5 or the memory unit 51 (step S902B). The number of oscillation pulses Np is preferably, for example, 400 to 1500. The number of oscillation pulses Np is more preferably a power of 2 such as 512 or 1024.

Next, the laser control unit 2 sets the target pulse energy Et to a reference energy Etb (step S903B). The laser control unit 2 writes the set target pulse energy Et in the memory unit 51.

Next, the laser control unit 2 uses the function generator 52 to periodically vary the target pulse energy Et with the reference energy Etb being the center of variation as expressed by an equation below (step S904B). Fma is a modulation frequency of the target pulse energy Et corresponding to the pulse repetition frequency Rpa. Rpa/Fma is desirably an integer. Rpa/Fma is desirably in the range of 4 to 10. An amplitude ΔIe is desirably in the range of 0.5 mJ to 2 mJ. The amplitude ΔIe may be determined by a ratio to the reference energy Etb. For example, ΔIe may be 5% to 10% of Etb. Rpa may be, for example, 6000 Hz. Fma may be, for example, 1200 Hz.

$$Et=Etb+\Delta Ie \cdot \sin(N \cdot 2 \cdot \pi \cdot Fma/Rpa)$$

Next, the laser control unit 2 performs a gain oscillation process (step S905B). This gain oscillation process may be substantially similar to, for example, the subroutine in FIG. 4.

Next, the laser control unit 2 sets the pulse counter value N to N+1 (step S906B).

Next, the laser control unit 2 reads the value of the pulse energy E from the pulse energy detector 30, and writes, as Ebn, the value of the pulse energy E for an n-th pulse in the memory unit 51 (step S907B).

Next, the laser control unit 2 reads the value of the charging voltage V set for the charger 90 from the memory unit 51, and writes, as Vbn, the value of the charging voltage V for the n-th pulse in the memory unit 51 (step S908B).

Next, the laser control unit 2 determines whether or not the pulse counter value N is larger than the number of oscillation pulses Np (step S909B). When determining that the pulse counter value N is not larger than the number of oscillation pulses Np (step S909B; N), the laser control unit 2 returns to the process in step S904B.

When determining that the pulse counter value N is larger than the number of oscillation pulses Np (step S909B; Y), the laser control unit 2 performs a spectrum analysis on a data row of the stored pulse energy E and charging voltage V, and obtains an amplitude component Ieab of the pulse energy E at the modulation frequency Fma and an amplitude component Ivab of the charging voltage V at the modulation frequency Fma (step S910B). The spectrum analysis may use Fourier transform, discrete Fourier transform, fast Fourier transform, or the like.

Next, the laser control unit 2 sets the pulse counter value N to 0 (step S911B).

Next, the laser control unit 2 calculates a value Gcab of the control gain Gc as expressed by an equation below (step S912B), and goes to the process in FIG. 38. A desirable value of coefficient Gs is, for example, 0.3 to 1 so as to prevent divergence of control.

$$Gcab=Gs \cdot \Delta V/\Delta E=Gs \cdot Ivab/Ieab$$

In the process in FIG. 38, the laser control unit 2 first reads a pulse repetition frequency Rp=Rpa from the exposure device controller 5 or the memory unit 51 (step S901C). Then, the laser control unit 2 reads the number of oscillation pulses Np from the exposure device controller 5 or the memory unit 51 (step S902C). The number of oscillation pulses Np is preferably, for example, 400 to 1500. The number of oscillation pulses Np is more preferably a power of 2 such as 512 or 1024.

Next, the laser control unit 2 sets the target pulse energy Et to a reference energy Etc (step S903C). The laser control unit 2 writes the set target pulse energy Et in the memory unit 51.

Next, the laser control unit 2 uses the function generator 52 to periodically vary the target pulse energy Et with the reference energy Etc being the center of variation as expressed by an equation below (step S904C). Fma is a modulation frequency of the target pulse energy Et corresponding to the pulse repetition frequency Rpa. Rpa/Fma is desirably an integer. Rpa/Fma is desirably in the range of 4 to 10. An amplitude $\Delta$Ie is desirably in the range of 0.5 mJ to 2 mJ. The amplitude $\Delta$Ie may be determined by a ratio to the reference energy Etc. For example, $\Delta$Ie may be 5% to 10% of Etc. Rpa may be, for example, 6000 Hz. Fma may be, for example, 1200 Hz.

$$Et=Etc+\Delta Ie \cdot \sin(N \cdot 2 \cdot \pi \cdot Fmc/Rpc)$$

Next, the laser control unit 2 performs a gain oscillation process (step S905C). This gain oscillation process may be substantially similar to, for example, the subroutine in FIG. 4.

Next, the laser control unit 2 sets the pulse counter value N to N+1 (step S906C).

Next, the laser control unit 2 reads the value of the pulse energy E from the pulse energy detector 30, and writes, as Ecn, the value of the pulse energy E for an n-th pulse in the memory unit 51 (step S907C).

Next, the laser control unit 2 reads the value of the charging voltage V set for the charger 90 from the memory unit 51, and writes, as Vcn, the value of the charging voltage V for the n-th pulse in the memory unit 51 (step S908C).

Next, the laser control unit 2 determines whether or not the pulse counter value N is larger than the number of oscillation pulses Np (step S909C). When determining that the pulse counter value N is not larger than the number of oscillation pulses Np (step S909C; N), the laser control unit 2 returns to the process in step S904C.

When determining that the pulse counter value N is larger than the number of oscillation pulses Np (step S909C; Y), the laser control unit 2 performs a spectrum analysis on a data row of the stored pulse energy E and charging voltage V, and obtains an amplitude component Ieac of the pulse energy E at the modulation frequency Fma and an amplitude component Ivac of the charging voltage V at the modulation frequency Fma (step S910C). The spectrum analysis may use Fourier transform, discrete Fourier transform, fast Fourier transform, or the like.

Next, the laser control unit 2 sets the pulse counter value N to 0 (step S911C).

Next, the laser control unit 2 calculates a value Gcac of the control gain Gc as expressed by an equation below (step S912C), and goes to the process in FIG. 39. A desirable value of coefficient Gs is, for example, 0.3 to 1 so as to prevent divergence of control.

$$Gcac=Gs \cdot \Delta V/\Delta E=Gs \cdot Ivac/Ieac$$

In the process in FIG. 39, the laser control unit 2 first reads a pulse repetition frequency Rp=Rpb from the exposure device controller 5 or the memory unit 51 (step S901D). Then, the laser control unit 2 reads the number of oscillation pulses Np from the exposure device controller 5 or the memory unit 51 (step S902D). The number of oscillation pulses Np is preferably, for example, 400 to 1500. The number of oscillation pulses Np is more preferably a power of 2 such as 512 or 1024.

Next, the laser control unit 2 sets the target pulse energy Et to a reference energy Eta (step S903D). The laser control unit 2 writes the set target pulse energy Et in the memory unit 51.

Next, the laser control unit 2 uses the function generator 52 to periodically vary the target pulse energy Et with the reference energy Eta being the center of variation as expressed by an equation below (step S904D). Fmb is a modulation frequency of the target pulse energy Et corresponding to the pulse repetition frequency Rpb. Rpb/Fmb is desirably an integer. Rpb/Fmb is desirably in the range of 4 to 10. An amplitude $\Delta$Ie is desirably in the range of 0.5 mJ to 2 mJ. The amplitude $\Delta$Ie may be determined by a ratio to the reference energy Eta. For example, $\Delta$Ie may be 5% to 10% of Eta. Rpb may be, for example, 5000 Hz. Fmb may be, for example, 1000 Hz.

$$Et=Eta+\Delta Ie \cdot \sin(N \cdot 2 \cdot \pi \cdot Fmb/Rpb)$$

Next, the laser control unit 2 performs a gain oscillation process (step S905D). This gain oscillation process may be substantially similar to, for example, the subroutine in FIG. 4.

Next, the laser control unit 2 sets the pulse counter value N to N+1 (step S906D).

Next, the laser control unit 2 reads the value of the pulse energy E from the pulse energy detector 30, and writes, as Ean, the value of the pulse energy E for an n-th pulse in the memory unit 51 (step S907D).

Next, the laser control unit 2 reads the value of the charging voltage V set for the charger 90 from the memory unit 51, and writes, as Van, the value of the charging voltage V for the n-th pulse in the memory unit 51 (step S908D).

Next, the laser control unit 2 determines whether or not the pulse counter value N is larger than the number of oscillation pulses Np (step S909D). When determining that the pulse counter value N is not larger than the number of oscillation pulses Np (step S909D; N), the laser control unit 2 returns to the process in step S904D.

When determining that the pulse counter value N is larger than the number of oscillation pulses Np (step S909D; Y), the laser control unit 2 performs a spectrum analysis on a data row of the stored pulse energy E and charging voltage V, and obtains an amplitude component Ieba of the pulse energy E at the modulation frequency Fmb and an amplitude component Ivba of the charging voltage V at the modulation frequency Fmb (step S910D). The spectrum analysis may use Fourier transform, discrete Fourier transform, fast Fourier transform, or the like.

Next, the laser control unit 2 sets the pulse counter value N to 0 (step S911D).

Next, the laser control unit 2 calculates a value Gcba of the control gain Gc as expressed by an equation below (step S912D), and goes to the process in FIG. 40. A desirable value of coefficient Gs is, for example, 0.3 to 1 so as to prevent divergence of control.

$$Gcba = Gs \cdot \Delta V / \Delta E = Gs \cdot Ivba / Ieba$$

In the process in FIG. 40, the laser control unit 2 first reads a pulse repetition frequency Rp=Rpb from the exposure device controller 5 or the memory unit 51 (step S901E). Then, the laser control unit 2 reads the number of oscillation pulses Np from the exposure device controller 5 or the memory unit 51 (step S902E). The number of oscillation pulses Np is preferably, for example, 400 to 1500. The number of oscillation pulses Np is more preferably a power of 2 such as 512 or 1024.

Next, the laser control unit 2 sets the target pulse energy Et to a reference energy Etb (step S903E). The laser control unit 2 writes the set target pulse energy Et in the memory unit 51.

Next, the laser control unit 2 uses the function generator 52 to periodically vary the target pulse energy Et with the reference energy Etb being the center of variation as expressed by an equation below (step S904E). Fmb is a modulation frequency of the target pulse energy Et corresponding to the pulse repetition frequency Rpb. Rpb/Fmb is desirably an integer. Rpb/Fmb is desirably in the range of 4 to 10. An amplitude ΔIe is desirably in the range of 0.5 mJ to 2 mJ. The amplitude ΔIe may be determined by a ratio to the reference energy Etb. For example, ΔIe may be 5% to 10% of Etb. Rpb may be, for example, 5000 Hz. Fmb may be, for example, 1000 Hz.

$$Et = Etb + \Delta Ie \cdot \sin(N \cdot 2 \cdot \pi \cdot Fmb/Rpb)$$

Next, the laser control unit 2 performs a gain oscillation process (step S905E). This gain oscillation process may be substantially similar to, for example, the subroutine in FIG. 4.

Next, the laser control unit 2 sets the pulse counter value N to N+1 (step S906E).

Next, the laser control unit 2 reads the value of the pulse energy E from the pulse energy detector 30, and writes, as Ebn, the value of the pulse energy E for an n-th pulse in the memory unit 51 (step S907E).

Next, the laser control unit 2 reads the value of the charging voltage V set for the charger 90 from the memory unit 51, and writes, as Vbn, the value of the charging voltage V for the n-th pulse in the memory unit 51 (step S908E).

Next, the laser control unit 2 determines whether or not the pulse counter value N is larger than the number of oscillation pulses Np (step S909E). When determining that the pulse counter value N is not larger than the number of oscillation pulses Np (step S909E; N), the laser control unit 2 returns to the process in step S904E.

When determining that the pulse counter value N is larger than the number of oscillation pulses Np (step S909E; Y), the laser control unit 2 performs a spectrum analysis on a data row of the stored pulse energy E and charging voltage V, and obtains an amplitude component Iebb of the pulse energy E at the modulation frequency Fmb and an amplitude component Ivbb of the charging voltage V at the modulation frequency Fmb (step S910E). The spectrum analysis may use Fourier transform, discrete Fourier transform, fast Fourier transform, or the like.

Next, the laser control unit 2 sets the pulse counter value N to 0 (step S911E).

Next, the laser control unit 2 calculates a value Gcbb of the control gain Gc as expressed by an equation below (step S912E), and goes to the process in FIG. 41. A desirable value of coefficient Gs is, for example, 0.3 to 1 so as to prevent divergence of control.

$$Gcbb = Gs \cdot \Delta V / \Delta E = Gs \cdot Ivbb / Iebb$$

In the process in FIG. 41, the laser control unit 2 first reads a pulse repetition frequency Rp=Rpb from the exposure device controller 5 or the memory unit 51 (step S901F). Then, the laser control unit 2 reads the number of oscillation pulses Np from the exposure device controller 5 or the memory unit 51 (step S902F). The number of oscillation pulses Np is preferably, for example, 400 to 1500. The number of oscillation pulses Np is more preferably a power of 2 such as 512 or 1024.

Next, the laser control unit 2 sets the target pulse energy Et to a reference energy Etc (step S903F). The laser control unit 2 writes the set target pulse energy Et in the memory unit 51.

Next, the laser control unit 2 uses the function generator 52 to periodically vary the target pulse energy Et with the reference energy Etc being the center of variation as expressed by an equation below (step S904F). Fmb is a modulation frequency of the target pulse energy Et corresponding to the pulse repetition frequency Rpb. Rpb/Fmb is desirably an integer. Rpb/Fmb is desirably in the range of 4 to 10. An amplitude ΔIe is desirably in the range of 0.5 mJ to 2 mJ. The amplitude ΔIe may be determined by a ratio to the reference energy Etc. For example, ΔIe may be 5% to 10% of Etc. Rpb may be, for example, 5000 Hz. Fmb may be, for example, 1000 Hz.

$$Et = Etc + \Delta Ie \cdot \sin(N \cdot 2 \cdot \pi \cdot Fmb/Rpb)$$

Next, the laser control unit 2 performs a gain oscillation process (step S905F). This gain oscillation process may be substantially similar to, for example, the subroutine in FIG. 4.

Next, the laser control unit 2 sets the pulse counter value N to N+1 (step S906F).

Next, the laser control unit 2 reads the value of the pulse energy E from the pulse energy detector 30, and writes, as Ecn, the value of the pulse energy E for an n-th pulse in the memory unit 51 (step S907F).

Next, the laser control unit 2 reads the value of the charging voltage V set for the charger 90 from the memory unit 51, and writes, as Vcn, the value of the charging voltage V for the n-th pulse in the memory unit 51 (step S908F).

Next, the laser control unit 2 determines whether or not the pulse counter value N is larger than the number of oscillation pulses Np (step S909F). When determining that the pulse counter value N is not larger than the number of oscillation pulses Np (step S909F; N), the laser control unit 2 returns to the process in step S904F.

When determining that the pulse counter value N is larger than the number of oscillation pulses Np (step S909F; Y), the laser control unit 2 performs a spectrum analysis on a data row of the stored pulse energy E and charging voltage V, and obtains an amplitude component Iebc of the pulse energy E at the modulation frequency Fmb and an amplitude component Ivbc of the charging voltage V at the modulation frequency Fmc (step S910F). The spectrum analysis may use Fourier transform, discrete Fourier transform, fast Fourier transform, or the like.

Next, the laser control unit 2 sets the pulse counter value N to 0 (step S911F).

Next, the laser control unit 2 calculates a value Gcbc of the control gain Gc as expressed by an equation below (step S912F), and goes to the process in FIG. 42. A desirable value of coefficient Gs is, for example, 0.3 to 1 so as to prevent divergence of control.

$$Gcbc=Gs \cdot \Delta V/\Delta E=Gs \cdot Ivbc/Iebc$$

In the process in FIG. 42, the laser control unit 2 first reads a pulse repetition frequency Rp=Rpc from the exposure device controller 5 or the memory unit 51 (step S901G). Then, the laser control unit 2 reads the number of oscillation pulses Np from the exposure device controller 5 or the memory unit 51 (step S902G). The number of oscillation pulses Np is preferably, for example, 400 to 1500. The number of oscillation pulses Np is more preferably a power of 2 such as 512 or 1024.

Next, the laser control unit 2 sets the target pulse energy Et to a reference energy Eta (step S903G). The laser control unit 2 writes the set target pulse energy Et in the memory unit 51.

Next, the laser control unit 2 uses the function generator 52 to periodically vary the target pulse energy Et with the reference energy Eta being the center of variation as expressed by an equation below (step S904G). Fmc is a modulation frequency of the target pulse energy Et corresponding to the pulse repetition frequency Rpc. Rpc/Fmc is desirably an integer. Rpc/Fmc is desirably in the range of 4 to 10. An amplitude ΔIe is desirably in the range of 0.5 mJ to 2 mJ. The amplitude ΔIe may be determined by a ratio to the reference energy Eta. For example, ΔIe may be 5% to 10% of Eta. Rpc may be, for example, 3000 Hz. Fmc may be, for example, 600 Hz.

$$Et=Eta+\Delta Ie \cdot \sin(N \cdot 2 \cdot \pi \cdot Fmc/Rpc)$$

Next, the laser control unit 2 performs a gain oscillation process (step S905G). This gain oscillation process may be substantially similar to, for example, the subroutine in FIG. 4.

Next, the laser control unit 2 sets the pulse counter value N to N+1 (step S906G).

Next, the laser control unit 2 reads the value of the pulse energy E from the pulse energy detector 30, and writes, as Ean, the value of the pulse energy E for an n-th pulse in the memory unit 51 (step S907G).

Next, the laser control unit 2 reads the value of the charging voltage V set for the charger 90 from the memory unit 51, and writes, as Van, the value of the charging voltage V for the n-th pulse in the memory unit 51 (step S908G).

Next, the laser control unit 2 determines whether or not the pulse counter value N is larger than the number of oscillation pulses Np (step S909G). When determining that the pulse counter value N is not larger than the number of oscillation pulses Np (step S909G; N), the laser control unit 2 returns to the process in step S904G.

When determining that the pulse counter value N is larger than the number of oscillation pulses Np (step S909G; Y), the laser control unit 2 performs a spectrum analysis on a data row of the stored pulse energy E and charging voltage V, and obtains an amplitude component Ieca of the pulse energy E at the modulation frequency Fmc and an amplitude component Ivca of the charging voltage V at the modulation frequency Fmc (step S910G). The spectrum analysis may use Fourier transform, discrete Fourier transform, fast Fourier transform, or the like.

Next, the laser control unit 2 sets the pulse counter value N to 0 (step S911G).

Next, the laser control unit 2 calculates a value Gcca of the control gain Gc as expressed by an equation below (step S912G), and goes to the process in FIG. 43. A desirable value of coefficient Gs is, for example, 0.3 to 1 so as to prevent divergence of control.

$$Gcca=Gs \cdot \Delta V/\Delta E=Gs \cdot Ivca/Ieca$$

In the process in FIG. 43, the laser control unit 2 first reads a pulse repetition frequency Rp=Rpc from the exposure device controller 5 or the memory unit 51 (step S901H). Then, the laser control unit 2 reads the number of oscillation pulses Np from the exposure device controller 5 or the memory unit 51 (step S902H). The number of oscillation pulses Np is preferably, for example, 400 to 1500. The number of oscillation pulses Np is more preferably a power of 2 such as 512 or 1024.

Next, the laser control unit 2 sets the target pulse energy Et to a reference energy Etb (step S903H). The laser control unit 2 writes the set target pulse energy Et in the memory unit 51.

Next, the laser control unit 2 uses the function generator 52 to periodically vary the target pulse energy Et with the reference energy Etb being the center of variation as expressed by an equation below (step S904H). Fmc is a modulation frequency of the target pulse energy Et corresponding to the pulse repetition frequency Rpc. Rpc/Fmc is desirably an integer. Rpc/Fmc is desirably in the range of 4 to 10. An amplitude ΔIe is desirably in the range of 0.5 mJ to 2 mJ. The amplitude ΔIe may be determined by a ratio to the reference energy Etb. For example, ΔIe may be 5% to 10% of Etb. Rpc may be, for example, 3000 Hz. Fmc may be, for example, 600 Hz.

$$Et=Etb+\Delta Ie \cdot \sin(N \cdot 2 \cdot \pi \cdot Fmc/Rpc)$$

Next, the laser control unit 2 performs a gain oscillation process (step S905H). This gain oscillation process may be substantially similar to, for example, the subroutine in FIG. 4.

Next, the laser control unit 2 sets the pulse counter value N to N+1 (step S906H).

Next, the laser control unit 2 reads the value of the pulse energy E from the pulse energy detector 30, and writes, as Ebn, the value of the pulse energy E for an n-th pulse in the memory unit 51 (step S907H).

Next, the laser control unit 2 reads the value of the charging voltage V set for the charger 90 from the memory unit 51, and writes, as Vbn, the value of the charging voltage V for the n-th pulse in the memory unit 51 (step S908H).

Next, the laser control unit 2 determines whether or not the pulse counter value N is larger than the number of oscillation pulses Np (step S909H). When determining that the pulse counter value N is not larger than the number of oscillation pulses Np (step S909H; N), the laser control unit 2 returns to the process in step S904H.

When determining that the pulse counter value N is larger than the number of oscillation pulses Np (step S909H; Y), the laser control unit 2 performs a spectrum analysis on a data row of the stored pulse energy E and charging voltage V, and obtains an amplitude component Iecb of the pulse energy E at the modulation frequency Fmc and an amplitude component Ivcb of the charging voltage V at the modulation frequency Fmc (step S910H). The spectrum analysis may use Fourier transform, discrete Fourier transform, fast Fourier transform, or the like.

Next, the laser control unit 2 sets the pulse counter value N to 0 (step S911H).

Next, the laser control unit 2 calculates a value Gcb of the control gain Gc as expressed by an equation below (step S912H), and goes to the process in FIG. 44. A desirable value of coefficient Gs is, for example, 0.3 to 1 so as to prevent divergence of control.

$$Gccb = Gs \cdot \Delta V / \Delta E = Gs \cdot Ivcb / Iecb$$

In the process in FIG. 44, the laser control unit 2 first reads a pulse repetition frequency Rp=Rpc from the exposure device controller 5 or the memory unit 51 (step S901I). Then, the laser control unit 2 reads the number of oscillation pulses Np from the exposure device controller 5 or the memory unit 51 (step S902I). The number of oscillation pulses Np is preferably, for example, 400 to 1500. The number of oscillation pulses Np is more preferably a power of 2 such as 512 or 1024.

Next, the laser control unit 2 sets the target pulse energy Et to a reference energy Etc (step S903I). The laser control unit 2 writes the set target pulse energy Et in the memory unit 51.

Next, the laser control unit 2 uses the function generator 52 to periodically vary the target pulse energy Et with the reference energy Etc being the center of variation as expressed by an equation below (step S904I). Fmc is a modulation frequency of the target pulse energy Et corresponding to the pulse repetition frequency Rpc. Rpc/Fmc is desirably an integer. Rpc/Fmc is desirably in the range of 4 to 10. An amplitude ΔIe is desirably in the range of 0.5 mJ to 2 mJ. The amplitude ΔIe may be determined by a ratio to the reference energy Etc. For example, ΔIe may be 5% to 10% of Etc. Rpc may be, for example, 3000 Hz. Fmc may be, for example, 600 Hz.

$$Et = Etc + \Delta Ie \cdot \sin(N \cdot 2 \cdot \pi \cdot Fmc / Rpc)$$

Next, the laser control unit 2 performs a gain oscillation process (step S905I). This gain oscillation process may be substantially similar to, for example, the subroutine in FIG. 4.

Next, the laser control unit 2 sets the pulse counter value N to N+1 (step S906I).

Next, the laser control unit 2 reads the value of the pulse energy E from the pulse energy detector 30, and writes, as Ecn, the value of the pulse energy E for an n-th pulse in the memory unit 51 (step S907I).

Next, the laser control unit 2 reads the value of the charging voltage V set for the charger 90 from the memory unit 51, and writes, as Vcn, the value of the charging voltage V for the n-th pulse in the memory unit 51 (step S908I).

Next, the laser control unit 2 determines whether or not the pulse counter value N is larger than the number of oscillation pulses Np (step S909I). When determining that the pulse counter value N is not larger than the number of oscillation pulses Np (step S909I; N), the laser control unit 2 returns to the process in step S904I.

When determining that the pulse counter value N is larger than the number of oscillation pulses Np (step S909I; Y), the laser control unit 2 performs a spectrum analysis on a data row of the stored pulse energy E and charging voltage V, and obtains an amplitude component Iecc of the pulse energy E at the modulation frequency Fmc and an amplitude component Ivcc of the charging voltage V at the modulation frequency Fmc (step S910I). The spectrum analysis may use Fourier transform, discrete Fourier transform, fast Fourier transform, or the like.

Next, the laser control unit 2 sets the pulse counter value N to 0 (step S911I).

Next, the laser control unit 2 calculates a value Gccc of the control gain Gc as expressed by an equation below (step S912I), and finishes the process. A desirable value of coefficient Gs is, for example, 0.3 to 1 so as to prevent divergence of control.

$$Gccc = Gs \cdot \Delta V / \Delta E = Gs \cdot Ivcc / Iecc$$

(Specific Example of Energy Control in Embodiment 4)

Figure 45:
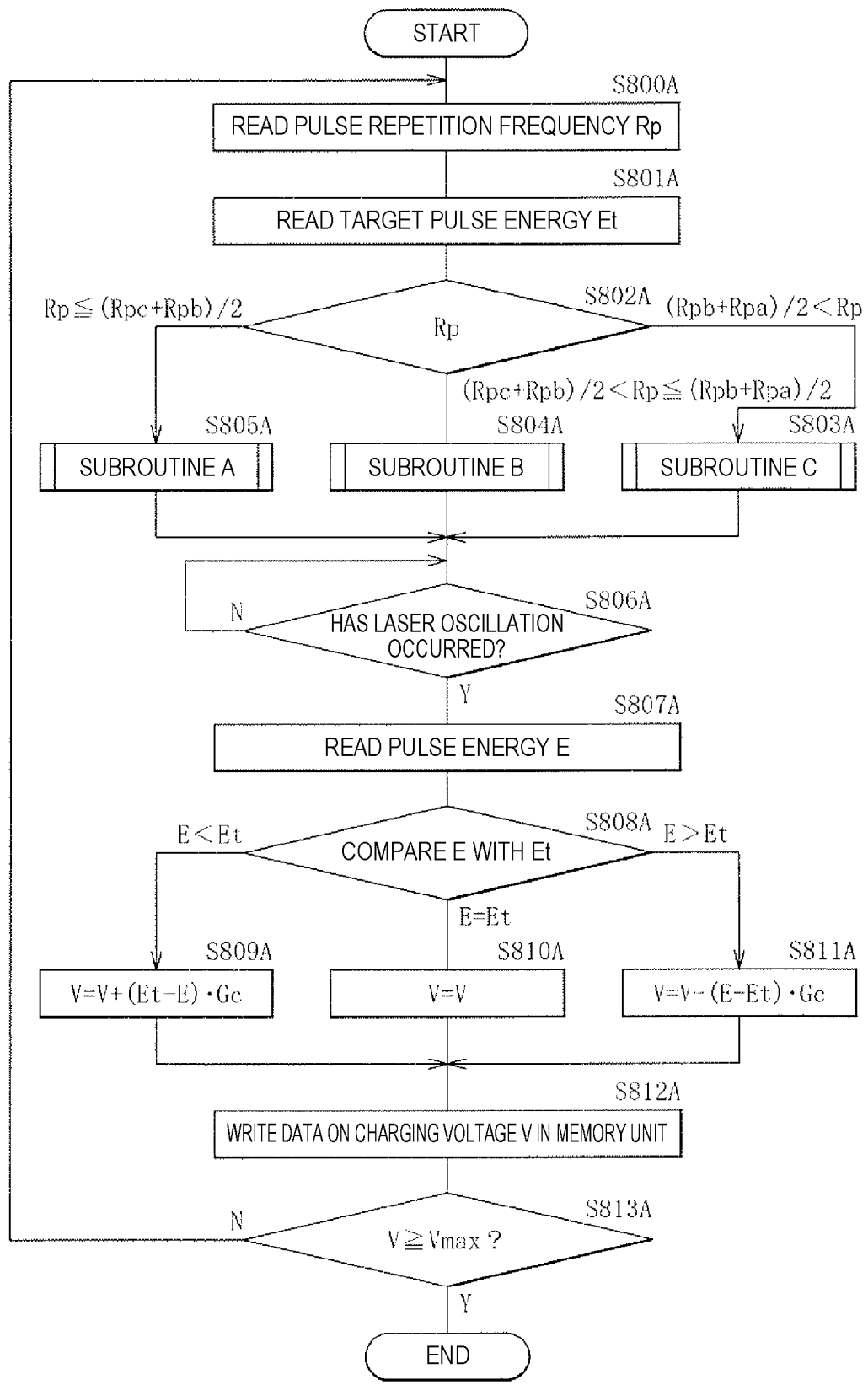
FIG. 45 is a flowchart of an example of control of a pulse energy by the laser control unit in the laser apparatus according to Embodiment 4.
Figure 46:
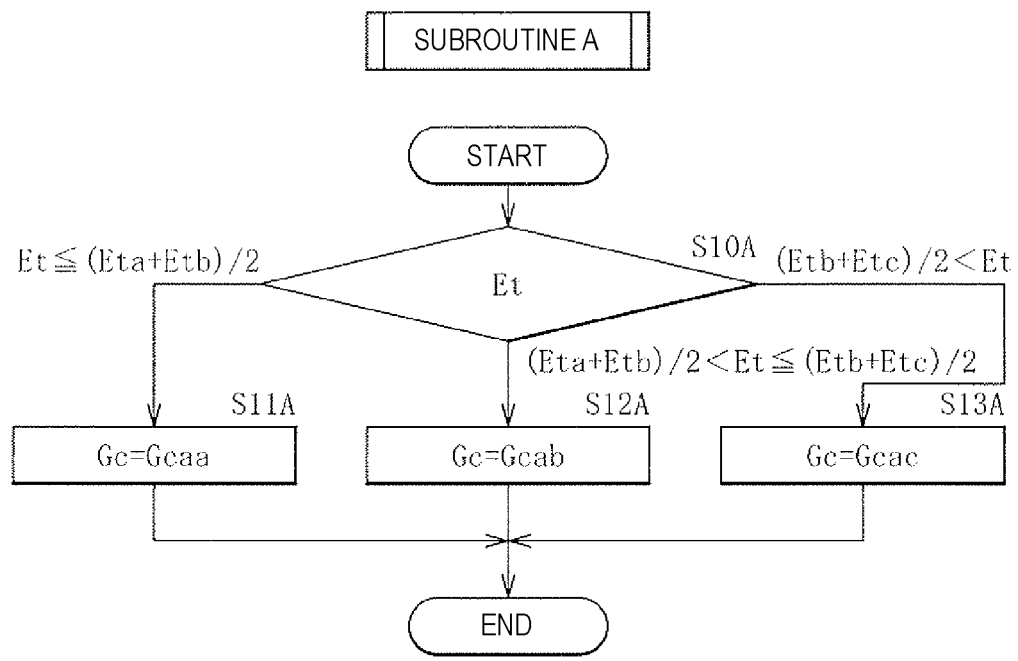
FIG. 46 is a flowchart of an example of a subroutine A in step S805A in FIG. 45.
Figure 47:
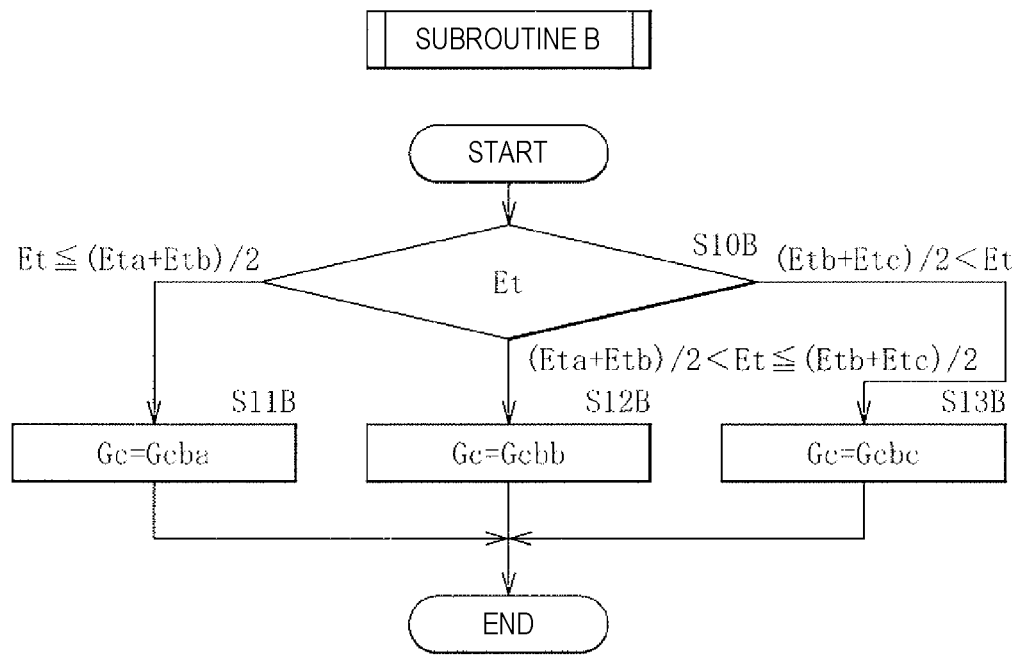
FIG. 47 is a flowchart of an example of a subroutine B in step S804A in FIG. 45.
Figure 48:
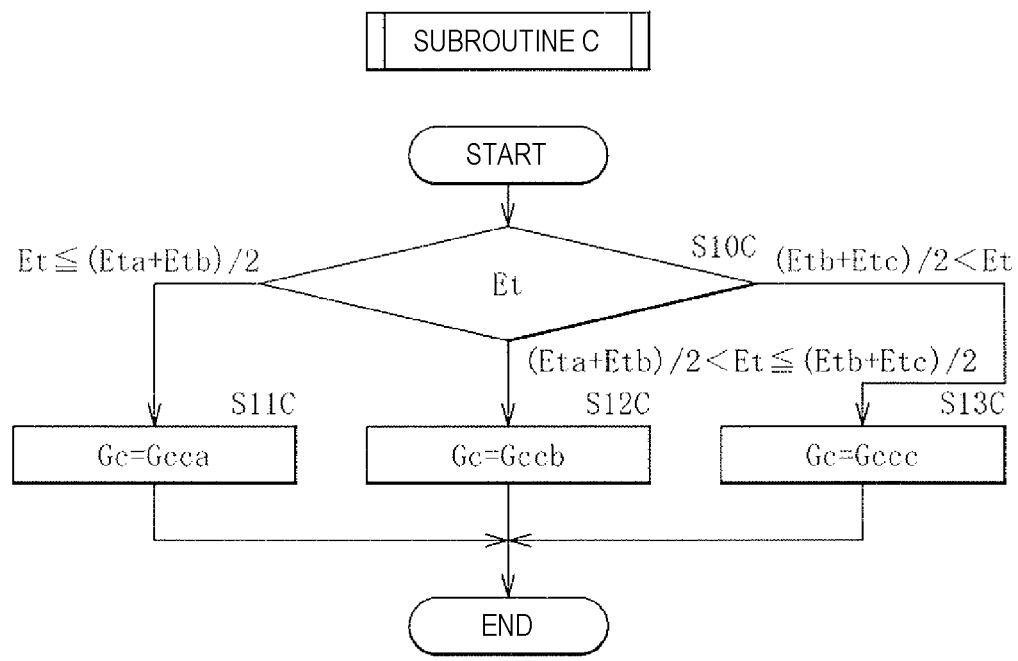
FIG. 48 is a flowchart of an example of a subroutine C in step S803A in FIG. 45.

FIG. 45 is a flowchart of an example of control of the pulse energy E by the laser control unit 2 in the laser apparatus according to Embodiment 4. FIG. 46 shows an example of a subroutine A in step S805A in FIG. 45. FIG. 47 shows an example of a subroutine B in step S804A in FIG. 45. FIG. 48 shows an example of a subroutine C in step S803A in FIG. 45.

The laser control unit 2 first reads the pulse repetition frequency Rp from the exposure device controller 5 or the memory unit 51 (step S800A).

Next, the laser control unit 2 reads the target pulse energy Et from the exposure device controller 5 or the memory unit 51 (step S801A).

Next, the laser control unit 2 determines a value of the pulse repetition frequency Rp (step S802A).

When determining that the pulse repetition frequency Rp is higher than a predetermined value, for example, (Rpb+Rpa)/2<Rp is satisfied, the laser control unit 2 performs the process in the subroutine C in FIG. 48 (step S803A).

When determining that the pulse repetition frequency Rp is within a predetermined range, for example, (Rpc+Rpb)/2<Rp≤(Rpb+Rpa)/2 is satisfied, the laser control unit 2 performs the process in the subroutine B in FIG. 47 (step S804A).

When determining that the pulse repetition frequency Rp is the predetermined value or lower, for example, Rp≤(Rpc+Rpb)/2 is satisfied, the laser control unit 2 performs the process in the subroutine A in FIG. 46 (step S805A).

Next, the laser control unit 2 determines whether or not laser oscillation has occurred (step S806A). When determining that the laser oscillation has not occurred (step S806A; N), the laser control unit 2 repeats the process in step S806A.

When determining that the laser oscillation has occurred (step S806A; Y), the laser control unit 2 reads the value of the pulse energy E from the pulse energy detector 30 (step S807A).

Next, the laser control unit 2 compares the pulse energy E with the target pulse energy Et (step S808A). When determining that the pulse energy E is substantially equal to the target pulse energy Et (E=Et), the laser control unit 2 takes data on the current charging voltage V as it is as data on the charging voltage V (step S810A), and writes the data in the memory unit 51 (step S812A).

When determining that the pulse energy E is lower than the target pulse energy Et (E<Et), the laser control unit 2 adds a value obtained by multiplying a difference (Et−E) between the target pulse energy Et and the pulse energy E by the control gain Gc to the charging voltage V to obtain a new charging voltage V as expressed by an equation below (step S809A), and writes data on the charging voltage V in the memory unit 51 (step S812A).

$$V=V+(Et-E) \cdot Gc$$

When determining that the pulse energy E is higher than the target pulse energy Et (E>Et), the laser control unit 2 subtracts a value obtained by multiplying a difference (E−Et) between the pulse energy E and the target pulse energy Et by the control gain Gc from the charging voltage V to obtain a new charging voltage V as expressed by an equation below (step S811A), and writes data on the charging voltage V in the memory unit 51 (step S813A).

$$V=V-(E-Et) \cdot Gc$$

Next, the laser control unit 2 determines whether or not the charging voltage V has reached a predetermined maximum value Vmax or higher (step S813A). When determining that the charging voltage V has not reached the predetermined maximum value Vmax or higher (step S813A; N), the laser control unit 2 returns to the process in step S800A. When determining that the charging voltage V has reached the predetermined maximum value Vmax or higher (step S813A; Y), the laser control unit 2 finishes the energy control process.

FIG. 46 shows an example of the subroutine A in step S805A in FIG. 45.

In the subroutine A, the laser control unit 2 first determines which of the control gains Gcaa, Gcab, Gcac the target pulse energy Et corresponds to (step S10A). The control gains Gcaa, Gcab, Gcac may be calculated according to the flowcharts in FIGS. 36 to 38.

When determining that the target pulse energy Et is a predetermined value or lower, for example, Et≤(Eta+Etb)/2 is satisfied, the laser control unit 2 sets the value of the control gain Gc to Gcaa (step S11A).

When determining that the target pulse energy Et is within a predetermined range, for example, (Eta+Etb)/2<Et≤(Etb+Etc)/2 is satisfied, the laser control unit 2 sets the value of the control gain Gc to Gcab (step S12A).

When determining that the target pulse energy Et is higher than the predetermined value, for example, (Etb+Etc)/2<Et is satisfied, the laser control unit 2 sets the value of the control gain Gc to Gcac (step S13A).

FIG. 47 shows an example of the subroutine B in step S804A in FIG. 45.

In the subroutine B, the laser control unit 2 first determines which of the control gains Gcba, Gcbb, Gcbc the target pulse energy Et corresponds to (step S10B).

The control gains Gcba, Gcbb, Gcbc may be calculated according to the flowcharts in FIGS. 39 to 41.

When determining that the target pulse energy Et is a predetermined value or lower, for example, Et≤(Eta+Etb)/2 is satisfied, the laser control unit 2 sets the value of the control gain Gc to Gcba (step S11B).

When determining that the target pulse energy Et is within a predetermined range, for example, (Eta+Etb)/2<Et≤(Etb+Etc)/2 is satisfied, the laser control unit 2 sets the value of the control gain Gc to Gcbb (step S12B).

When determining that the target pulse energy Et is higher than the predetermined value, for example, (Etb+Etc)/2<Et is satisfied, the laser control unit 2 sets the value of the control gain Gc to Gcbc (step S13B).

FIG. 48 shows an example of the subroutine C in step S803A in FIG. 45.

In the subroutine C, the laser control unit 2 first determines which of the control gains Gcca, Gccb, Gccc the target pulse energy Et corresponds to (step S10C). The control gains Gcca, Gccb, Gccc may be calculated according to the flowcharts in FIGS. 42 to 44.

When determining that the target pulse energy Et is a predetermined value or lower, for example, Et≤(Eta+Etb)/2 is satisfied, the laser control unit 2 sets the value of the control gain Gc to Gcca (step S11C).

When determining that the target pulse energy Et is within a predetermined range, for example, (Eta+Etb)/2<Et≤(Etb+Etc)/2 is satisfied, the laser control unit 2 sets the value of the control gain Gc to Gccb (step S12C).

When determining that the target pulse energy Et is higher than the predetermined value, for example, (Etb+Etc)/2<Et is satisfied, the laser control unit 2 sets the value of the control gain Gc to Gccc (step S13C).

Other operations may be substantially similar to those of the laser apparatus according to the comparative examples or Embodiment 1, 2, or 3.

[5.3 Effect]

With the laser apparatus of Embodiment 4, the plurality of control gains Gc corresponding to the plurality of pulse repetition frequencies Rpa, Rpb, Rpc and the values of the target pulse energies Et are calculated, thereby improving control accuracy of the pulse energy E when the pulse repetition frequency Rp and the target pulse energy Et are changed.

In Embodiment 4, the example in which the laser control unit 2 calculates the nine control gains Gc based on the three pulse repetition frequencies Rpa, Rpb, Rpc and the three reference energies Eta, Etb, Etc is described. However, two or four or more pulse repetition frequencies Rp and two or four or more reference energies Et may be used. The number of the control gains Gc calculated may be other than nine correspondingly to the numbers of the pulse repetition frequencies Rp and the reference energies Et.

Other effects may be substantially similar to those of the laser apparatus according to the comparative examples or Embodiment 1, 2, or 3.

<6. Embodiment 5> (Laser Apparatus Including MOPO System)

Next, a laser apparatus according to Embodiment 5 of the present disclosure will be described. Substantially the same components as those of the laser apparatus according to the comparative examples or Embodiment 1, 2, 3, or 4 are denoted by the same reference numerals, and descriptions are omitted as appropriate.

[6.1 Configuration]

In the comparative examples and Embodiments 1 to 4, the laser apparatus of a single chamber type has been described by way of example. However, the technology in Embodiments 1 to 4 is applicable to laser apparatuses other than of the single chamber type. For example, the technology in Embodiments 1 to 4 is applicable to a laser system including a master oscillator (MO) and an amplifier. For example, the technology may be applied to an MOPO system including a master oscillator and a power oscillator (PO) as an amplifier.

Figure 49:
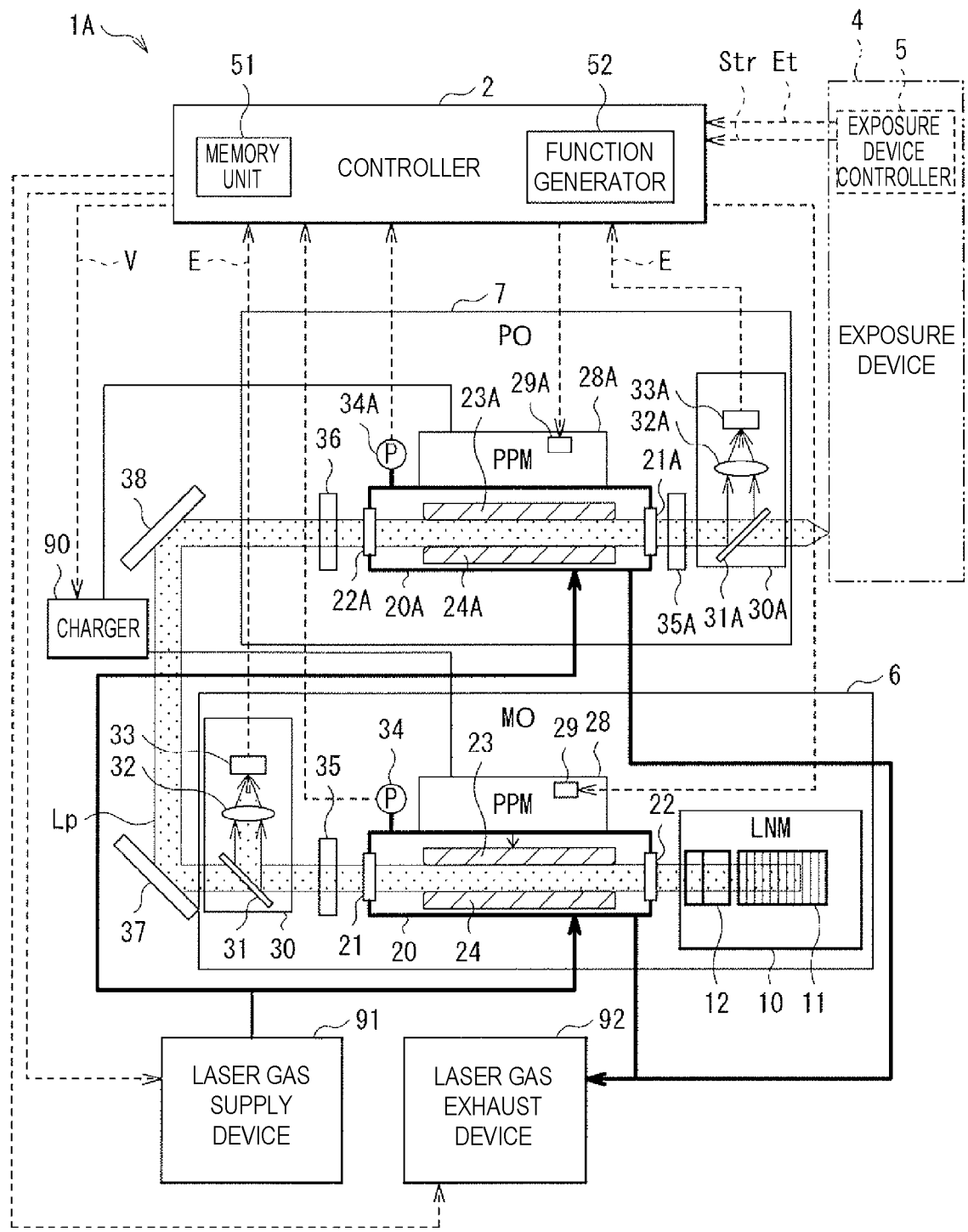
FIG. 49 schematically shows an exemplary configuration of a laser apparatus according to Embodiment 5.

FIG. 49 schematically shows an exemplary configuration of a laser apparatus 1A according to Embodiment 5 of the present disclosure.

The laser apparatus 1A according to Embodiment 5 includes a master oscillator 6 and a power oscillator 7. The master oscillator 6 determines an optical quality such as a wavelength or a spectrum line width of a laser beam. The power oscillator 7 amplifies a pulse laser beam Lp output from the master oscillator 6. The power oscillator 7 outputs the amplified pulse laser beam Lp toward an exposure device 4.

Between the master oscillator 6 and the power oscillator 7, reflection mirrors 37, 38 may be arranged as optics for guiding the pulse laser beam Lp output from the master oscillator 6 to the power oscillator 7.

The master oscillator 6 may include a laser resonator, a laser chamber 20, a pulse power module 28, and a pulse energy detector 30 substantially similarly to the laser apparatus 1 according to Comparative Example 2.

The power oscillator 7 may include a laser chamber 20A, a pulse power module 28A, a pulse energy detector 30A, an output coupling mirror 35A as an output coupler, and a partial reflection mirror 36.

The laser chamber 20A may include windows 21A, 22A that transmit a laser beam, a pair of discharge electrodes 23A, 24A, and a pressure sensor 34A substantially similarly to the laser chamber 20.

The laser chamber 20A may include a cross flow fan, a motor, a heat exchanger, or the like (not shown) substantially similarly to the laser chamber 20.

The laser chamber 20A emits, at a set predetermined pulse repetition frequency Rp, a pulse laser beam Lp having a pulse energy E corresponding to a voltage applied between the discharge electrodes 23A, 24A. The voltage applied between the discharge electrodes 23A, 24A may be a voltage corresponding to a charging voltage V of a charger 90.

The output coupling mirror 35A and the partial reflection mirror 36 may be each coated with a multilayer film that reflects some of the pulse laser beam Lp and transmits other of the pulse laser beam Lp. The output coupling mirror 35A and the partial reflection mirror 36 may constitute the laser resonator of the power oscillator 7. The laser chamber 20A may be arranged so that a discharge region of the discharge electrodes 23A, 24A is located on an optical path of the laser resonator.

The pulse energy detector 30A is provided on an optical path of the pulse laser beam Lp output from the output coupling mirror 35A, and detects a pulse energy E of the pulse laser beam Lp. The pulse energy detector 30A may include a beam splitter 31A, a condenser lens 32A, and an optical sensor 33A that detects the pulse energy E.

The beam splitter 31A may be arranged on the optical path of the pulse laser beam Lp output from the output coupling mirror 35A. The condenser lens 32A may be arranged on the optical path of the pulse laser beam Lp reflected by the beam splitter 31A. The optical sensor 33A may be arranged near a light concentration position of the condenser lens 32A.

The pulse power module 28A includes a switch 29A for causing discharge of the discharge electrodes 23A, 24A, and may be connected via an electrical insulating member (not shown) to one discharge electrode 23. The other discharge electrode 24 may be connected to the grounded laser chamber 20A. The pulse power module 28A may include a charging capacitor (not shown).

The charger 90 and the pulse power module 28 may be electrically connected to each other so as to charge the charging capacitor in the pulse power module 28A. The charger 90 may receive data indicating the charging voltage V from the laser control unit 2. The charging voltage V may be a voltage for charging the charging capacitor. The charging voltage V may be controlled by the laser control unit 2 based on the pulse energy E measured by the pulse energy detector 30A. The charging voltage V may correspond to a voltage applied between the discharge electrodes 23A, 24A.

An oscillation trigger signal Str and a target pulse energy Et may be input from an exposure device controller 5 in the exposure device 4 to the laser control unit 2. The laser control unit 2 and the pulse power module 28A may be electrically connected to each other so that the switch 29A is turned on/off in synchronization with the oscillation trigger signal Str.

The laser control unit 2 may be a voltage control unit that controls a voltage applied between the discharge electrodes 23, 24 in the master oscillator 6 based on the target pulse energy Et and the pulse energy E detected by the pulse energy detector 30 in the master oscillator 6. The laser control unit 2 may be a voltage control unit that controls a voltage applied between the discharge electrodes 23A, 24A in the master oscillator 7 based on the pulse energy E detected by the pulse energy detector 30A in the master oscillator 7.

The laser control unit 2 may be a gain calculation unit that calculates control gains Gc for the master oscillator 6 and the power oscillator 7. The laser control unit 2 controls charging voltages V using the control gains Gc for the master oscillator 6 and the power oscillator 7 to perform energy control of pulse laser beams Lp output from the master oscillator 6 and the power oscillator 7.

The laser gas supply device 91 may include a gas cylinder (not shown) that supplies a laser gas into the laser chambers 20, 20A and a supply valve (not shown) as a flow control valve that controls supply of the laser gas from the gas cylinder.

The laser gas exhaust device 92 may be configured to exhaust the laser gas out of the laser chambers 20, 20A. The laser gas exhaust device 92 may include an exhaust valve (not shown) and an exhaust pump (not shown).

Other configurations may be substantially similar to the laser apparatus according to the comparative examples or Embodiment 1, 2, 3, or 4.

[6.2 Operation]

The control gains Gc for the master oscillator 6 and the power oscillator 7 may be calculated substantially similarly to the laser apparatus according to Embodiment 1, 2, 3, or 4. Energy control for the master oscillator 6 and the power oscillator 7 may be performed based on the control gains Gc calculated for the master oscillator 6 and the power oscillator 7 substantially similarly to the laser apparatus according to Embodiment 1, 2, 3, or 4.

Other operations may be substantially similar to the laser apparatus according to the comparative examples or Embodiment 1, 2, 3, or 4.

[6.3 Effect]

With the laser apparatus of Embodiment 5, control accuracy of the pulse energy E can be improved in both the master oscillator and the amplifier in the laser system including the master oscillator and the amplifier.

Other effects may be substantially similar to the laser apparatus according to the comparative examples or Embodiment 1, 2, 3, or 4.

<7. Others>

The above descriptions are intended to be illustrative only and not restrictive. Thus, it will be apparent to those skilled in the art that modifications may be made in the embodiments of the present disclosure without departing from the scope of the appended claims.

The terms used throughout the specification and the appended claims should be interpreted as "non-limiting." For example, the term "comprising" or "comprised" should be interpreted as "not limited to what has been described as being comprised." The term "having" should be interpreted as "not limited to what has been described as having". Further, the modifier "a/an" described in the specification and the appended claims should be interpreted to mean "at least one" or "one or more".

What is claimed is:

1. A laser apparatus comprising:
   a laser chamber including a pair of electrodes and configured to emit, at each of a plurality of pulse repetition frequencies, a pulse laser beam having a pulse energy corresponding to a voltage applied between the electrodes;
   an energy detector provided on an optical path of the pulse laser beam and configured to detect the pulse energy of the pulse laser beam;
   a voltage control unit configured to control the applied voltage based on a target pulse energy and the pulse energy detected by the energy detector;
   a pulse energy control unit configured to periodically vary the target pulse energy at modulation frequencies corresponding to the pulse repetition frequencies with a reference energy being a center of variation; and
   a gain calculation unit configured to calculate a plurality of control gains corresponding to the pulse repetition frequencies,
   wherein the gain calculation unit:
      calculates an amplitude component of the pulse energy and an amplitude component of the applied voltage when the target pulse energy is periodically varied at the modulation frequency, and
      calculates the control gains based on the amplitude component of the pulse energy and the amplitude component of the applied voltage.

2. The laser apparatus according to claim 1, wherein the pulse repetition frequencies include a first pulse repetition frequency and a second pulse repetition frequency,
   the modulation frequencies include a first modulation frequency corresponding to the first pulse repetition frequency and a second modulation frequency corresponding to the second pulse repetition frequency, and $Rpa>Rpb$ and $Fma>Fmb$ are satisfied, where Rpa is the first pulse repetition frequency, Rpb is the second pulse repetition frequency, Fma is the first modulation frequency, and Fmb is the second modulation frequency.

3. The laser apparatus according to claim 1, wherein the voltage control unit controls the applied voltage based on the control gains as well as the target pulse energy and the pulse energy detected by the energy detector.

4. A laser apparatus comprising:
   a laser chamber including a pair of electrodes and configured to emit, at each of a plurality of pulse repetition frequencies, a pulse laser beam having a pulse energy corresponding to a voltage applied between the electrodes;
   an energy detector provided on an optical path of the pulse laser beam and configured to detect the pulse energy of the pulse laser beam;
   a voltage control unit configured to control the applied voltage based on a target pulse energy and the pulse energy detected by the energy detector; and
   a pulse energy control unit configured to periodically vary the target pulse energy at modulation frequencies corresponding to the pulse repetition frequencies with a reference energy being a center of variation, the pulse energy control unit periodically varying the target pulse energy with each of a plurality of the reference energies being the center of variation, wherein
   the reference energies include a first reference energy and a second reference energy,
   the pulse repetition frequencies include a first pulse repetition frequency and a second pulse repetition frequency,
   the modulation frequencies include a first modulation frequency corresponding to the first pulse repetition frequency and a second modulation frequency corresponding to the second pulse repetition frequency, and $Eta<Etb,$ $Rpa>Rpb,$ and $Fma>Fmb$ are satisfied, where Eta is the first reference energy, Etb is the second reference energy, Rpa is the first pulse repetition frequency, Rpb is the second pulse repetition frequency, Fma is the first modulation frequency, and Fmb is the second modulation frequency.

5. The laser apparatus according to claim 4, further comprising a gain calculation unit configured to calculate a plurality of control gains corresponding to the reference energies.

6. The laser apparatus according to claim 5, wherein the voltage control unit controls the applied voltage based on the control gains as well as the target pulse energy and the pulse energy detected by the energy detector.

7. A laser apparatus comprising:
   a laser chamber including a pair of electrodes and configured to emit, at each of a plurality of pulse repetition frequencies, a pulse laser beam having a pulse energy corresponding to a voltage applied between the electrodes;
   an energy detector provided on an optical path of the pulse laser beam and configured to detect the pulse energy of the pulse laser beam;
   a voltage control unit configured to control the applied voltage based on a target pulse energy and the pulse energy detected by the energy detector;
   a pulse energy control unit configured to periodically vary the target pulse energy at modulation frequencies corresponding to the pulse repetition frequencies with a reference energy being a center of variation, the pulse energy control unit periodically varying the target pulse energy with each of a plurality of the reference energies being the center of variation; and a gain calculation unit configured to calculate a plurality of control gains corresponding to the reference energies, wherein the gain calculation unit:
calculates an amplitude component of the pulse energy and an amplitude component of the applied voltage when the target pulse energy is periodically varied at the modulation frequency with each of the reference energies being the center of variation, and calculates the control gains based on the amplitude component of the pulse energy and the amplitude component of the applied voltage.

8. The laser apparatus according to claim 7, wherein the reference energies include a first reference energy and a second reference energy, the pulse repetition frequencies include a first pulse repetition frequency and a second pulse repetition frequency, the modulation frequencies include a first modulation frequency corresponding to the first pulse repetition frequency and a second modulation frequency corresponding to the second pulse repetition frequency, and $Eta<Etb,$ $Rpa>Rpb,$ and $Fma>Fmb$ are satisfied, where Eta is the first reference energy, Etb is the second reference energy, Rpa is the first pulse repetition frequency, Rpb is the second pulse repetition frequency, Fma is the first modulation frequency, and Fmb is the second modulation frequency.

9. The laser apparatus according to claim 7, wherein the voltage control unit controls the applied voltage based on the control gains as well as the target pulse energy and the pulse energy detected by the energy detector.

10. A laser apparatus comprising:
a laser chamber including a pair of electrodes and configured to emit, at a predetermined pulse repetition frequency, a pulse laser beam having a pulse energy corresponding to a voltage applied between the electrodes;

an energy detector provided on an optical path of the pulse laser beam and configured to detect the pulse energy of the pulse laser beam;

a voltage control unit configured to control the applied voltage based on a target pulse energy and the pulse energy detected by the energy detector;

a pulse energy control unit configured to periodically vary the target pulse energy at a predetermined modulation frequency with each of a plurality of reference energies being a center of variation; and a gain calculation unit configured to calculate a plurality of control gains corresponding to the reference energies, wherein the gain calculation unit:
calculates an amplitude component of the pulse energy and an amplitude component of the applied voltage when the target pulse energy is periodically varied at the predetermined modulation frequency with each of the reference energies being the center of variation, and calculates the control gains based on the amplitude component of the pulse energy and the amplitude component of the applied voltage.

11. The laser apparatus according to claim 10, wherein the voltage control unit controls the applied voltage based on the control gains as well as the target pulse energy and the pulse energy detected by the energy detector.

12. A laser apparatus comprising:
a laser chamber including a pair of electrodes and configured to emit, at a predetermined pulse repetition frequency, a pulse laser beam having a pulse energy corresponding to a voltage applied between the electrodes;

an energy detector provided on an optical path of the pulse laser beam and configured to detect the pulse energy of the pulse laser beam;

a voltage control unit configured to control the applied voltage based on a target pulse energy and the pulse energy detected by the energy detector; and a pulse energy control unit configured to periodically vary the target pulse energy at modulation frequencies corresponding to a plurality of reference energies with each of the reference energies being a center of variation, wherein the reference energies include a first reference energy and a second reference energy, the modulation frequencies include a first modulation frequency corresponding to the first reference energy and a second modulation frequency corresponding to the second reference energy, and $Eta<Etb$ and $Fma>Fmb$ are satisfied, where Eta is the first reference energy, Etb is the second reference energy, Fma is the first modulation frequency, and Fmb is the second modulation frequency.

13. The laser apparatus according to claim 12, further comprising a gain calculation unit configured to calculate a plurality of control gains corresponding to the reference energies.

14. The laser apparatus according to claim 13, wherein the voltage control unit controls the applied voltage based on the plurality of control gains as well as the target pulse energy and the pulse energy detected by the energy detector.

15. A laser apparatus comprising:
a laser chamber including a pair of electrodes and configured to emit, at a predetermined pulse repetition frequency, a pulse laser beam having a pulse energy corresponding to a voltage applied between the electrodes;

an energy detector provided on an optical path of the pulse laser beam and configured to detect the pulse energy of the pulse laser beam;

a voltage control unit configured to control the applied voltage based on a target pulse energy and the pulse energy detected by the energy detector;

a pulse energy control unit configured to periodically vary the target pulse energy at modulation frequencies corresponding to a plurality of reference energies with each of the reference energies being a center of variation; and a gain calculation unit configured to calculate a plurality of control gains corresponding to the reference energies, wherein the gain calculation unit:
    calculates an amplitude component of the pulse energy and an amplitude component of the applied voltage when the target pulse energy is periodically varied at the modulation frequency with each of the reference energies being the center of variation, and
    calculates the control gains based on the amplitude component of the pulse energy and the amplitude component of the applied voltage.

16. The laser apparatus according to claim 15, wherein the reference energies include a first reference energy and a second reference energy,
    the modulation frequencies include a first modulation frequency corresponding to the first reference energy and a second modulation frequency corresponding to the second reference energy, and $Eta < Etb,$ and $Fma > Fmb$ are satisfied, where Eta is the first reference energy, Etb is the second reference energy, Fma is the first modulation frequency, and Fmb is the second modulation frequency.

17. The laser apparatus according to claim 15, wherein the voltage control unit controls the applied voltage based on the plurality of control gains as well as the target pulse energy and the pulse energy detected by the energy detector.

* * * * *